US008793804B2

(12) United States Patent
Bekker et al.

(10) Patent No.: US 8,793,804 B2
(45) Date of Patent: Jul. 29, 2014

(54) COMPUTER IMPLEMENTED METHOD, COMPUTER SYSTEM AND NONTRANSITORY COMPUTER READABLE STORAGE MEDIUM HAVING HTTP MODULE

(75) Inventors: Eugene Bekker, Crofton, MD (US); Darrell Lee Laffoon, Bel Air, MD (US); Joseph P. Baker, Abingdon, MD (US)

(73) Assignee: EZShield, Inc., Baltimore, MD (US)

( * ) Notice: Subject to any disclaimer, the term of this patent is extended or adjusted under 35 U.S.C. 154(b) by 0 days.

(21) Appl. No.: 13/539,245

(22) Filed: Jun. 29, 2012

(65) Prior Publication Data

US 2013/0179981 A1    Jul. 11, 2013

Related U.S. Application Data

(60) Provisional application No. 61/584,745, filed on Jan. 9, 2012.

(51) Int. Cl.
*H04L 29/06* (2006.01)

(52) U.S. Cl.
CPC ................................. *H04L 63/0823* (2013.01)
USPC ........................................................ 726/26

(58) Field of Classification Search
USPC ........................................................ 726/26
See application file for complete search history.

(56) References Cited

U.S. PATENT DOCUMENTS

| | | | |
|---|---|---|---|
| 4,634,148 A | 1/1987 | Greene | |
| 5,093,787 A | 3/1992 | Simmons | |
| 5,267,753 A | 12/1993 | Chock | |
| 5,326,136 A | 7/1994 | Doyle | |
| 6,073,121 A | 6/2000 | Ramzy | |
| 6,086,708 A | 7/2000 | Colgate, Jr. | |
| 6,978,927 B2 | 12/2005 | Latimer et al. | |
| 7,040,539 B1 | 5/2006 | Stover | |
| 2002/0029194 A1 | 3/2002 | Lewis et al. | |
| 2002/0032648 A1 | 3/2002 | Pine et al. | |
| 2002/0062438 A1 | 5/2002 | Asay et al. | |
| 2002/0128925 A1* | 9/2002 | Angeles | 705/26 |
| 2002/0184152 A1 | 12/2002 | Martin | |
| 2003/0014628 A1* | 1/2003 | Freed et al. | 713/155 |
| 2004/0010466 A1 | 1/2004 | Anderson | |
| 2004/0083140 A1 | 4/2004 | Browning et al. | |

(Continued)

OTHER PUBLICATIONS

Gallagher, J. "St. Louis Post-Dispatch Personal Finance Column," St. Louis Post-Dispatch, Jul. 20, 1996, 3 pages.

(Continued)

*Primary Examiner* — Yogesh Paliwal
(74) *Attorney, Agent, or Firm* — Nixon Peabody LLP

(57) ABSTRACT

A computer implemented method, a computer system or a nontransitory computer readable storage medium having an HTTP module is provided. The method, system or medium may be configured for use with a device having one or more processors and a memory storing one or more programs for execution by the one or more processors, the one or more programs may include instructions for processing information from multiple web sites served up from a web application, binding multiple secure socket layer (SSL) certificates to a single site supported by the web application, hosting the SSL certificates using an SSL accelerator, and intercepting incoming requests relayed from the SSL accelerator to the web application with the HTTP module. The method, system or medium may be configured for use with an identity management system that uses human knowledge and experience and computer software programs and databases to anticipate forms of identity-related fraud.

42 Claims, 36 Drawing Sheets

(56) References Cited

U.S. PATENT DOCUMENTS

| | | | |
|---|---|---|---|
| 2004/0236965 A1* | 11/2004 | Krohn | 713/201 |
| 2006/0122933 A1 | 6/2006 | Browning et al. | |
| 2006/0145469 A1 | 7/2006 | Lubrino et al. | |
| 2007/0041626 A1* | 2/2007 | Weiss et al. | 382/131 |
| 2012/0109691 A1 | 5/2012 | Thomas et al. | |
| 2012/0109854 A1 | 5/2012 | Thomas et al. | |

OTHER PUBLICATIONS

Paymaster Technologies, Inc., Testimonials, Jul. 2, 2007, 2 pages. Source: http://web.archive.org/web/20010728131650/http://www.paymastertech.com/test.html.

Werbeck, R., "Bad-check Writer Gets 8-year Term Still has to Face Charges in 4 More Counties, 2 states:[Final Edition]," The Journal Gazette. Journal—Gazette. Ft. Wayne, Ind.: Oct. 30, 2001. p. 1A, 3 pages.

"Enforcement of New law Boosts Bad-check Recoveries," Arizona Daily Star, Tucson, Ariz.: Nov. 5, 1995, p. 3B, 3 pages.

Rumbach, D. "Forum Tackles Issue of Identity Theft; Guard Your Numbers and Check Your Statements, Experts Warn," South Bend Tribune, South Bend, Ind.:Jul. 26, 2002. p. 1, 3 pages.

Sherfield, C. "Take Steps to Ward Off those Who Steal Funds for Presents," Nashville Banner, Dec. 18, 1997, 2 pages.

Office Action in U.S. Appl. No. 10/685,206, mailed Jul. 13, 2007.
Office Action in U.S. Appl. No. 10/685,206, mailed Sep. 3, 2008.
Office Action in U.S. Appl. No. 10/685,206, mailed Dec. 7, 2009.
Office Action in U.S. Appl. No. 10/685,206, mailed Aug. 9, 2010.
Office Action in U.S. Appl. No. 10/685,206, mailed Nov. 10, 2011.
Office Action in U.S. Appl. No. 10/685,206, mailed May 18, 2012.
Office Action in U.S. Appl. No. 11/328,362, mailed Mar. 17, 2008.
Office Action in U.S. Appl. No. 11/328,362, mailed Dec. 8, 2008.
Office Action in U.S. Appl. No. 11/328,362, mailed May 3, 2011.
Office Action in U.S. Appl. No. 11/328,362, mailed Oct. 4, 2012.
U.S. Appl. No. 13/539,285, filed Jun. 29, 2012.

Symantec 2010 SMB Information Protection Survey, Global Data, Jun. 2010, 50 pages. Source: http://www.symantec.com/content/en/us/about/media/pdfs/SMB_ProtectionSurvey_2010.pdf.

United States Department of Health and Human Services. OCR Privacy Brief: Summary of the HIPAA Privacy Rule. May 2003, 23 pages. Source: http://www.hhs.gov/ocr/privacy/hipaa/understanding/summary/privacysummary.pdf.

Thompson, Mozelle W. et al., US/EU Safe Harbor Agreement: What It Is and What It Says About the Future of Cross Border Data Protection. Spring 2003, 7 Pages. Source: http://www.ftc.gov/speeches/thompson/thompsonsafeharbor.pdf.

PCI Security Standards Council. At a Glance: Standards Overview. Payment Card Industry Security Standards. Jun. 2008, 2 Pages. Source: https://www.pcisecuritystandards.org/pdfs/pcissc_overview.pdf.

W3C Recommendation, SOAP Version 1.2 Part 0: Primer (Second Edition). Apr. 27, 2007, 41 Pages. Source: http://www.w3.org/TR/2007/REC-soap12-part0-20070427/.

Tilkov, Stefan, A Brief Introduction to REST. Dec. 10, 2007, 27 pages. Source: http://www.infoq.com/articles/rest-introduction.

MSDN, .NET Framework 4.5: What is Windows Communication Foundation. Aug. 2, 2012, 5 pages. Source: http://msdn.microsoft.com/en-us/library/ms731082.aspx.

MSDN, IIS 6.0: Internet Information Services (IIS) 6.0 SDK. Retrieved Nov. 16, 2012, 2 pages. Source: http://msdn.microsoft.com/en-us/library/ms525568(v=vs.90).aspx.

AICPA, Statements on Auditing Standards. Retrieved Nov. 16, 2012, 9 pages. Source: http://www.aicpa.org/Research/Standards/AuditAttest/Pages/SAS.aspx.

Notice of Allowance in U.S. Appl. No. 10/685,206, mailed Oct. 9, 2012.

* cited by examiner

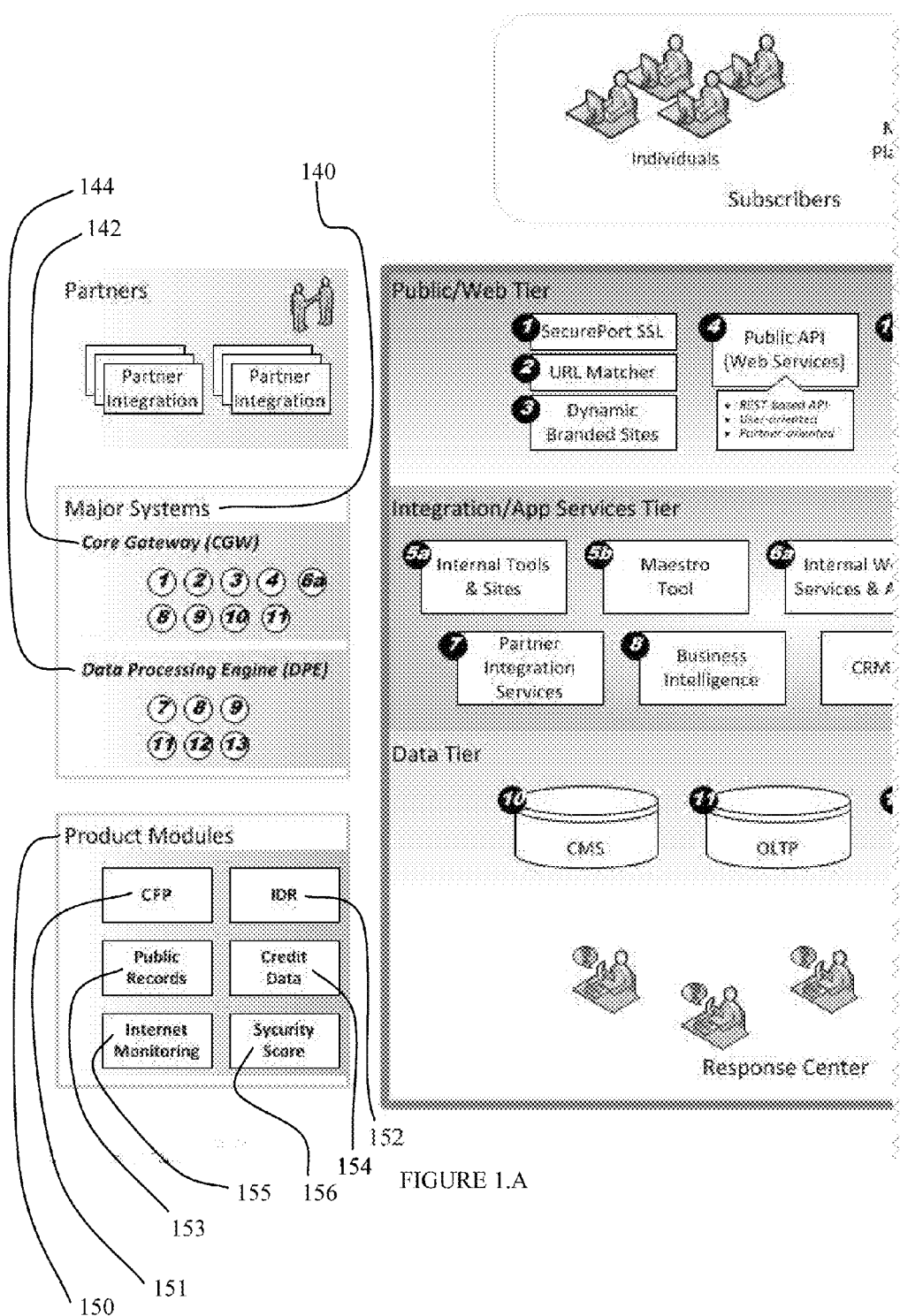
FIGURE 1.A

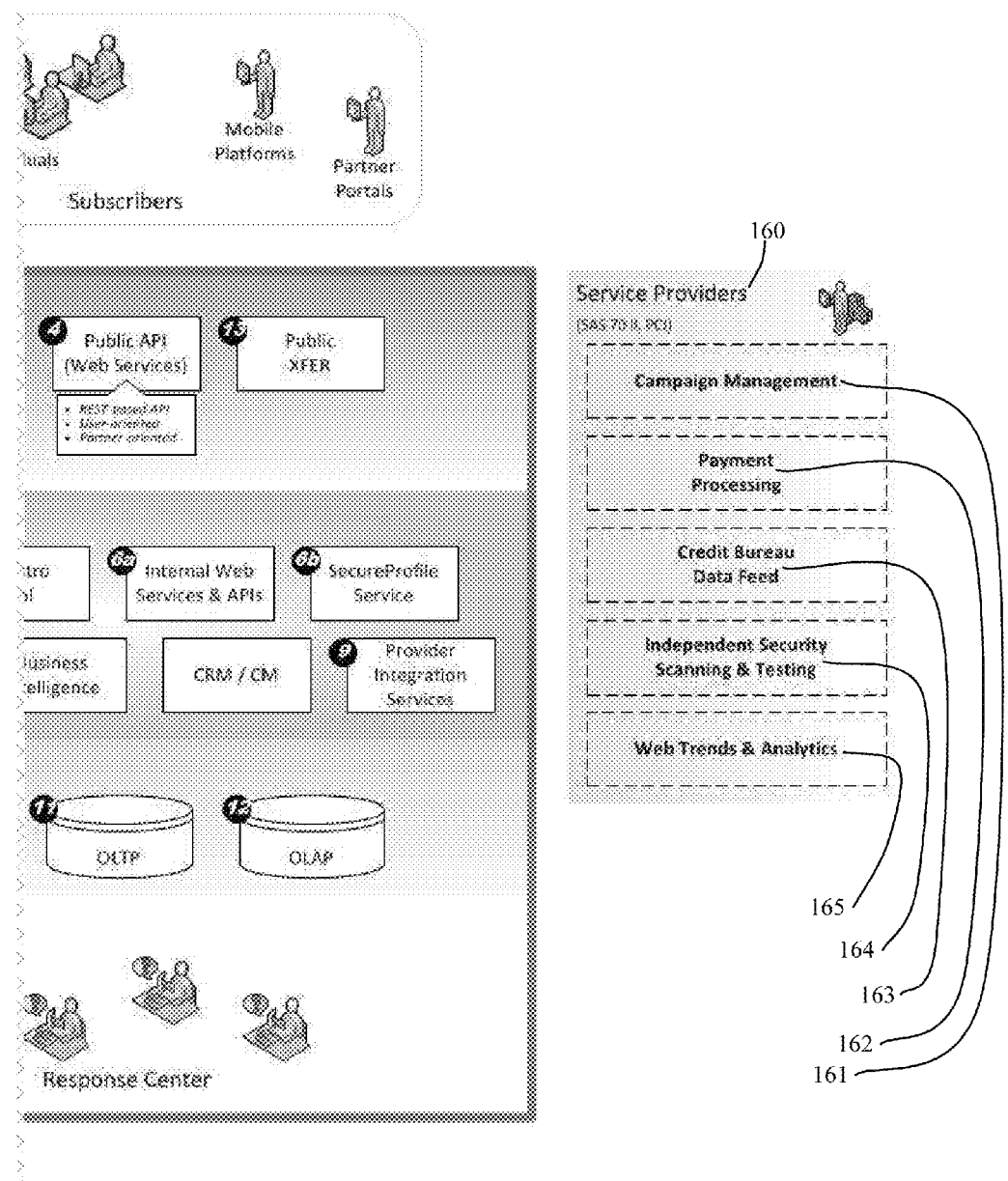
FIGURE 1.B

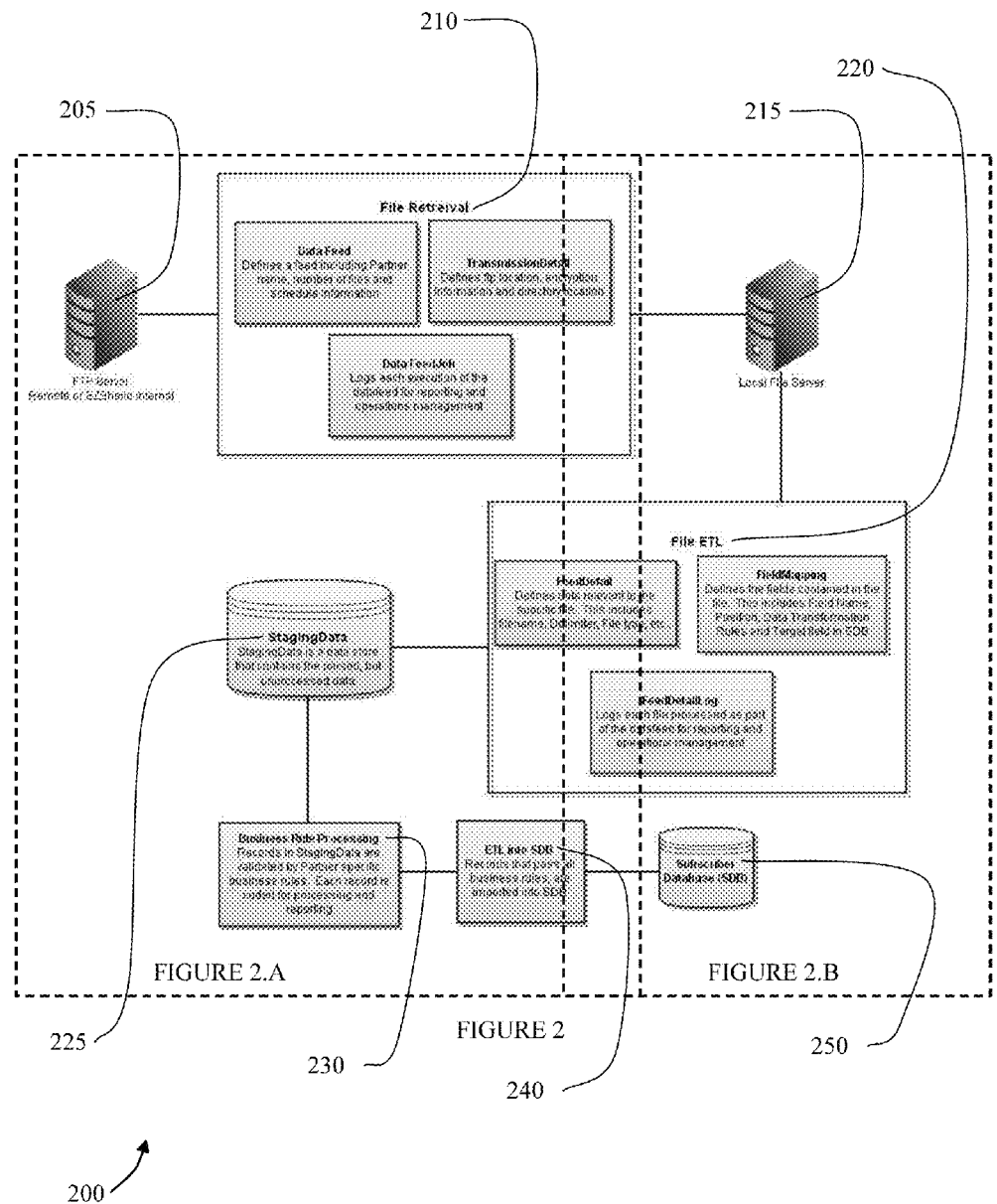

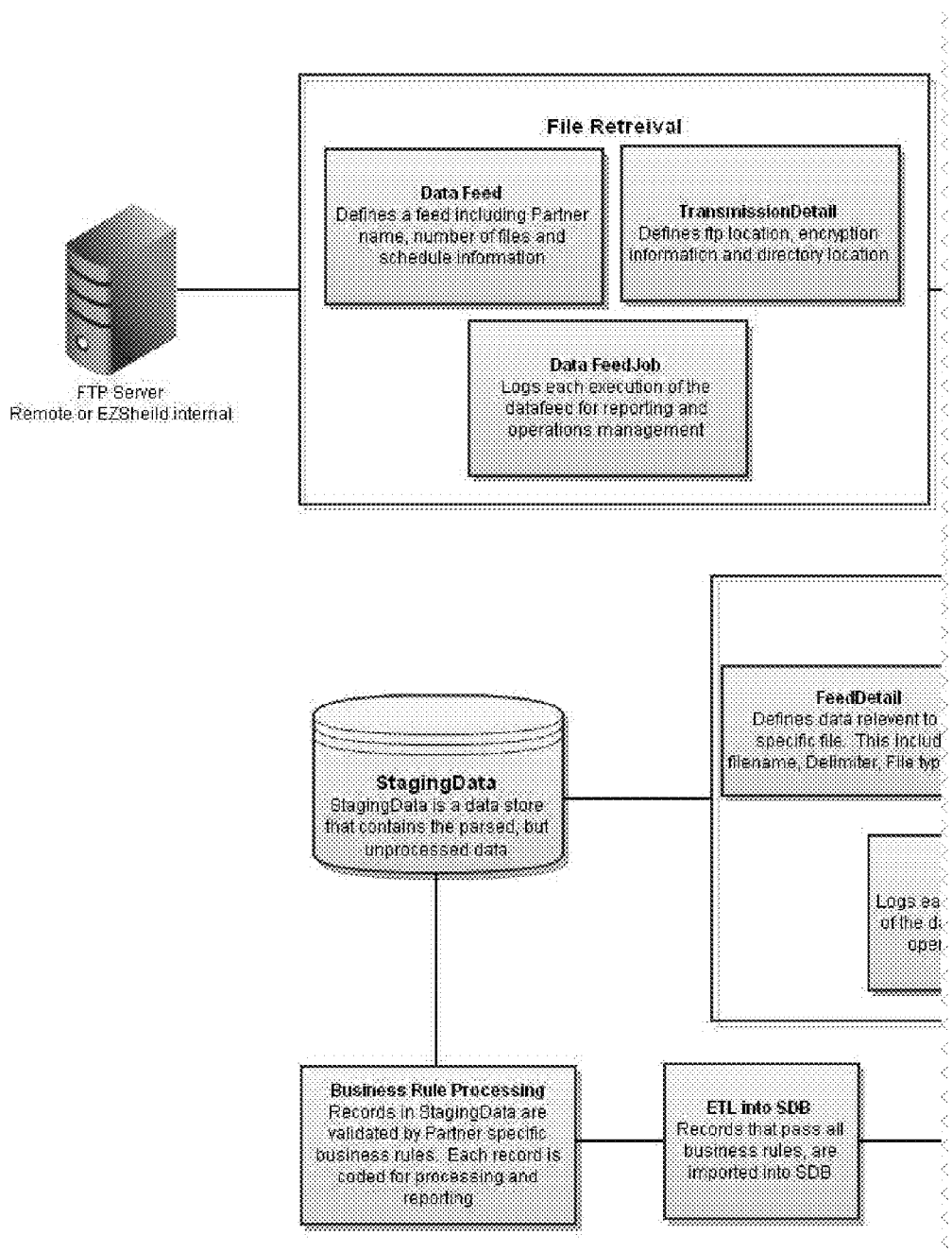
FIGURE 2.A

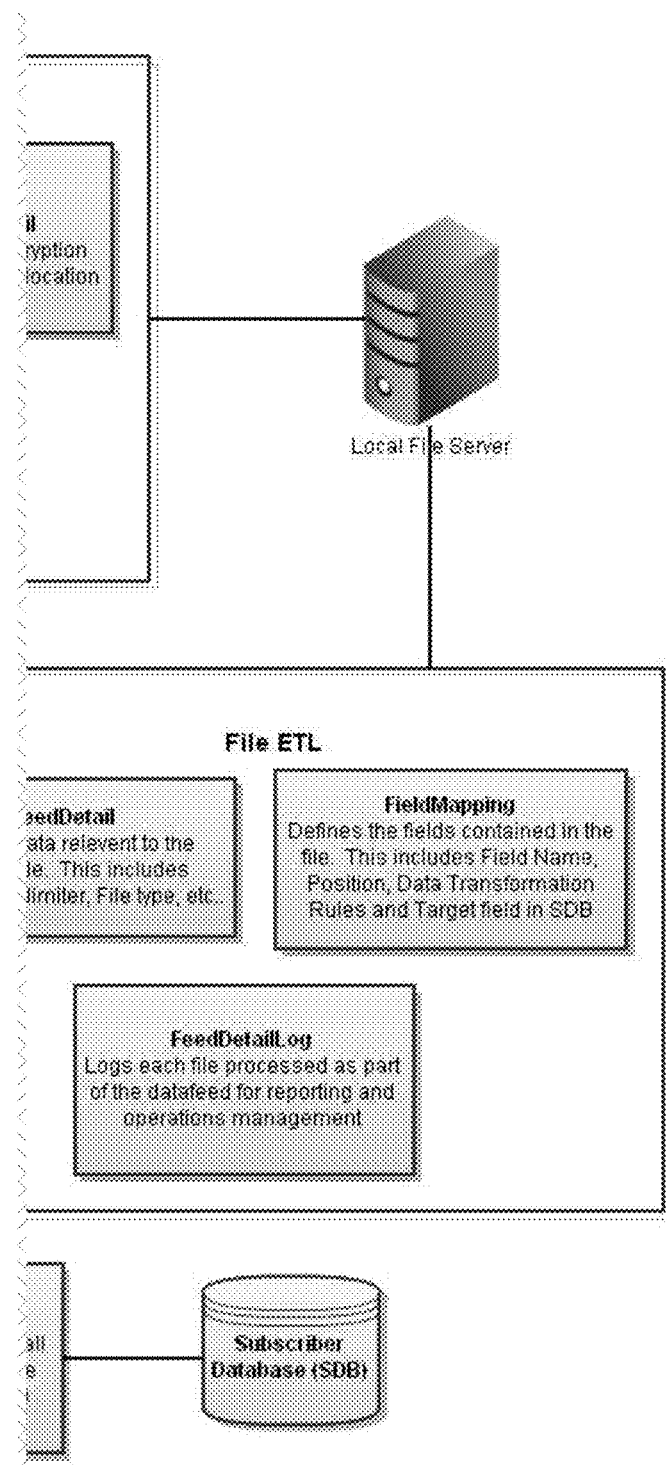
FIGURE 2.B

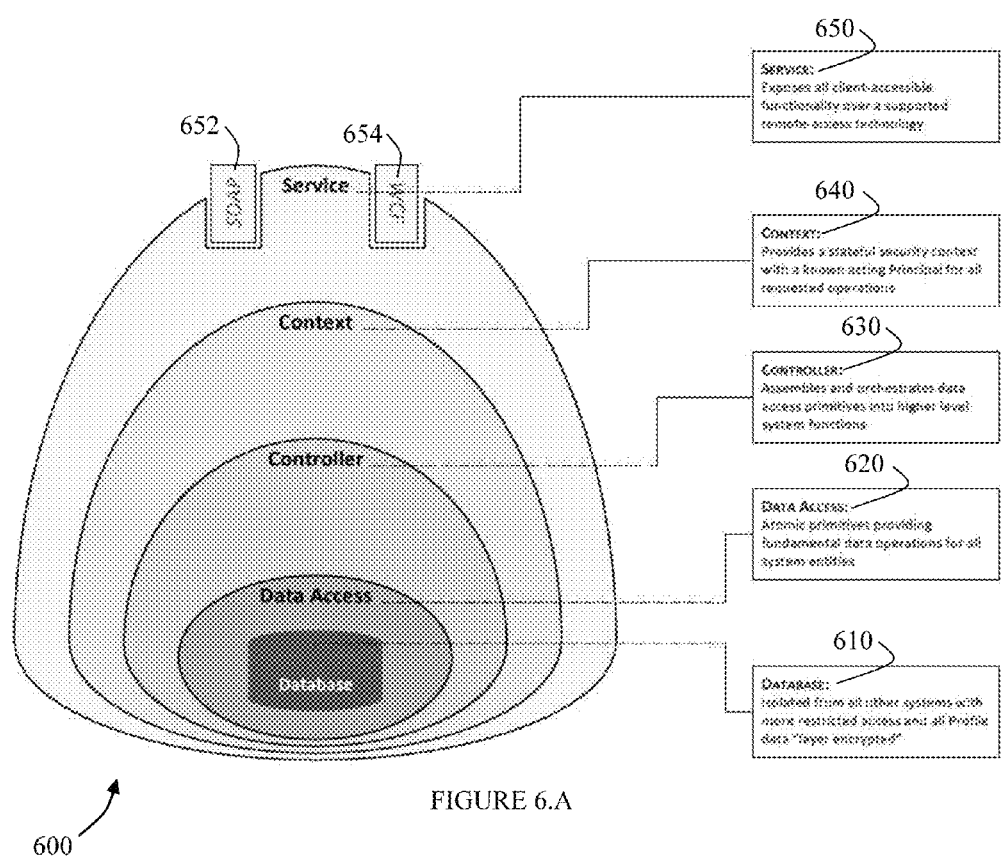
FIGURE 6.A

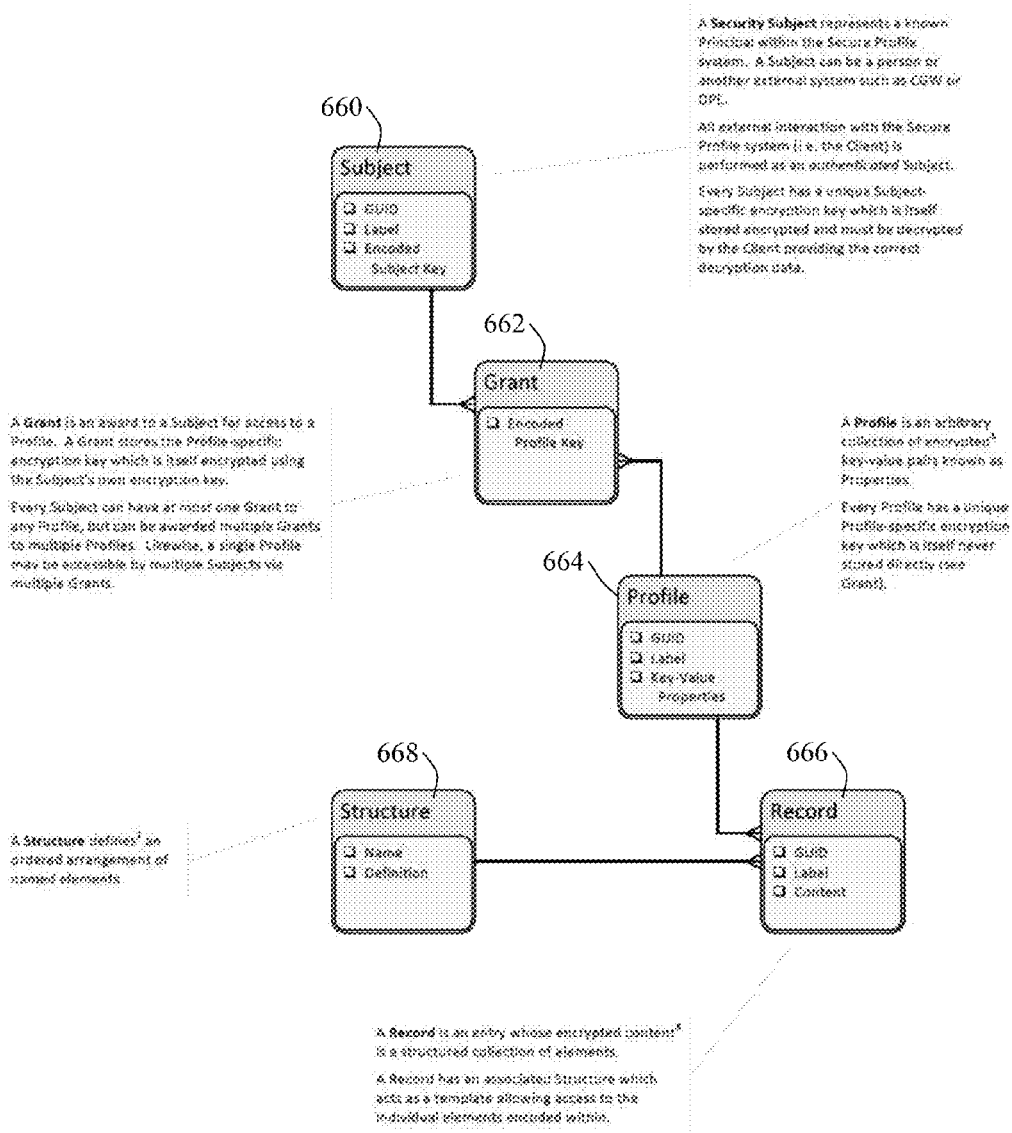
FIGURE 6.B

FIGURE 7.A

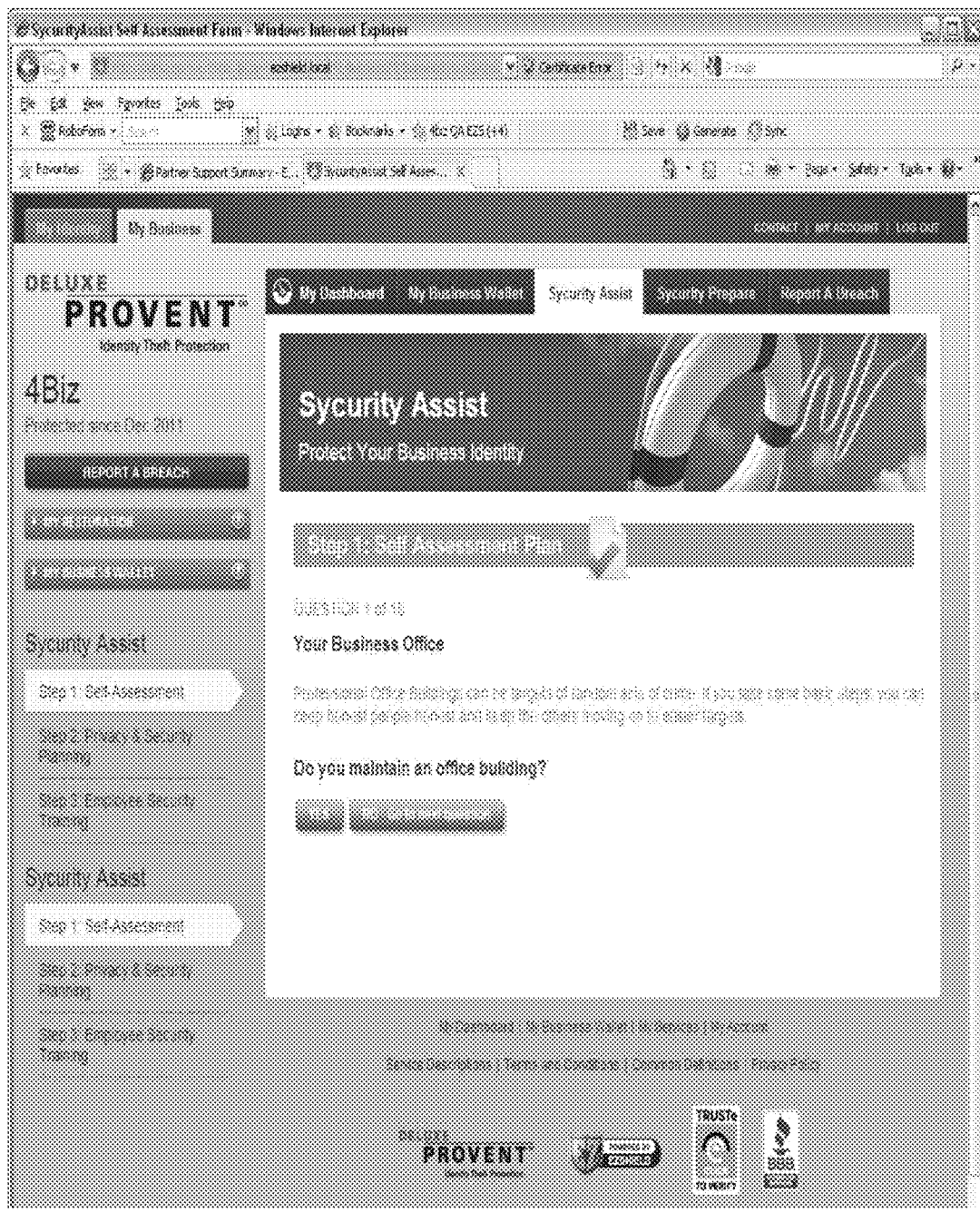
FIGURE 7.B

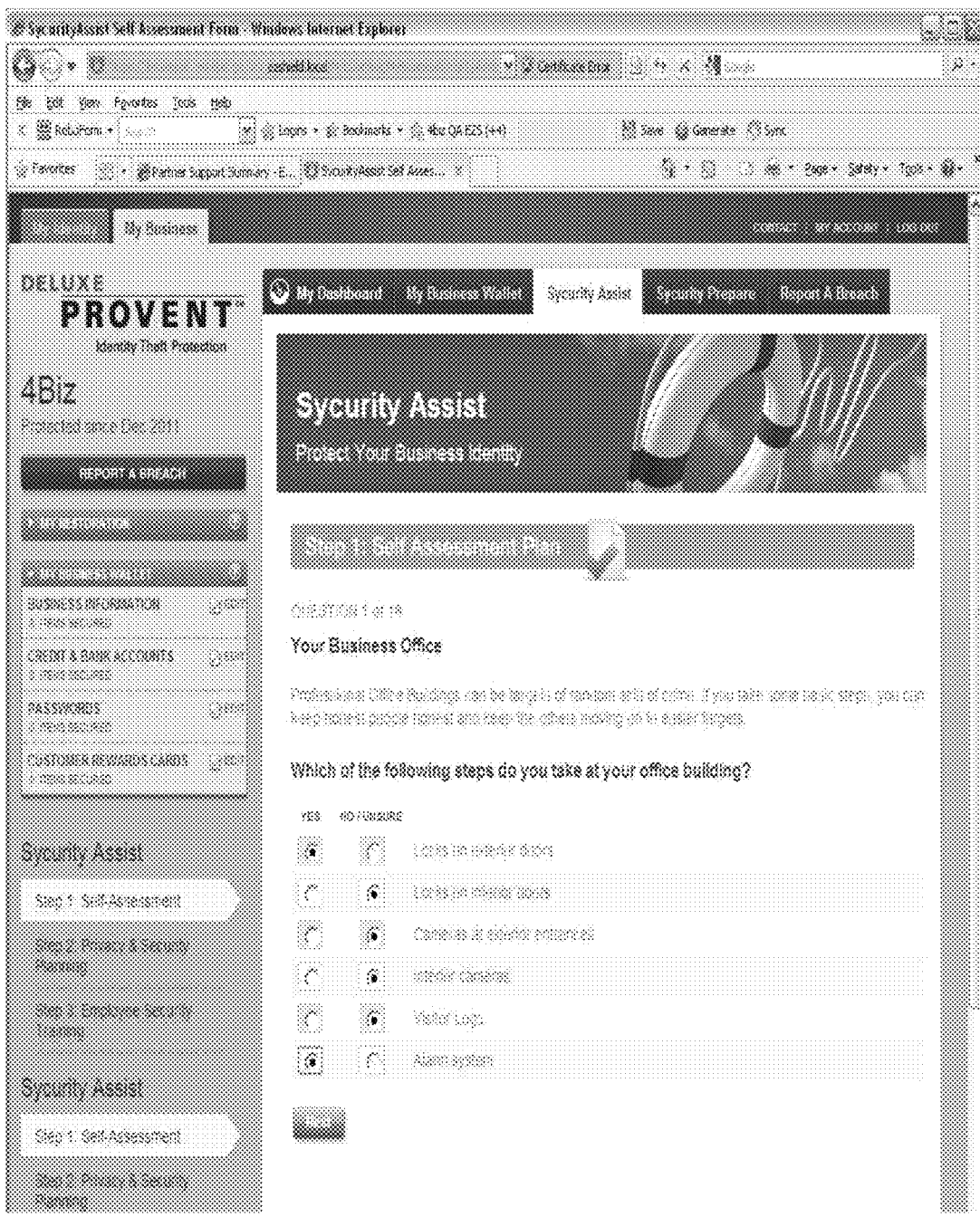
FIGURE 7.C q1 - (9)
q1-1 (3)
q1-2 (1)
q1-3 (4)  x
q1-4 (1)  x q2 - (6)
q2-1 (1)  x
q2-2 (1)  x
q2-3 (1)
q2-4 (1)
q2-5 (1)  x
q2-6 (1)

total possible - 9(q1) + 6(q2)

affirmative- 5  + 3

8/15          =.53 = 53% = Tier3

FIGURE 7.D question1 (general action text)

question 1 - 3        (more specific action text)

question 1 - 4        (more specific action text)

question 2 - (general action text)

question 2 - 1        (more specific action text)

question 2 - 2        (more specific action text)

question 2 - 5        (more specific action text)

FIGURE 7.E

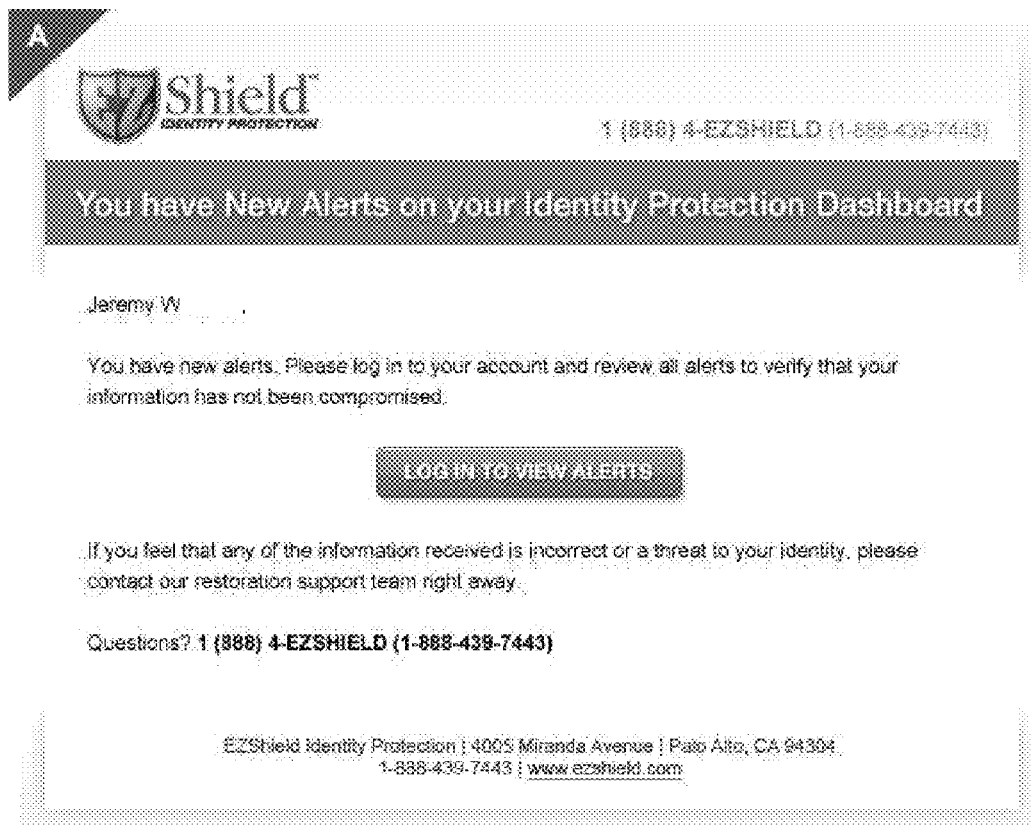
FIGURE 9.A
FIGURE 9.B

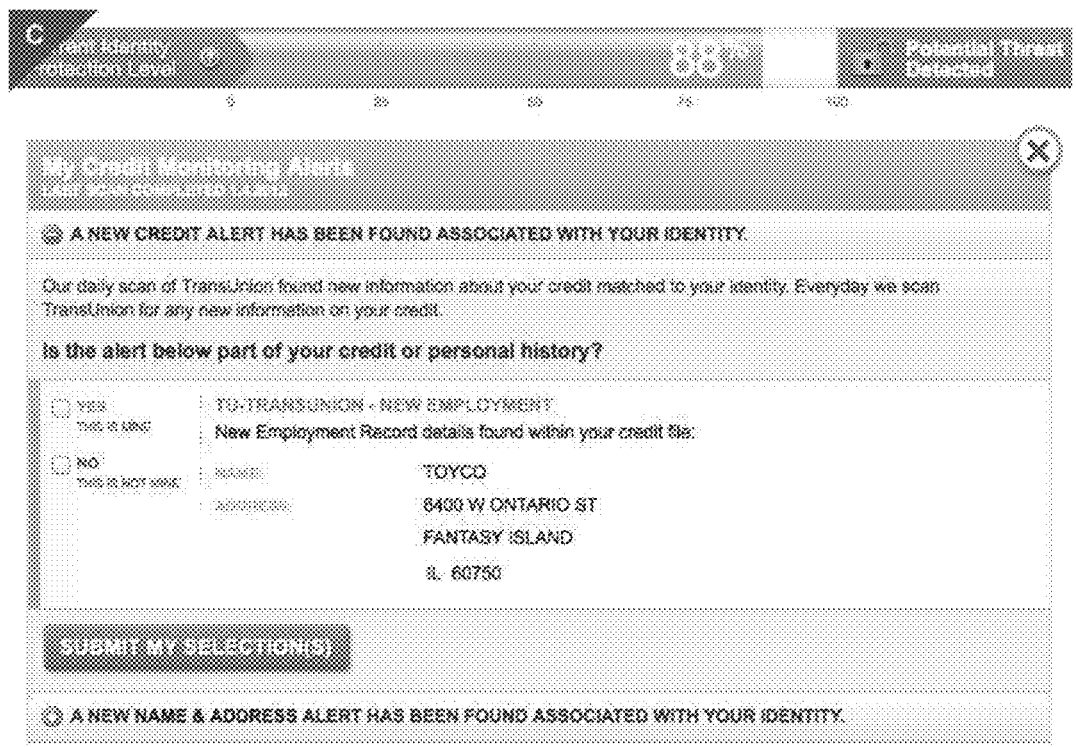
FIGURE 9.C

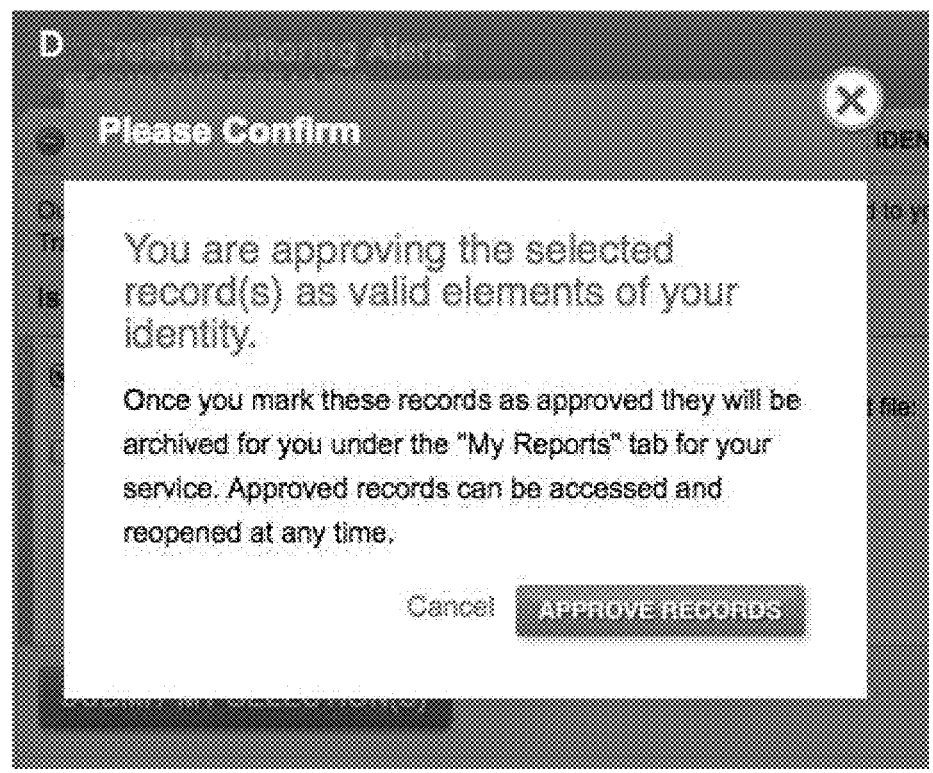
FIGURE 9.D

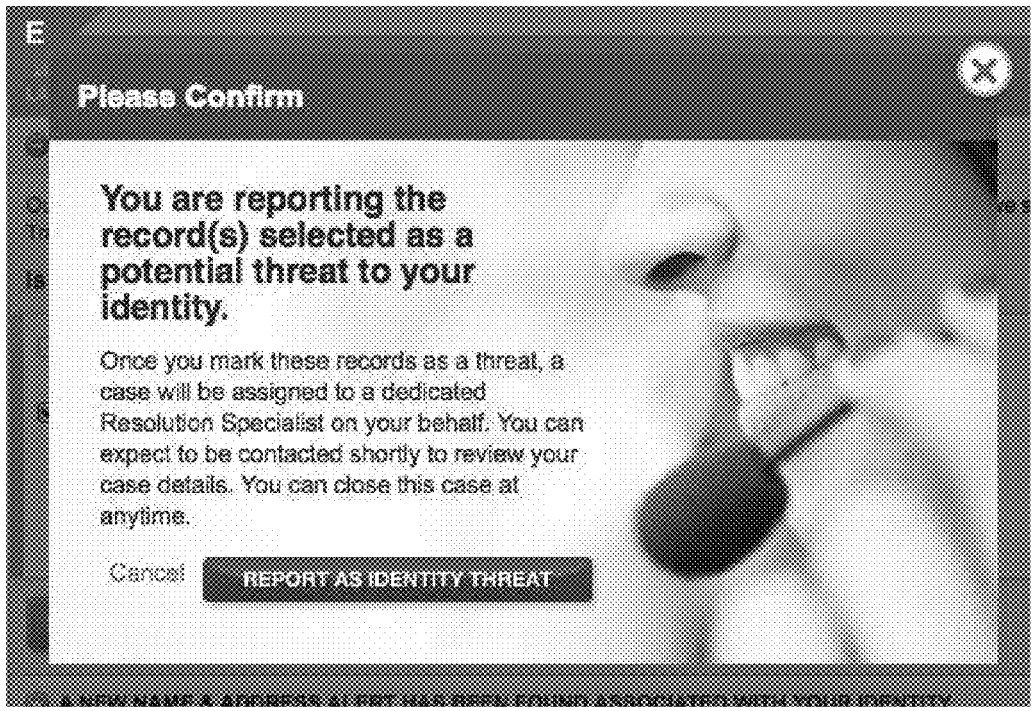
FIGURE 9.E
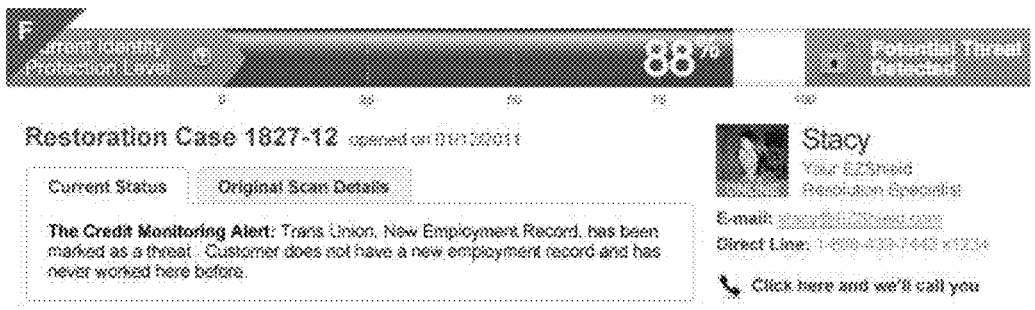
FIGURE 9.F

FIGURE 9.G

FIGURE 9.H

FIGURE 9.I

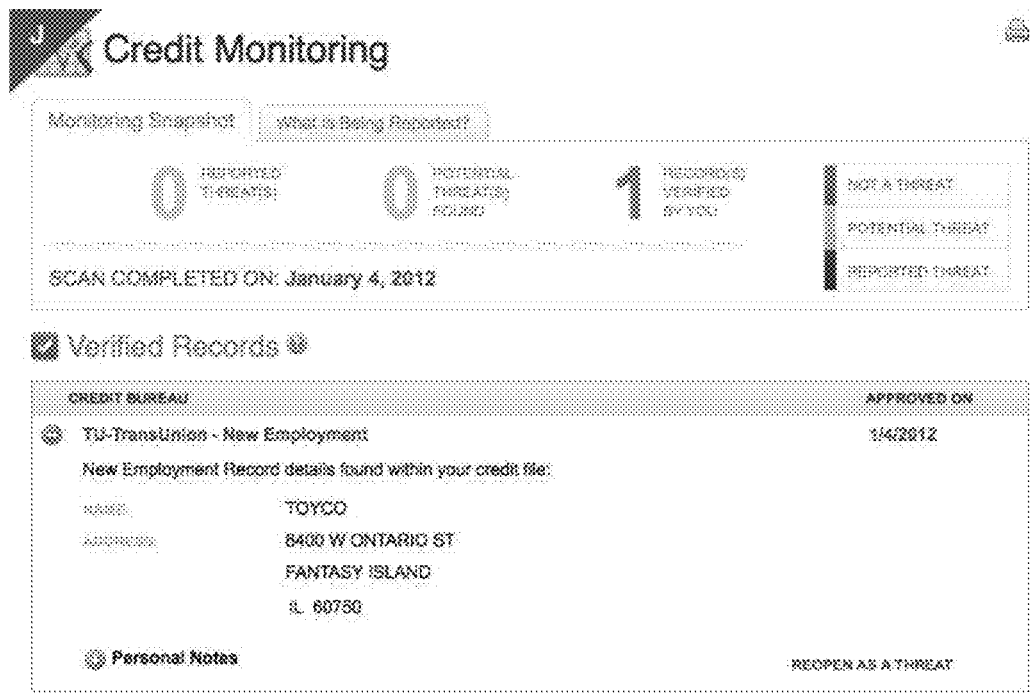
FIGURE 9.J

FIGURE 9.K

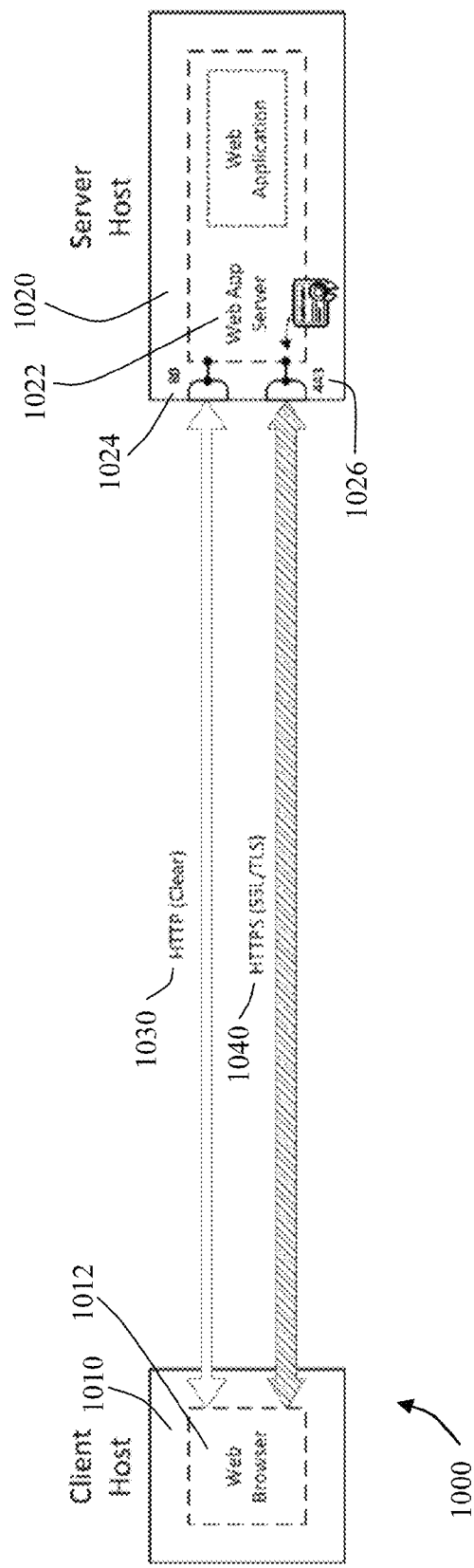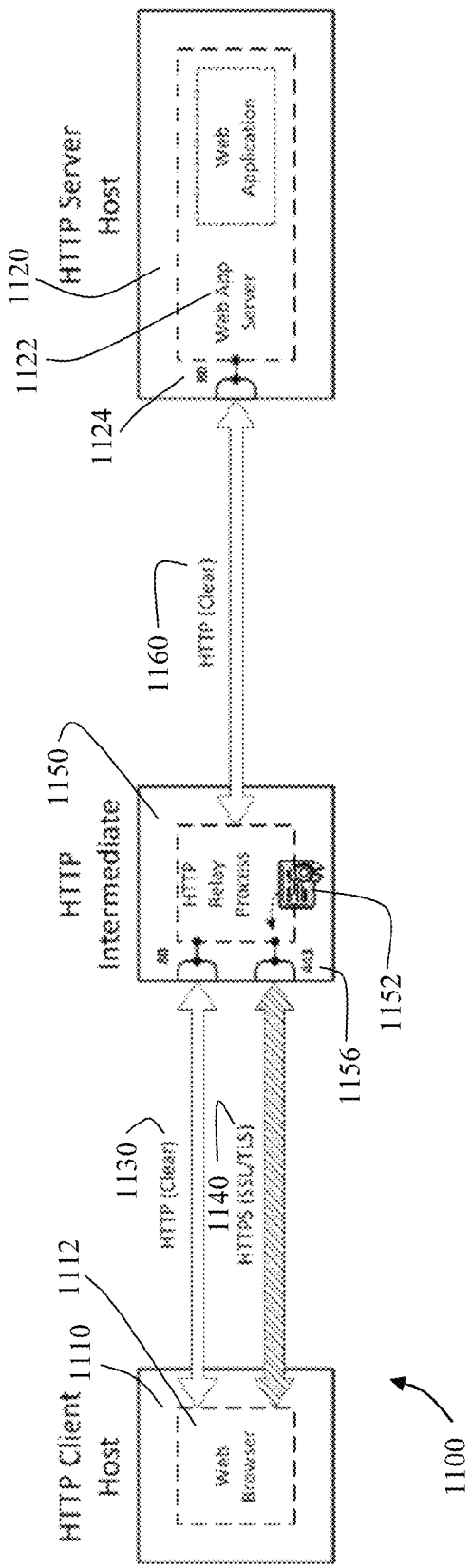
FIGURE 10
FIGURE 11

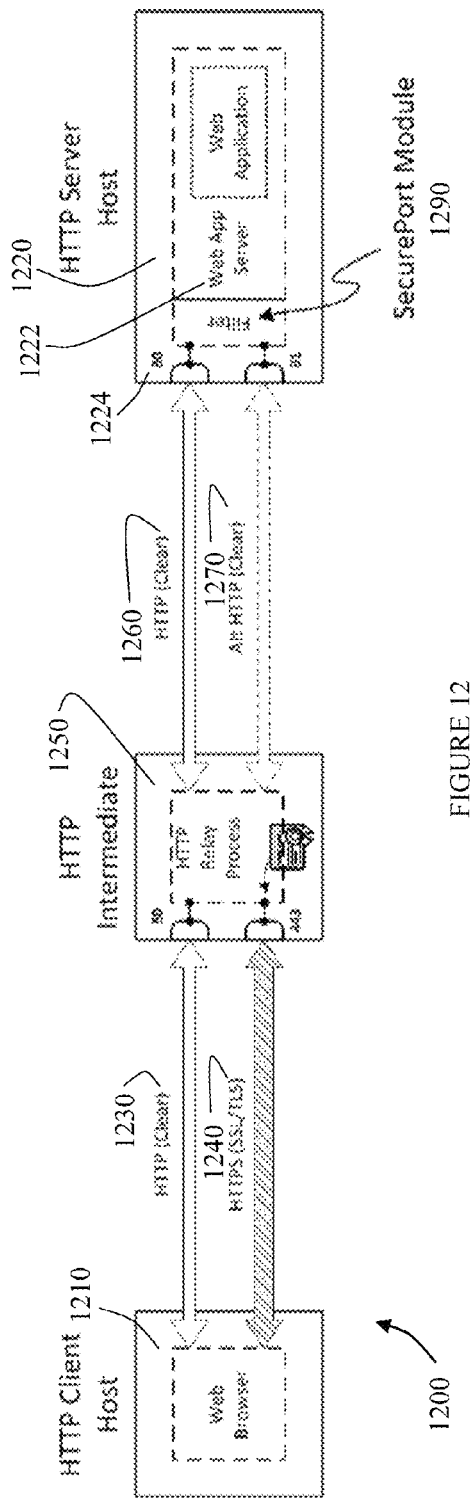
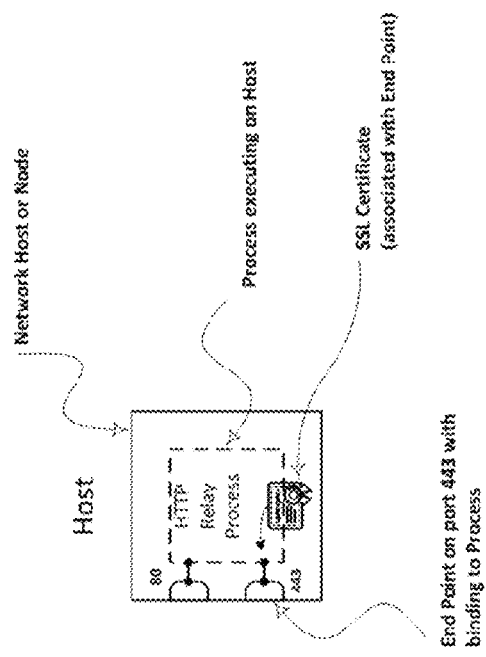
FIGURE 12
FIGURE 13

| # | Not | Match UrlPart | UrlPart Arg | Match Value/Regex & Options | | Action | Action UrlPart | Action Value/ActionRegex | Rule Path |
|---|---|---|---|---|---|---|---|---|---|
| 0 | | Path | | Val | /reloadurls.vanity | ReloadConfig | | | /0 |
| 1 | | Path | | Rgx | \.vanity$ [5] [1] | MatchRules | | | /1 |

1610

| # | Not | Match UrlPart | UrlPart Arg | Match Value/Regex & Options | | Action | Action UrlPart | Action Value/ActionRegex | Rule Path |
|---|---|---|---|---|---|---|---|---|---|
| 0 | | Path | | Rgx | ^(.+)\.vanity$ [1] | Continue | Path | $1 | /1/0 |
| 1 | | Path | | Val | /emptyfolder [5] | Rewrite | Path | /empty_folder/default.htm | /1/1 |
| 2 | | Path | | Val | /defaspx [5] | Rewrite | Path | /Default.aspx | /1/2 |
| 3 | | Path | | Val | /searchhttp [5] | Redirect | | http://www.google.com/search?q=HTTP+Protocol | /1/3 |
| 4 | | Path | | Val | /starthere [5] | Redirect | PathAndQuery | /Default.aspx?tabname=foobar | /1/4 |
| 5 | | IsLocal | | Val | true [5] | MatchRules | | | /1/5 |

1620

| # | Not | Match UrlPart | UrlPart Arg | Match Value/Regex & Options | | Action | Action UrlPart | Action Value/ActionRegex | Rule Path |
|---|---|---|---|---|---|---|---|---|---|
| 0 | | Path | | Val | /helpme | ShowHelp | | | /1/5/0 |
| 1 | | Path | | Val | /showconfig [5] | ShowConfig | | | /1/5/1 |
| 2 | | Path | | Val | /google [5] | Redirect | Val | http://www.google.com/ | /1/5/2 |
| 3 | | | | Rgx | . [1] | Continue | | | /1/5/3 |

1630

| | | | | | | | | | |
|---|---|---|---|---|---|---|---|---|---|
| 6 | | Path | | Rgx | ^(.*)$ [1] | Redirect | Path | $1/ | /1/6 |

COMPUTER IMPLEMENTED METHOD, COMPUTER SYSTEM AND NONTRANSITORY COMPUTER READABLE STORAGE MEDIUM HAVING HTTP MODULE

CROSS-REFERENCE TO RELATED APPLICATIONS

This application claims the benefit of, and priority to, U.S. Provisional Patent Application Ser. No. 61/584,745, filed on Jan. 9, 2012, entitled "IDENTITY MANAGEMENT SYSTEM AND METHOD," the entire disclosure of which is hereby incorporated herein by reference.

TECHNICAL FIELD

A computer implemented method, computer system and nontransitory computer readable storage medium having an HTTP module is provided. The method, system and storage medium may be configured for an identity management system. The identity management system may be configured for identity theft protection.

BRIEF SUMMARY

In one embodiment, a computer implemented method, a computer system or a nontransitory computer readable storage medium having an HTTP module is provided. The method, system or medium may be configured for use with a device having one or more processors and a memory storing one or more programs for execution by the one or more processors, the one or more programs may include instructions for processing information from multiple web sites served up from a web application, binding multiple secure socket layer (SSL) certificates to a single site supported by the web application, hosting the SSL certificates using an SSL accelerator, and intercepting incoming requests relayed from the SSL accelerator to the web application with the HTTP module.

In another embodiment, an identity management system and method is provided that uses human knowledge and experience and computer software programs and databases to anticipate forms of identity-related fraud. The identity management system facilitates the provision of affordable and effective products and services that help protect a customer's identity, on multiple fronts, on an ongoing basis. (The term "customer" may include a person, a group of people, a family, an organization, a corporation or any potential person or entity requiring identity management services.) The identity management system provides protection services that extend well beyond credit monitoring to address the entire spectrum of identity fraud sources including online hacking, mail fraud, credit cards, checks, public records, memberships and several others. The identity management system monitors activity associated with a customer's identity and makes available to the customer a set of reports and alerts about activity that may indicate identity theft or misrepresentation. In performing and displaying an identity theft protection service, the identity management system securely reviews and stores at least one or more of the following Protected Identity Elements: individual name(s), street address(es), e-mail address(es), telephone number(s), Social Security Number(s) and bank account or credit card number(s).

The identity management system employs Internet Monitoring, which searches certain data and records available on the Internet to identify any known risks involving the customer's Protected Identity Elements. The identity management system may include Credit Monitoring, which provides credit report monitoring using one or more bureaus and monitors "pay day" loans. The identity management system may include Public Records Monitoring, which monitors U.S. Postal Service (USPS) Changes of Address, Court Records, and Sex Offender Registries. The identity management system may include Name and Address Monitoring, which monitors a Customized Name, an Alias List and Customized Known Address List.

The service sends immediate email notifications when a change is reported on any of the monitors to which the customer subscribes. In addition, if the customer has no changes during the month, the identity management system may be adapted to send a courtesy email reminding the customer that the service is still active on behalf of the customer and pointing the customer to educational information about Identity Theft prevention and trends.

The identity management system performs its functions without a need for access to a customer's credit information. The customer is sent updates when there are changes in credit information but the identity management system will not be notified of the nature of such changes.

The identity management system permits customers to report any activity that is of concern through an Internet-based reporting system or by calling a Resolution Specialist via telephone.

To facilitate understanding of the identity theft protection system in its full context, the present specification includes the following:

I. Identity Management System Architecture
   II. Glossary of Terms
   The identity management system may comprise one or more of the following subsystems:
   III. Core Gateway (CGW)
   IV. Data Processing Engine (DPE)
   V. Subscriber Database (SDB)
   VI. Secure Profile
   VII. Secure Port Secure Sockets Layer (SSL)
   VIII. URL Matcher
   IX. Breach Solutions
   X. Identity Alert Management (Interaction with Client Alert to Resolution Specialist)

In some embodiments, an identity management system is provided comprising: a core gateway system, wherein the core gateway is configured to provide support for special offer codes and source codes that enable special pricing or promotional discounts, offer promotional trial periods on certain products, or identify a marketing channel used to attract the customer.

In some embodiments, an identity management system is provided comprising: a core gateway including: a self-service system; a core function system; a content and skinning; a product and catalog system; a partner integration system; a central manager; and an affiliate management system, wherein the core gateway is configured to provide support for special offer codes and source codes that enable special pricing or promotional discounts, offer promotional trial periods on certain products, or identify a marketing channel used to attract the customer.

In some embodiments, an identity management system is provided comprising: An identity management system comprising: a core gateway; a data processing engine; and a subscriber database.

In some embodiments, an identity management system is provided comprising a secure profile system. In some embodiments an identity management system is provided comprising a system for binding multiple SSL certificates to a single Microsoft IIS site.

In some embodiments an identity management system is provided comprising a URL matcher to support vanity URLs on the core gateway.

In some embodiments an identity management system is provided comprising a breach prevention system.

In some embodiments an identity management system is provided comprising an identity alert management system for interaction between a customer and a resolution specialist.

In another aspect, a core gateway system is provided comprising: a customer tools system; a self-service system; a core function system; a content and skinning system; a product and catalog system; a partner integration system; a central manager; and an affiliate management system.

In a further aspect, a data processing engine is provided comprising: a file retrieval system; a file parsing and staging system; a business rule processing system; and a record extract, transform and load system linked to the subscriber database.

In some embodiments, a data processing engine is provided comprising: a first server; a file retrieval system connected to the first server; a second server connected to the file retrieval system; a file extract, transform and load system connected to the second server; a staging data system connected to the file extract, transform and load system; a business rule processing system connected to the staging data system; and a system for importing records that pass through the business rule processing system into the subscriber database.

In another aspect a breach solutions system is provided comprising the breach prevention system comprising: an assist module; and a prepare module. In some embodiments, the assist module comprises: a self-assessment system; and a score system. The self-assessment system may comprise a series of questions pertaining to policies and procedures based on customer's industry and the personally identifiable information collected by the customer. In some embodiments the score system comprises: a system for assigning weights for each of the questions; a system for calculating a risk score based on the weights for each of the questions and the answers provided by the customer; and a system for assigning the calculated risk score to a tiered scoring system. The prepare module may comprise: a customer assist system; a system for identifying a data breach victim's contact information and data transfer protocol; a system for notifying breach victims or others of the subject data breach by a communication means that conforms with laws applicable to the customer's jurisdiction; a system for providing recommendations of notification based on current state and federal incident response regulations; a system for providing assistance with notification messaging and customer call center scripting; a system for managing the breach response; a system for providing breach victims customer-sponsored access to a heightened level of service; and a defined system for notification of costs.

In a further aspect, a method of identity alert management for interaction between a customer and a resolution specialist is provided, comprising the steps of: identifying personally identifiable information against elements of a customer's identity; automatically sending a communication to the customer within a specified time period; authenticating the customer through a secure identity management dashboard; permitting the customer to review a source of the alert and details associated with the alert; prompting the customer to mark the alert as a threat or not a threat; sending a record of the threat to an approved records system if the customer marks the alert as not a threat; creating a case if the customer marks the alert as a threat; permitting the user to execute a power of attorney prior to, during or after the threat has been detected; ascertaining whether the customer has executed the power of attorney; providing a first response system for customers that have executed the power of attorney; providing a second response system for customers that have not executed the power of attorney; and permitting the customer or the resolution specialist to reopen a previously approved record.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein.

In the drawings, where like reference numerals refer to like reference in the specification:

FIG. 2 shows one example of a Data Processing Engine (DPE) of an identity management system according to some embodiments of the present disclosure, where FIG. 2.A is the left side of the figure and where FIG. 2.B is the right side of the figure;

FIG. 6.B shows Primary Entity Definitions for one example of the Secure Profile system according to some embodiments of the present disclosure;

FIG. 6.C illustrates one example of Applied Encryption for the Secure Profile system of an identity management system according to some embodiments of the present disclosure;

FIGS. 7.A, 7.B and 7.C are screenshots illustrating various aspects of a Security Assist Assessment of an identity management system according to some embodiments of the present disclosure;

FIG. 7.D illustrates one example of a Data Diagram for Score Calculation using the Security Assist system according to some embodiments;

FIG. 7.E shows one example of a Data Diagram for Action Plan Associations using the Security Assist system according to some embodiments;

FIG. 9.A shows one example of a potential threat email notification according to some embodiments of the Identity Alert Management system;

FIG. 9.B is one example of a dashboard including an alert according to some embodiments of the Identity Alert Management system;

FIG. 9.C illustrates one example of a screenshot including a review of a new potential threat according to some embodiments of the Identity Alert Management system;

FIG. 9.D shows one example of a popup window where a potential threat is marked as approved according to some embodiments of the Identity Alert Management system;

FIG. 9.E illustrates one example of a popup window where a potential threat is marked as an actual threat according to some embodiments of the Identity Alert Management system;

FIG. 9.F is one example of a screenshot indicating that a case has been created in the Identity Alert Management system according to some embodiments;

FIG. 9.G shows one example of a screenshot that may appear when the customer has signed a power of attorney according to some embodiments of the Identity Alert Management system;

FIG. 9.H illustrates one example of a screenshot that may appear when the customer has not signed a power of attorney according to some embodiments of the Identity Alert Management system;

FIG. 9.I shows one example of a screenshot that may appear prompting the user to close a case or keep the case active according to some embodiments of the Identity Alert Management system;

FIG. 9.J illustrates one example of a screenshot that may appear showing verified records according to some embodiments of the Identity Alert Management system;

FIG. 9.K illustrates an example of a popup window that may appear prompting a user to confirm reopening of a threat according to some embodiments of the Identity Alert Management system;

FIG. 10 illustrates one example of basic web interaction between client and server hosts;

FIG. 11 illustrates one example of virtual hosting and HTTPS complications associated with the same;

FIG. 12 illustrates one example of request filtering and a SecurePort module;

FIG. 13 is a symbol key for FIGS. 10-12;

FIG. 16 illustrates a sample configuration of Rules that may be used in the URL matcher request processing system and method.

DETAILED DESCRIPTION

I. Identity Management System Architecture

Figure 1:
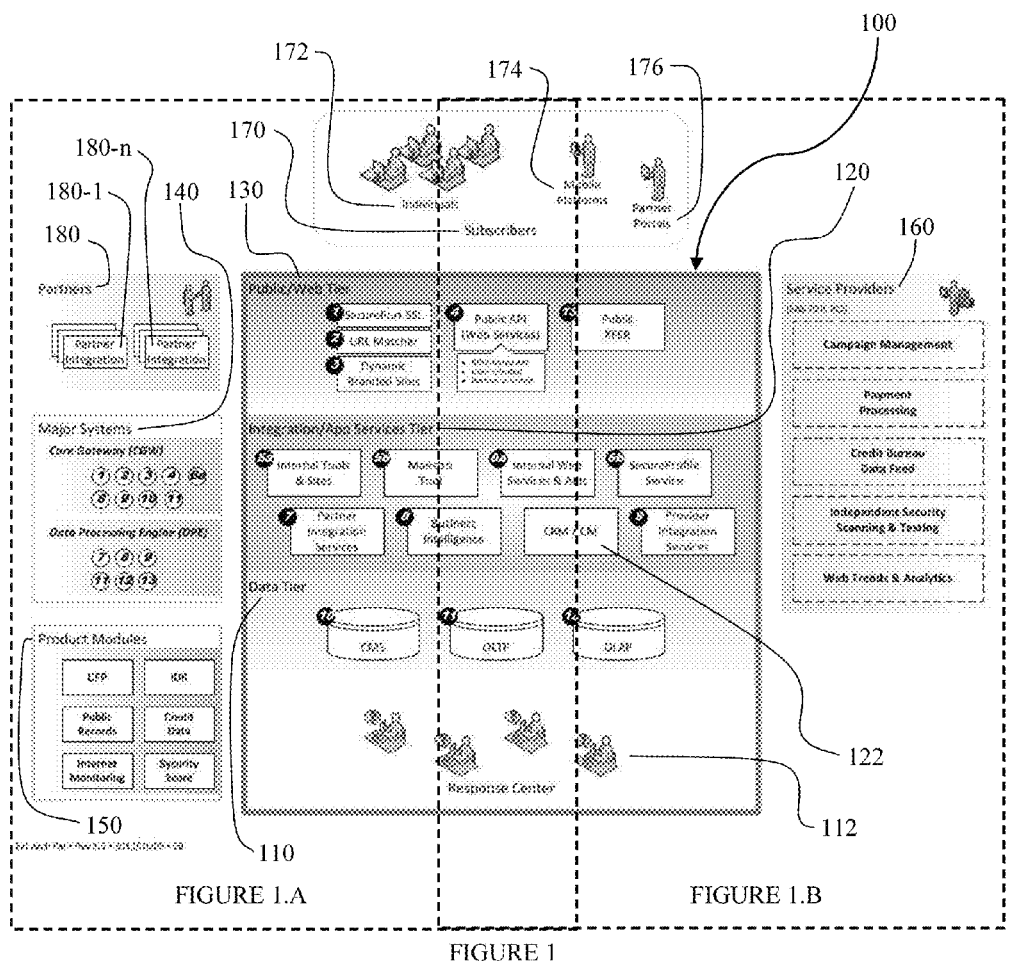
FIG. 1 illustrates one example of the architecture of an identity management system according to some embodiments of the present disclosure, where FIG. 1.A is the left side of the figure and where FIG. 1.B is the right side of the figure.

FIG. 1 illustrates an example of a high level functional description of a system 100 in accordance with some embodiments of the present disclosure. The identity management system 100 interacts with one or more external service providers 160, subscribers 170 and partners 180. Subscribers 170 may include platforms suitable for individual users 172, mobile users 174 and partner portals 176. The system 100 is adapted to accommodate future systems. For each partner 180, there may be provided one or more partner integration systems 180-1 . . . 180-n. The identity management system 100 may comprise a three-tier system, which may include a data tier 110, an integration/application services tier 120 and a public/web tier 130, such as that shown in FIG. 1, which illustrates one example of the architecture of the identity management system 100. The data tier 110 may comprise one or more of a response center 112, a content management system (CMS) database 10, an online transaction processing (OLTP) database 11 and an online analytics processing (OLAP) database 12. The integration/application services tier 120 may comprise one or more of internal tools and sites 5a, a Maestro tool 5b, internal web services and application programming interfaces (APIs) 6a, a SecureProfile Service 6b (see Section VI below), partner integration services 7, business intelligence 8, customer relationship management (CRM) and/or case management (CM) systems 122, and provider integration services 9. The public/web tier 130 may comprise one or more of SecurePort SSL 1 (see Section VII below), URL Matcher 2 (see Section VIII below), Dynamic Branded Sites 3, Public API (Web Services) 4 and public transfer (XFER) 13. The public API 4 may be representational state transfer (REST)-based API, user-oriented or partner-oriented.

As seen best in FIG. 1A, two major systems 140, i.e., a Core Gateway (CGW) 142 (see Section III below) and a Data Processing Engine (DPE) 144 (see Section IV below), may be configured to operate with one or more components of the data tier 110, integration/application services tier 120 and the public/web tier 130. For example, in one embodiment, CGW 142 may be configured to operate with SecurePort SSL 1, URL Matcher 2, Dynamic Branded Sites 3, Public API (Web Services) 4 and Public XFER 13, and DPE 144 may be configured to operate with Public XFER 13, Partner Integration Services 7, Business Intelligence 8, Partner Integration Services 9, OLTP 11 and OLAP 12.

As seen best in FIG. 1A, the identity management system 100 may comprise one or more product modules 150 including check fraud protection (CFP) 151, identity restoration (IDR) 152, Public Records 153, Credit Data 154, Internet Monitoring 155 and SYCURITY Score 156.

It is noted that the like numbers in FIG. 1 represent logical or functional areas and, within those areas, there may be a number of components. In the case of numbers that are shared by both DPE and CGW, there are components from both systems that fall under those areas. In most cases, the integration between CGW and DPE may be made via data in the OLTP database. As such, the links between various systems are functional and may be direct or indirect.

There may be real-time integrations between CGW and DPE, for example, a DPE process may need to call upon a service exposed by CGW. In this example, the component being called upon would be the one identified in the boxes, which is CGW.

As seen best in FIG. 1B, the service providers 160 may be compliant, in one example, with the Statement on Auditing Standards (SAS) 70 Type II standard and the Payment Card Industry (PCI) standard. (SAS 70 II is an auditing standard that describes the internal controls an organization (such as a hosted data center, application service provider or credit processing company) must employ to protect sensitive data. PCI Compliance refers to a set of standards that mandate the secure storage, processing and transmission of customer credit card data.) Service providers 160 may include one or more of campaign management 161, payment processing 162, credit bureau data feed 163, independent security scanning and testing 164, and web trends and analytics 165.

II. Glossary of Terms

| Type | Owner | Term | Description |
| --- | --- | --- | --- |
| Entities | Marketing | Broker Partner | Enterprises or individuals who represent the identity management system to potential channel partners and retailers. A broker cannot be a retailer. |
| | Marketing | Channel Partner | Partner responsible for bringing in additional business. There can be n levels of channel partners above a retail partner. A channel partner can also be a retailer. |
| | Marketing | Retail Partner | Enterprises that directly sell or package identity management system consumer services to consumers. A retailer can also be a channel partner. |
| | Engineering | Provider | Enterprises that provide one or more prevent, detect, restore type services for consumers and/or enterprises. Can also include providers of systems that extend the features of the identity management services. |
| Service | Engineering | Service | Services aimed at providing prevention, breach, notification services, detection or restoration to consumers or enterprises. |
| | Engineering | Component | Provider defined products that the identity management system aggregates into a service. In one embodiment, subscribers never purchase components. |
| | Engineering | Partner Service | The costs, terms and other details about a service being sold by a specific retail partner. |
| | Engineering | Convenience Package | A grouping of services sold to a subscriber. Only relevant at the time of selection by the customer. Not tracked after the sale. |
| | Engineering | Partner Package | A grouping of services sold to a subscriber. Package to partner service relationship is maintained throughout the life of the contract. |
| Order | Finance | Order | When a subscriber purchases service(s) and/or package(s). |
| | Finance | Order Date | Date a subscriber purchases a service or package. |
| | Finance | Offer Code | Subscriber entered code that can modify pricing, terms and other partner service attributes. Can also be used to track order sourcing by partner and/or channel. |
| | Finance | Units | Quantity of a service sold during an order. |
| Contract | Engineering | Contract | An obligation to provide a service to a subscriber. |
| | Engineering | Contract Status | Identifies the current state of a contract (ACTIVE, EXPIRED, CANCELLED, FULFILLED). |
| | Finance | Contract Term | Length of time a partner service is in effect. |
| | Engineering | Effective Date | Date that a purchased service is effective. |
| | Engineering | Import Date | Date a purchased service is introduced into the SDB. |
| | Engineering | Check Quantity | Number of checks covered by a service in an order. |
| | Engineering | Reissue | Flag to determine if a service has been reissued to a subscriber. (i.e., Check Reprint) |
| | Finance | Retail Cost | What the subscriber pays for a partner service. |
| | Finance | Wholesale Cost | What a retailer pays for a partner service. |

-continued

| Type | Owner | Term | Description |
|---|---|---|---|
| Subscriber | Engineering | Subscriber | End-user of identity management system services, restoration "victim", named party whose personal information is being monitored, party who uses the VAULT Safety Deposit, and the like. Could be an individual or a small business. |
| | Engineering | Subscriber Type | Identifies whether the subscriber is a business or person. |
| Systems | Engineering | Core Gateway (CGW) | Web portal for subscriber, partner and internal interactions. |
| | Engineering | Fraud Trac | Case and relationship management tool. |
| | Engineering | Subscriber Database (SDB) | Centralized database storing subscriber contracts. Gold source of subscriber and contract data. |
| | Engineering | Data Processing Engine (DPE) | System used to extract, validate and load sales data into the SDB. |
| | Engineering | EZSHIELD VAULT | Secure web based storage inventory of subscriber documents. |
| | Engineering | Management Gateway (MGW) | Extension of CGW providing partner and internal administration. |
| | Engineering | Sentry | Event driven, rules based engine for subscriber notifications and system triggers. |

In the present application, each client may include a client application. The client can be any number of devices (e.g., computer, internet kiosk, personal digital assistant, cell phone, gaming device, desktop computer, laptop computer, tablet computer, a television with one or more processors embedded therein or attached thereto, or a set-top box) which may be used to connect to a communication network. The communication network may be a wireless, optical, wired or other type of network that facilitates the passage of information. It may include the Internet, one or more local area networks (LANs), one or more wide area networks (WANs), other types of networks, or a combination of such networks. The client application is an application that is executed by the client (e.g., browser, e-mail client, word processor) and that displays or presents information to a user of the client (the client application may also perform other tasks not relevant to the present discussion). Client may also include a location determiner for reporting a geolocation of the client.

A customer client system may include one or more processing units (CPU's), one or more network or other communications interfaces, memory, and one or more communication buses for interconnecting these components. The customer client system may include a user interface, for instance a display and a keyboard. The memory may include high speed random access memory and may also include non-volatile memory, such as one or more magnetic or optical storage disks. The memory may include mass storage that is remotely located from CPU's. The memory may store the following elements, or a subset or superset of such elements: an operating system that includes procedures for handling various basic system services and for performing hardware dependent tasks; a network communication module (or instructions) that is used for connecting the customer client system to other computers via the one or more communications interfaces (wired or wireless), such as the Internet, other wide area networks, local area networks, metropolitan area networks, and so on; a client application as described above; a client assistant as described above; optionally, a cache of downloaded and a cache downloaded, as well as other information for viewing using the client application, and information retrieved by user selection of one or more items.

III. Core Gateway (CGW)

Identity Management System Core Gateway (CGW)

The identity management system may include a Core Gateway, which is an end-user portal for consumers to browse the various products in the identity management system suite, gather product information and complete the purchase and enrollment of various products. The site also provides various self-service functions such as requesting additional information on any identity management system product and reporting fraud-related activity. Finally, for certain products such as Identity Protection and a secure web based storage inventory of subscriber documents such as, for example, EZSHIELD VAULT, the Core Gateway serves as a central launching pad for additional product-specific services.

In this way the CGW is a Consumer Hub for items related to the identity management system. From a technical and architectural view-point, CGW is also a content delivery and commerce platform. As banks and other financial institutions (also known as Partners) adopt the identity management system product suite, the Core Gateway can be used by these Partners to deliver a custom-branded uniform experience consistent with the Partner's own brand identity and online presence.

Tools and Technologies

The Core Gateway facilitates rapid development and a stable and scalable platform. The Core Gateway comprises four core functions, as follows: language(s) and runtime environment (for example, in one embodiment, .NET Framework and ASP.NET); application framework and services, content management (for example, in one embodiment, DotNetNuke); object/relational persistence layer (for example, in one embodiment, NHibernate); and configuration and dependency injection; additional app framework and services (for example, in one embodiment, Spring.NET).

Content and Skinning

The CGW implements a platform that can deliver a Partner-branded experience. In one embodiment, a basic site structure is defined that encompasses all of the site's features: delivery of information, product-specific services and launch pads, enrollment and self-service features. This generic structure can be easily applied to any Partner by default. To achieve a branded-look, several mechanisms may be utilized to tailor the content that is rendered and delivered to the end-user:

- Cascading Style Sheets (CSS) Stylesheets—the Web site design of the CGW site has been carefully crafted by the design team to make heavy use of CSS styles to control the coloring, positioning, art-work and general look and feel. CSS stylesheets are delivered and applied in layers:
  Begin with sensible site-wide default styles
  Layer page- and component-specific styles
  Apply Partner-specific style overrides
- Dynamic Content—various areas of the site and pages within the site present content describing the Partner, the overall site and services, and the individual products. Many of these areas dynamically pull their content from the underlying CMS and can be overridden on a per-Partner basis. This includes textual and graphic content as well as content meta-data (logos, page banners, button text and sizes, and the like).
- Custom Page Overrides—For any page within the basic site structure, a user of the identity management system can completely override the page that is delivered for a given Partner's experience, as well as add additional pages to add custom content and page flows that are not easily supported in the basic structure.

This approach enables achievement of several goals. Firstly, because the default structure and styles are fairly generic, using the identity management system, one can get a minimal Partner-branded site up and running very rapidly just by uploading a few Partner logo images and specifying a handful of Partner-specific style settings. Indeed a tool called the Partner JumpStart Toolkit does just that by providing a quick form-fill approach to defining a new Partner. (See below for a more detailed discussion of the Partner JumpStart Toolkit.)

Secondly, it allows the freedom to completely replace a subset of pages when a Partner requests a particular look for a set of pages if that look does not easily fit into the default structure and style.

Lastly, it facilitates a rapid response to specialized needs for Partners who may choose to include content that compliments but does not directly relate to the identity management system's site or products. In these cases, using the identity management system, one can add Partner-specific products to that Partner's catalog and define product detailed pages which can be navigated to via the product links or from a set of custom pages.

Products and Catalogs

The CGW implements a specialize product and catalog model dubbed the "mini-catalog" which is specially tailored to the service-oriented product selections of the identity management system suite. The catalog is also has special support for Partner-specific requirements. A Partner's catalog may define a subset of the identity management system's products the partner wishes to offer as well as the subset of the variations of those products. Variations allow defining pricing, price classes, product-specific content and even tax-related information on a per Partner+product combination.

Partner Integrations

The normal page flow for user enrollment has the user come to the CGW site (either the identity management system default site or the Partner-branded site), browse around the site to learn about the identity management system products, then begin the Enrollment process. The user selects one or more products to subscribe to, provides their contact and billing information and any product-specific options. The enrollment is submitted at which point a user account is created, billing information is process and any recurring billing is validated and scheduled.

For some Partners this normal process can be altered. For starters, instead of having users fill out their contact and personal information, a Partner may choose to integrate their user data into the identity management system.

The Partner can define data elements known as a "PartnerUserKeys" which can be used to uniquely verify a user's identity. Some examples would be a customer account number, the last four digits of their checking account number, a special offer code that may have been sent to the customer by the Partner, or the customer's account name. Any one of these or any combination (up to 3) of these data elements can be used.

There are three approaches that the Partner can use to integrate user data with the CGW.

Bulk data load—For this approach the Partner sends and initial load of customer data and then agrees to send updates on a regular periodic basis. The data load defines the customer information that the identity management system would typically capture through the normal enrollment process along with the identifying information corresponding to the PartnerUserKey elements. The data may also identify the products that the user is eligible for and may also identify if a user's information has been updated or if their eligibility has expired, for example if a customer closes a checking account and is no longer eligible for Check Fraud Protection.

On-demand Data Push—For this approach a Partner's customer typically would navigate directly from their own account on the Partner's own site (e.g., the user is logged into a Bank's account and billing services) and would follow a link to the Partner's branded CGW site. The Partner would need to track whether the customer is already enrolled in the identity management system's service, and if not, would need to send the necessary information to the CGW using the "Integration API", a collection of securely accessible Web Services. A one-time session token is generated from the API call and is used to identify the customer as she is forwarded from the Partner site to the CGW.

On-demand Data Pull—For this approach the Partner has to expose a mechanism for the CGW to query back to the Partner the necessary information. The CGW supports most standard Simple Object Access Protocol (SOAP) Web Service calls as well as some forms of REST-based service requests. (For this integration approach, some additional configuration and integration work on the CGW may be required for each Partner.) With this approach, the customer may either be forwarded from the Partner's site or may land on the CGW directly (e.g., following a Web link from an e-mail announcement, entering a URL from a mail campaign, performing an Internet search or simply by word of mouth). Again the customer would need to enter some qualifying information to identify themselves. The CGW would use this information to make a request back to the Partner to confirm their eligibility as well as retrieve necessary enrollment data.

Alter Codes

Most commerce sites have support for special offer codes and source codes that enable special pricing or promotional discounts, offer promotional trial periods on certain products, or simply help identify marketing channel used to attract the customer. In one embodiment, CGW offers a mechanism known as "Alter Codes" which offers these features and more. When a user first lands at the CGW, a session is constructed for that user and that session includes various state information including the originating site, which Partner they are affiliated with, and what Catalog of products are available to the user. As the user navigates through the site, their session is updated to reflect any changes in that state. For example, logging into the site updates the session with an authenticated user account that includes their enrollment history and account details.

An Alter Code is a generated code or word (generated by an Alter Code Generator) that finds its way to the user and then allows the user to enter that code during the enrollment process. If the Alter Code is of a valid form and not expired, understood for the given Partner, and applicable for the user's current session state, then the Alter Code's associated Processor has the ability to make some alteration in the user's session. This can include altering the effective product catalog which could adjust product pricing, give away items for promotional periods or enable products which would normal be hidden.

It can also be used to track the source location that a customer was referred from or import customer data from some external data source. In this way the Alter Code is complimentary with the Partner Integration mechanisms already mentioned.

Alter Codes can be durable meaning they are persistent in CGW's data store which is typical for a shared offer code that is blasted to many users, for example, during a marketing campaign that offers a 30 trial period on a subscription service. They can also be sparse meaning that they are not initially stored in the data store. Sparse codes are ones where many thousands of codes can be generated and a unique code is sent to individual users, who may or may not act on them. When a user redeems an Alter Code that is sparsely stored, then that Alter Code is then captured and stored and becomes effectively used-up such that it cannot be used again. A sparse code is good for targeting specific individuals. A good example would be the Partner Integration example above where an Alter Code is generated for each Partner customer and redeeming that Alter Code pre-populates the users contact information for enrollment.

Affiliates and the Partner JumpStart Toolkit

The Core Gateway supports the concept of an Affiliate—a special Partner entity that itself has customers who are Partners, essentially a Partner of Partners. An Affiliate's customers are themselves banks, credit unions or other financial institutions and CGW has special support for this arrangement where an Affiliate has a large number of FI customers that the Affiliate wishes to target the identity management system's products for resale under the FI customer's identity.

In addition to specialized reporting and analysis tools (via EZTrac), the CGW offers the Partner JumpStart Toolkit as briefly mentioned before. JumpStart is a very basic form-fill-based tool that allows designated agents of an Affiliate (such as sales staff) to create and define a new Partner-branded site under the CGW. The JumpStart tool allows a handful of elements to be provided such as uploaded logos, Partner-identifying textual information, primary theme and color selections and default product catalog.

Within minutes of defining this information, the Affiliate agent can preview a working site. Once satisfied with the initial result the affiliate can request that the Partner be published. After completing a QA process by authorized identity management system agents, the site can be released to the public. Additional customizations and configurations, such as Partner Integration parameters, custom catalogs and specialized page flows, can be performed by identity management system agents and can be added at a later time, or can be added before the new Partner site goes live.

IV. Data Processing Engine (DPE)

Overview

The identity management system processes pieces of information (referred to as feeds) inbound and outbound with each feed potentially being in a different format. Some examples of these feeds include billing, alert, payment, event, email and synchronization data but the most common type is sales. A standard way to process these feeds is by means of a custom piece of code, or package, to process each feed. With this prior art method, dozens, if not hundreds, of packages are managed to verify that each works properly and interdependencies are maintained.

As an alternative solution, the identity management system includes a Data Processing Engine (DPE). The DPE is a central platform to implement, manage and monitor the inbound and outbound feeds. Feeds are controlled and processed through pieces of meta data that define the feed settings. The advantages to this approach include code reusability, lower feed implementation times, central logging, shared business rules and consistent processing.

DPE Process Flow

FIG. 2 illustrates an example of a high level functional description of a system 200 in accordance with some embodiments of the present disclosure, in which the DPE processes a feed by executing fundamental tasks shown.

File Retrieval

The DPE 200 has been designed to support flexible transmission settings that are defined in the meta data associated with a feed. An FTP Server Remote or internal Server 205 may be functionally connected to a File Retrieval system 210. The File Retrieval system 210 may comprise a Data Feed, TransmissionDetail and Data FeedJob. The Data Feed may define a feed including Partner name, number of files and schedule information. The TransmissionDetail may define FTP location, encryption information and directory location. The DataFeedJob may log each execution of the datafeed for reporting and operations management. The meta data defines the following information about the feed transmission.

| Setting | Description |
| --- | --- |
| Type | Feeds can be configured to pull from a local server 215 where files can be "dropped off" or the system can poll a remote server 205 for the data. |
| Server Name | Name of the server to poll for the files. |
| Username | Login information to the server to pull the files (if required). |
| Password | Login information to the server to pull the files (if required). |
| Port | The port to use to connect to the server. |
| Directory Location | Location of the files once server connection has been created. |
| Transfer Protocol | The protocol of the file transmission. |

A Local File Server 215 may be provided between the File Retrieval system 210 and a File Parsing/File ETL system 220. The File Parsing/File ETL system 220 may comprise FeedDetail, FieldMapping and FeedDetailLog. FeedDetail may define data relevant to the specific file, which may include filename, delimiter, file type and the like. FieldMapping may define the fields contained in the file, which may include Field Name, Position, Data Transformation Rules and Target filed in the SDB. FieldDetailLog may log each file processed as part of the datafeed for reporting and operations management.

During the parsing step of the DPE workflow, the system decrypts, opens and processes records in the file to the staging tables. A StagingData system 225 may be provided between the File Parsing/File ETL system 220 and a Business Rule Processing system 230. The StagingData system may comprise a database and may be adapted to store data that contains parsed but unprocessed data. Those steps are configured with the following settings.

| Setting | Description |
| --- | --- |
| Name | A friendly name for a specific data feed. This is the value that will show up in associated reporting. |
| Description | The description of the feed. |
| Schedule | The schedule defines the expected frequency the files should be received on. This data can be used for proactive polling or to for notifications if a files isn't processed within a defined variance of this value. |
| Encrypted | This defines if the file has been encrypted and how to process the decryption prior to parsing. |
| Prefix | Defines what static prefix is associated with the file. |
| Suffix | Defines what static suffix is associated with the file. |
| Extension | Defines the extension of the file. |
| Character Set | Defines what character set is associated with the file. |
| Field Delimiter | Field Delimiter |
| Line Delimiter | Line Delimiter |
| File Type | File Type |
| Header | This is a true/false setting that indicated whether a header record is present in the file. |
| Ignore First n | Optional setting that can be used to skip the first n rows from a file. |
| Ignore Last n | Optional setting that can be used to skip the last n rows from a file. |

A Business Rule Processing system 230 may be provided between the StagingData system 225 and an ETL into SDB system 240. The Business Rule Processing system 230 may validate records in the StagingData system 225 by Partner specific business rules. Each record may be coded for processing and reporting.

Once the records have been processed to the staging tables, the DPE goes through each record again and checks it against a list of business rules. Business rules can be defined as needed and run against one or more feeds. The rules check for feed specific verifications like duplicate sales records or malformed data elements. The status of the staging data record is updated after it has been processed to define its final disposition.

An ETL into Destination system 240 may be provided between the Business Rule Processing system 230 and a Destination system 250 such as SDB. The ETL into Destination system 240 may send records that pass all business rules into the Destination system 250. After business rule processing has completed, the final step in the DPE workflow is the insert the staging records into the destination tables. As most feeds processed through DPE are sales related, the most frequent destination is the Subscriber Database (SDB). In this step, the system looks for staging data records that have a positive disposition and have not been yet transferred to the destination. If both of those conditions are met, the system inserts the data into the destination system and the staging data row's status is updated to reflect the end result of the processing.

Figure 3:
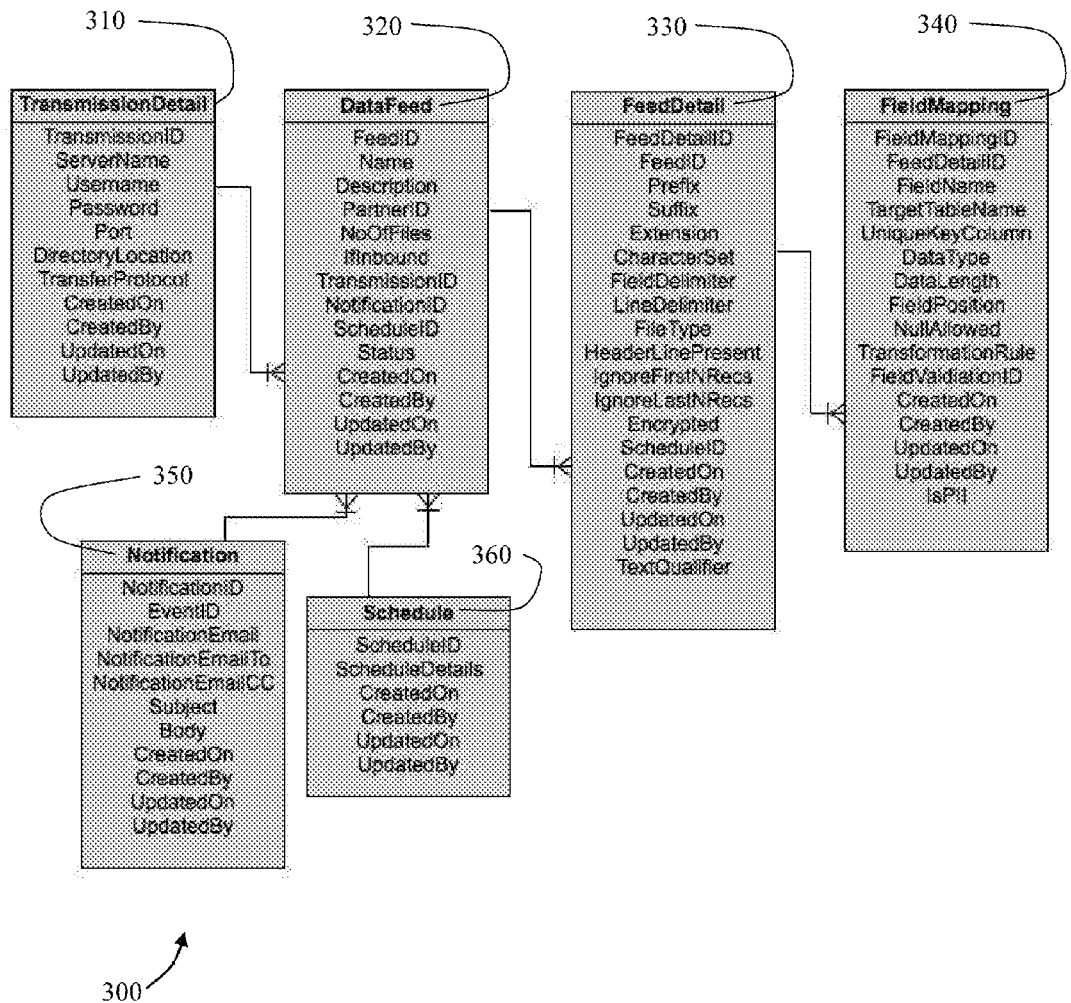
FIG. 3 illustrates one example of meta data associated with a DPE feed.

A Data Model 300 may be provided for the Data Processing Engine (DPE). FIG. 3 illustrates an exemplary table 300 in a database, which is used in some embodiments to store information about meta data associated with a DPE feed. The following entities are used to define the meta data associated with a DPE feed.

TransmissionDetail 310—Server and transmission settings, which may include one or more of TransmissionID, ServerName, Username, Password, Port, DirectoryLocation, TransferProtocol, CreatedOn, CreatedBy, UpdatedOn and UpdatedBy fields. TransmissionDetail 310 may be functionally connected to DataFeed 320. For example, TransmissionDetail 310 may have a one-to-many relationship with DataFeed 320.

DataFeed 320—Top level feed describing purpose and component files, which may include one or more of FeedID, Name, Description, PartnerID, NoOfFiles, IfInbound, TransmissionID, NotificationID, ScheduleID, Status, CreatedOn, CreatedBy, UpdatedOn and UpdatedBy fields. DataFeed 320 may be functionally connected to one or more of TransmissionDetail 310, FeedDetail 330, Notification 350 and Schedule 360. For example, TransmissionDetail 310, Notification 350 and Schedule 360 each may have a one-to-many relationship with DataFeed 320, and DataFeed 320 may have a one-to-many relationship with FeedDetail 330.

FeedDetail 330—Specific file(s) associated with DataFeed 320; Multiple files can be associated with one DataFeed. FeedDetail 330 may include one or more of FeedDetailID, FeedID, Prefix, Suffix, Extension, CharacterSet, FieldDelimiter, LineDelimiter, File Type, HeaderLinePresent, IgnoreFirstNRecs, IgnoreLastNRecs, Encrypted, ScheduleID, CreatedOn, CreatedBy, UpdatedOn, UpdatedBy and TextQualifier fields. FeedDetail 330 may be functionally connected to one or more of DataFeed 320 and FieldMapping 340. For example, DataFeed 320 may have a one-to-many relationship with FeedDetail 330 and FeedDetail 330 may have a one-to-many relationship with FieldMapping 340.

FieldMapping 340—Mapping data for source file to staging data target, which may include one or more of FieldMappingID, FeedDetailID, FieldName, TargetTableName, UniqueKeyColumn, DataType, DataLength, FieldPosition, NullAllowed, TransformationRule, FieldValidationID, CreatedOn, CreatedBy, UpdatedOn, UpdatedBy and IsPII fields. FieldMapping 340 may be functionally connected to FeedDetail 330. For example, FeedDetail 330 may have a one-to-many relationship with FieldMapping 340.

Notification 350—Notification information to use pre/post feed processing, which may include one or more of NotificationID, EventID, NotificationEmail, NotificationEmailTo, NotificationEmailCC, Subject, Body, CreatedOn, CreatedBy, UpdatedOn and UpdatedBy fields. Notification 350 may be functionally connected to DataFeed 320. For example, Notification 350 may have a one-to-many relationship with DataFeed 320.

Schedule 360—Scheduling information associated with a specific DataFeed 320, which may include one or more of ScheduleID, ScheduleDetails, CreatedOn, CreatedBy, UpdatedOn and UpdatedBy fields. Schedule 360 may be functionally connected to DataFeed 320. For example, Schedule 360 may have a one-to-many relationship with DataFeed 320.

Figure 4A:
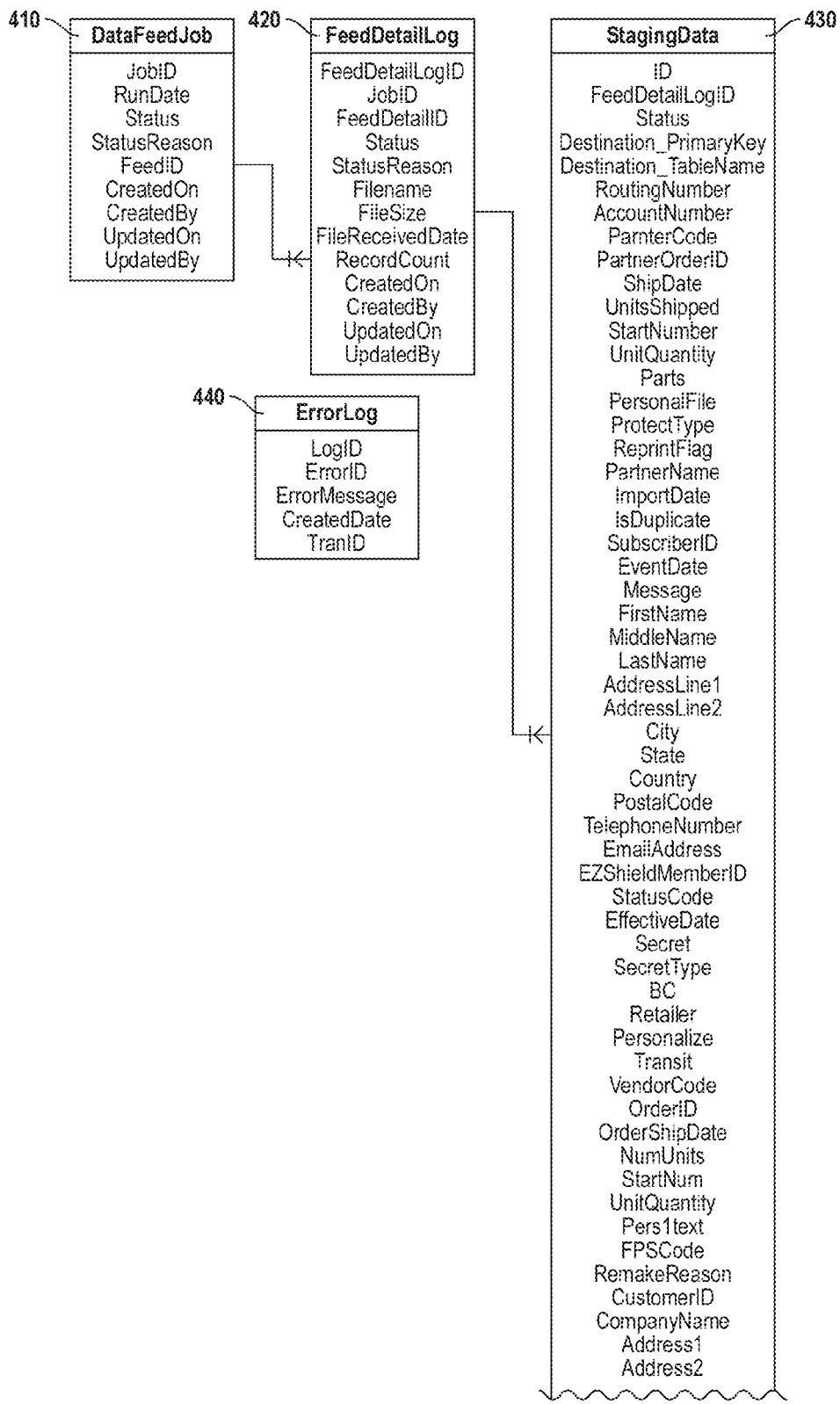
FIG. 4.A is the top portion of one example of entities used for file processing for DPE according to some embodiments of the present disclosure, and FIG. 4.B is a bottom portion of one example of entities used for file processing for DPE according to some embodiments of the present disclosure.
Figure 4B:
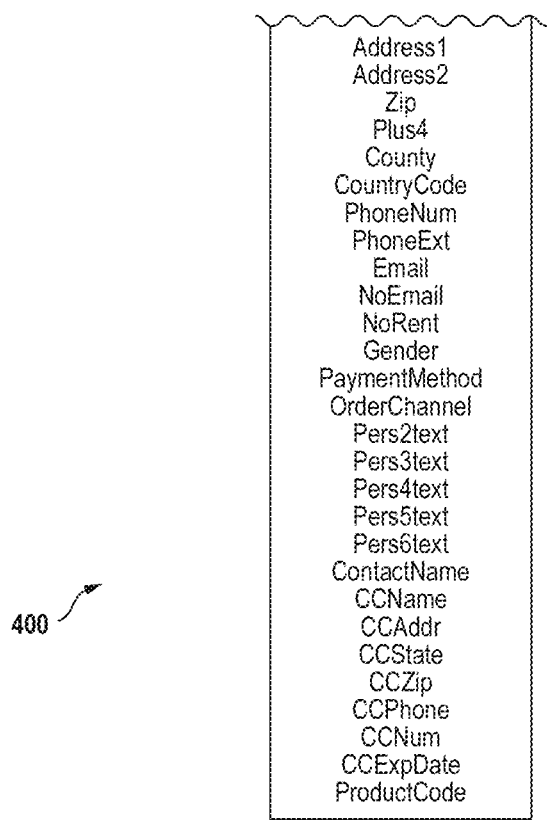

FIG. 4 illustrates an exemplary table 400 in a database, which is used in some embodiments to store information about entities used for file processing.

DataFeedJob 410—Log information about a specific processing instance of a DataFeed (group of files), which may include one or more of JobID, RunDate, Status, StatusReason, FeedID, CreatedOn, CreatedBy, UpdatedOn and UpdatedBy fields. DataFeedJob 410 may be functionally connected to FeedDetailLog 420. For example, DataFeedJob 410 may have a one-to-many relationship with FeedDetailLog 420.

FeedDetailLog 420—Log information about a specific processing instance of a FeedDetail (individual file), which may include one or more of FeedDetailLogID, JobID, FeedDetailID, Status, StatusReason, Filename, FileSize, FileReceivedDate, RecordCount, CreatedOn, CreatedBy, UpdatedOn and UpdatedBy fields. FeedDetailLog 420 may be functionally connected to one or more of DataFeedJob 410 and StagingData 430. For example, DataFeedJob 410 may have a one-to-many relationship with FeedDetailLog 420, and FeedDetailLog 420 may have a one-to-many relationship with StagingData 430.

StagingData 430—Destination for data from files, which may include one or more of ID, FeedDetailLogID, Status, Destination_PrimaryKey, Destination_TableName, RoutingNumber, AccountNumber, PartnerCode, PartnerOrderID, ShipDate, UnitsShipped, StartNumber, UnitQuantity, Parts, PersonalLine, ProtectType, ReprintFlag, PartnerName, ImportDate, IsDuplicate, SubscriberID, EventDate, Message, FirstName, MiddleName, LastName, AddressLine1, AddressLine2, City, State, Country, PostalCode, TelephoneNumber, EmailAddress, MemberID (such as EZShieldMemberID), StatusCode, EffectiveDate, Secret, SecretType, BC, Retailer, Personalize, Transit, VendorCode, OrderID, OrderShipDate, NumUnits, StartNum, UnitQuantity, Persltext, FPSCode, RemakeReason, CustomerID, CompanyName, Address1, Address2, Zip, Plus4, County, CountryCode, PhoneNum, PhoneExt, Email, NoEmail, NoRent, Gender, PaymentMethod, OrderChannel, Pers2text, Pers3text, Pers4text, Persltext, Pers6text, ContactName, CCName, CCAddr, CCCity, CCState, CCZip, CCPhone, CCPhone, CCNum, CCExpDate and ProductCode fields. StagingData 430 may be functionally connected to FeedDetailLog 420. For example, FeedDetailLog 420 may have a one-to-many relationship with StagingData 430.

ErrorLog 440—Error logging, which may include one or more of LogID, ErrorID, ErrorMessage, CreatedDate and TranID

V. Subscriber Database (SDB)

Embodiments of the identity management system may be adapted to maintain customized sales data tables for each partner. While this solution provides a vast amount of flexibility to store different customer attributes, it did not allow for a consolidated view of the customer. Relatively simple tasks like reporting, customer lookup and fulfillment were very cumbersome to support. When the business asked a simple question such as "How many active customers are there right now?", the technology team was not able to answer with ease. To exacerbate the problems, a common set of customer attributes and common taxonomy were not present.

In order to address these concerns, the identity management system may be adapted to include a consolidated data store to hold this information. The key success requirements for the project included:

Define a common taxonomy that has business and technology buy in

Centralized subscriber data storage for identity management system customer data Transactional data from partner sales files Subscription (i.e., monitoring) data from partner sales files Subscription data from customers who come directly to the CGW portal Synchronization of key data elements from CGW customer portal Integration with CGW portal for customers to validate their partner paid services during the activation (provisional lookup)

Support for reporting on the identity management system's customer obligations (outstanding contracts) for fulfillment partner billing customer billing email communications performance analysis of services and partners Solution Overview To solve the defined problems and meet the projects requirements, the team decided to leverage its existing expertise in a relational database management system (for example, in one embodiment, Microsoft SQL Server) to develop a customized schema tailored to an identity management system's business needs. The development was broken into several design, development, and release iterations as laid out below. Design development followed the Data Services Design Best Practices.

Partner Services

Using the Glossary of Terms above to establish terminology embodiments of the system and method create a schema to represent the identity management system's business. A need arose to develop a way to represent the attributes for a combination of a generic identity management system service, a package and a partner. Attributes that are unique to this combination are service term, pricing, billing frequency, volume discounts, step pricing and package requirements. To represent this, the concept of the Partner Service was developed. The Partner Service maintains referential integrity to the generic services offered but allows for partner and package specific customizations of attributes associated with that service.

Anonymous Subscribers

The next challenge identified relates to the management of anonymous subscribers. Some identity management system partner data feeds contain detailed demographic information (i.e., name, address, phone, and the like) while others contain only sales data (i.e., service X, date sold, and the like). In order to maintain referential integrity within the data model and fit both business cases, a null profile record (−1) is implemented that is referenced for anonymous subscribers. If the identity management system collects additional demographic information about a specific anonymous customer during the course of normal business, the associated records can be re-associated with a newly created profile record representing that additional data.

Provisional Enrollment Support

The identity management system's most common sales process involves a partner selling services to their customer. The partner then sends sales files to the identity management system, which is processed into SDB. The identity management system then sends an email to the customer directing them to activate their services via the CGW portal. During the activation process, CGW needs to validate the customer against the SDB record. This validation process is referred to as the provisional enrollment process.

To support the provisional lookup process (PSS), SDB needed to extend a validation mechanism to the CGW web site for real time customer verification. This was accomplished by creating a series of stored procedures which offer flexible validation options. Validation can be executed based on different combinations of customer information:

Provisional ID
First Name
Last Name
Zip Code
Secret Value (i.e., last 4 of the social security number (SSN))

Once a customer is validated by CGW using these procedures, the customer can continue through the enrollment process.

CGW Synchronization

After creating customer records in SDB and CGW, a mechanism is identified to keep these systems in sync. When accounts are created in CGW, the system generates a unique identity management system ID for that customer. That ID becomes the primary key across CGW and SDB for the purposes of system synchronization. This occurs both during the provisional enrollment process and when a walk up customer is enrolled (a walk up customer goes directly to the CGW portal and purchases services).

Please refer to CGW documentation for information on how CGW flags records for synchronization. Flagged records are processed via DPE for synchronization with SDB on a daily basis.

Schema Extension

Since SDB's original development, the system has been extended to store data about outbound email triggers and the deliverability (sent, bounce, open, click, and the like) information about that message.

Figure 5A:
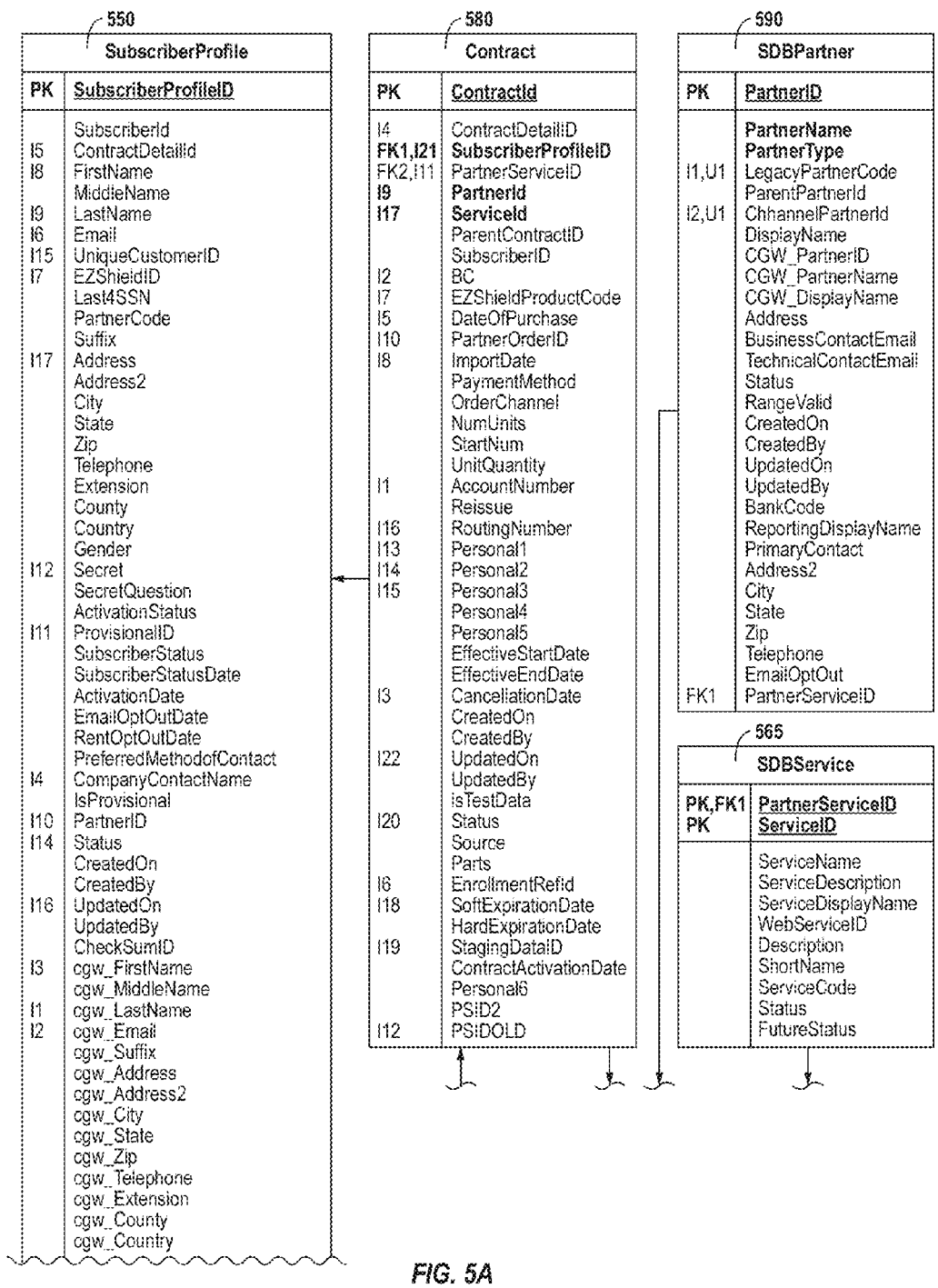
FIG. 5.A is a top portion of one example of an SDB Schema of an identity management system according to some embodiments of the present disclosure, and FIG. 5.B is a bottom portion of one example of an SDB Schema of an identity management system according to some embodiments of the present disclosure.
Figure 5B:
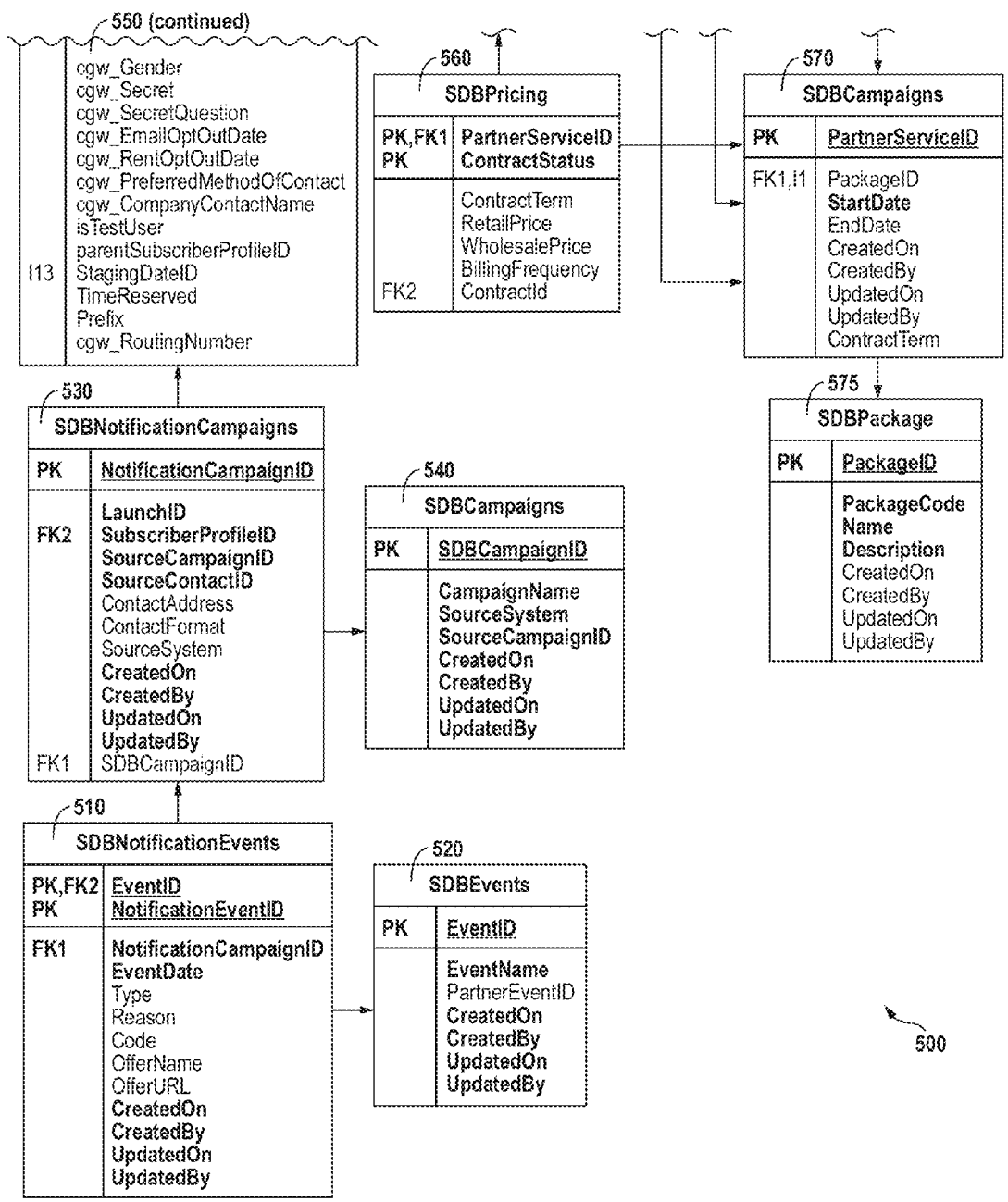

FIG. 5 illustrates one example of SDB Schema 500 of the identity management system, which may be a table in a database. The SDB Shema 500 may include one or more of the following systems: SDBNotificationEvents 510, SDBEvents 520, SDBNotificationCampaigns 530, SDB Campaigns 540, SubscriberProfile 550, SDBPricing 560, SDB Service 565, SDBPartnerService 570, SDB Package 575, Contract 580 and SDBPartner 590.

In FIG. 5, the abbreviations Primary Key (PK), Foreign Key (FK), Instance (I) and Update (U) are used and may be numbered, for example, FK1, FK2, I1, I2 and the like.

SDBNotificationEvents 510 may comprise one or more of EventID, which may function as PK and FK2, NotificationEventID, which may function as PK, NotificationCampaignID, which may function as FK1, EventDate, Type, Reason, Code, OfferName, OfferURL, CreatedOn, CreatedBy, UpdatedOn and UpdatedBy fields. SDBNotificationEvents 510 may be functionally connected to one or more of SDBEvents 520 and SDBNotificationCampaigns 530.

SDBEvents 520 may comprise one or more of EventID, which may function as PK, EventName, PartnerEventID, CreatedOn, CreatedBy, UpdatedOn and UpdatedBy fields. SDBNotificationEvents 510 may be functionally connected to SDBEvents 520.

SDBNotificationCampaigns 530 may comprise one or more of NotificationCampaignID, which may function as PK, LaunchID, SubscriberProfileID, which may function as FK2, SourceCampaignID, SourceContactID, ContactAddress, ContactFormat, SourceSystem, CreatedOn, CreatedBy, UpdatedOn, UpdatedBy and SDBCampaignID, which may function as FK1, fields. SDBNotificationCampaigns 530 may be functionally connected to one or more of SDBNotificationEvents 510, SDB Campaigns 540 and SubscriberProfile 550.

SDB Campaigns 540 may comprise one or more of SDBCampaignID, which may function as PK, CampaignName, SourceSystem, SourceCampaignID, CreatedOn, CreatedBy, UpdatedOn, UpdatedBy fields. SDB Campaigns 540 may be functionally connected to SDBNotificationCampaigns 530.

SubscriberProfile 550 may comprise one or more of SubscriberProfileID, which may function as PK, SubscriberId, ContractDetailId, which may function as I5, FirstName, which may function as I8, MiddleName, LastName, which may function as I9, Email, which may function as I6, UniqueCustomerID, which may function as I15, [company name]ID, such as EZShieldID, which may function as I7, Last4SSN, PartnerCode, Suffix, Address, which may function as I17, Address2, City, State, Zip, Telephone, Extension, County, Country, Gender, Secret, which may function as I12, SecretQuestion, ActivationStatus, ProvisionalID, which may function as I11, SubscriberStatus, SubscriberStatusDate, ActivationDate, EmailOptOutDate, RentOptOutDate, PreferredMethodofContact, CompanyContactName, whichmay be I4, IsProvisional, Partner ID, which may function as I10, Status, which may function as I14, CreatedOn, CreatedBy, UpdatedOn, which may function as I16, UpdatedBy, CheckSumID, cgw_FirstName, which may function as I3, cgw_MiddleName, cgw_LastName, which may function as I1, cgw_Email, which may function as I2, cgw_Suffix, cgw_Address, cgw_Address2, cgw_City, cgw_State, cgw_Zip, cgw_Telephone, cgw_Extension, cgw_County, cgw_Country, cgw_Gender, cgw_Secret, cgw_SecretQuestion, cgw_EmailOptOutDate, cgw_RentOptOutDate, cgw_PreferredMethodofContact, cgw_CompanyContactName, is TestUser, ParentSubscriberProfileID, StagingDataID, which may function as I13, TimeReserved, Prefix and cgw_RoutingNumber fields. SubscriberProfile 550 may be functionally connected to one or more of SDBNotificationCampaigns 530 and Contract 580.

SDBPricing 560 may comprise one or more of PartnerServiceID, which may function as PK and/or FK1, ContractStatus, which may function as PK, ContractTerm, RetailPrice, WholesalePrice, BillingFrequency and ContractId, which may function as FK2, fields. SDBPricing 560 may be functionally connected to one or more of Contract 580 and SDBPartnerService 570.

SDB Service 565 may comprise one or more of PartnerServiceID, which may function as PK and/or FK1, ServiceID, which may function as PK, ServiceName, ServiceDescription, ServiceDisplayName, WebServiceID, Description, ShortName, ServiceCode, Status and FutureStatus fields. SDB Service 565 may be functionally connected to SDBPartnerService 570.

SDBPartnerService 570 may comprise one or more of PartnerServiceID, which may function as PK, PackageID, which may function as FK1 and/or I1, StartDate, EndDate, CreatedOn, CreatedBy, UpdateOn, UpdatedBy and ContractTerm fields. SDBPartnerService 570 may be functionally connected to one or more of Contract 580, SDBPartner 590, SDB Service 565 and SDB Package 575.

SDB Package 575 may comprise one or more of PackageID, which may function as PK, PackageCode, Name, Description, CreatedOn, CreatedBy, UpdateOn and UpdatedBy fields. SDB Package 575 may be functionally connected to SDBPartnerService 570.

Contract 580 may comprise one or more of ContractId, which may function as PK, ContractDetailIID, which may function as I4, SubcriberProfileId, which may function as FK1 and/or I21, PartnerServiceID, which may function as FK2 and/or I11, PartnerId, which may function as I9, ServiceId, which may function as I17, ParentContractID, SubscriberID, BC, which may function as I2, [company name] ProductCode, such as EZShieldProductCode, which may function as I7, DateOfPurchase, which may function as I5, PartnerOrderID, which may function as I10, ImportDate, which may function as I8, PaymentMethod, OrderChannel, NumUnits, StartNum, UnitQuantity, AccountNumber, which may function as I1, Reissue, RoutingNumber, which may function as I16, Personal1, which may function as I13, Personal2, which may function as I14, Personal3, which may function as I15, Personal4, Personal5, EffectiveStartDate, EffectiveEndDate, CancellationDate, which may function as I3, CreatedOn, CreatedBy, UpdatedOn, which may function as I22, UpdatedBy, isTestData, Status, which may function as I20, Source, Parts, EnrollmentRefId, which may function as I6, SoftExpirationDate, which may function as I18, HardExpirationDate, StagingDataID, which may function as I19, ContractActivationDate, Personal6, PSID2 and PSIDOLD, which may function as I12. Contract 580 may be functionally connected to one or more of SubscriberProfile 550, SDBPricing 560 and SDBPartnerService 570.

SDBPartner 590 may comprise one or more of PartnerID, which may function as PK, PartnerName, PartnerType, LegacyPartnerCode, which may function as I1 and/or U1, ParentPartnerId, ChannelPartnerId, which may function as I2 and/or U1, DisplayName, CGW_PartnerID, CGW_PartnerName, CGW_DisplayName, Address, BusinessContactEmail, TechnicalContactEmail, Status, RangeValid, CreatedOn, CreatedBy, UpdatedOn, UpdatedBy, BankCode, ReportingDisplayName, PrimaryContact, Address2, City, State, Zip, Telephone, EmailOptOut and PartnerServiceID, which may function as FK1, fields. SDBPartner 590 may be functionally connected to SDBPartnerService 570.

VI. Secure Profile

As a core function of the identity management system line of business, a need was identified to securely capture and store sensitive user information, ranging from SSNs to elements of Credit Card and financial accounts, to Passport details. This need presents an enormous risk to customers as well as in the event of a breach, both external and internal. While the identity management system ensures the safety and security of systems, the potential and threat for a compromise may still exist. To that end, a system was developed with the aim of reducing the risk of exposure of sensitive data, both through technology and process. This document describes the SecureProfile system, which is designed to address the need described thus far.

SecureProfile (SP) is a system that is designed as a repository of data with features and characteristics whose primary purpose is to ensure security and safety of the data which is stores. It offers the following features:

- A mechanism to define arbitrary data artifacts or Structures which SP treats uniformly and transparently for the purposes of securing them.
- Multiple containers of data that can be associated with individual Subjects known as Profiles.
- A Profile in turn contains Records which have an associated Structure.
- Ability to securely grant access to Profiles to other Subjects.
- An audit log providing a detailed account of accesses (reading and writing) to any of the data housed within its Profiles.
- Security-related algorithms and protocols (encryption, hashing, signing, and the like) that are configuration driven so as not to be locked-in to any fixed set.
- Ability to securely and reliably exchange data between Subjects.
- Support for shared-secret access to data. (A shared-secret is one where the secret is divided into multiple parts, m, and any subset, n, of those parts can be used to recover the original whole secret.)
- Support for secured, externalized content.

SecureProfile may be implemented as a standalone system with well-defined and constrained access mechanisms. As a stand-alone system, it allows reuse of functionality across multiple other systems (Web sites, integrations, tools, etc.) without hard-coding it or tying it any one system. It also facilitates a generic design to service multiple client systems and purposes.

Single Interface

Many systems provide support for multiple methods of access and interaction, such as via a Web-based or Client-based UI, an API interface, and even direct access to the underlying data store (DB). This often makes it necessary to facilitate flexibility and convenience for working with a system. However, SP is designed to only support a single, well-defined access mechanism which helps limit the attack surface for compromising the system, and it also helps to ensure a focus on securing that mechanism. The access mechanism is an API interface that allows external client systems to interact with SP.

However, the necessary flexibility and convenience to integrate with SP can still be achieved by building other specialized access points and integrations atop the API interface. This layering approach ensures that a single choke-point applies security protocols defined within SP.

Secure Context

The API layer is the exposed shell that provides access into SP, and it in turn interfaces into a Secure Context, an environment session attributed to a single, known entity known as a Subject. A Subject (also known as a Principal) is an entity that represents a known individual user or system within SP that can access the SP system and can interact with other elements exposed by SP, such as Profiles and Records.

As a first step to interacting with SP, a client first establishes a Secure Context by identifying itself and authorizing itself by presenting an authentication credential. This credential is used to directly unlock the Subject's identity and associate it with the Security Context. Further interaction with SP is implemented through the Security Context, which allows to always attribute any action (creating, reading, writing, and the like) against any entity (Subjects, Profiles, Records, and the like) to a known Subject. Security protocols and processes are also implemented within the Secure Context, again to create a single known choke-point against access to the SP system and the data it contains.

Encrypted Persistent Storage

The Secure Context persists its durable entities to a back-end data storage which can be implemented as a relational database (i.e., SQL Server in the current implementation) or some other facility such as a collection of files or an alternative database technology (for example, BDB, BigTable, Hadoop, or any other suitable database technology). The common factor being that data written to and read from the persistent storage is controlled by a Secure Context and the persistent representation always guarantees encryption of the sensitive data (i.e., any user supplied data, potentially excluding meta-data added by SP).

In this way the persistent storage is itself a black-box of information, which if isolated and stolen, would expose very little sensitive information without brute-force processing and attacking of the content.

Cryptographic Technology

SecureProfile makes use of various cryptographic techniques, including symmetric encryption (secret key), asymmetric encryption (public/private key), secure hashing and shared secret to implement its supported features. As a general rule, SecureProfile does not employ any newly invented or crafted algorithms or protocols to support these techniques. Instead, it supports the application of any implementation that fits into a general framework for these techniques.

Any data that is secured and persisted under the transformation of these techniques is tagged with metadata that will identify the correct reverse transformation to recover the original, insecure form of the data. The metadata is used to resolve a concrete implementation and any instance-specific parameters necessary to perform both the encoding, and if applicable, the decoding of such data. SecureProfile maintains a dynamic, configuration driven library of implementations that are known as transformers. These transformers generalize the majority of the various cryptographic techniques identified above, and allow SP to decouple it security mechanisms from specific algorithms and protocols.

As an example, the following lists some specific transformer implementations that are supported by this framework:

| | |
|---|---|
| Secure Hashing | MD5 |
| | SHA |
| Symmetric Encryption | Triple DES |
| | AES-256 |
| Asymmetric Encryption | RSA |
| | DSS |
| | ElGamal |

Figure 6C:
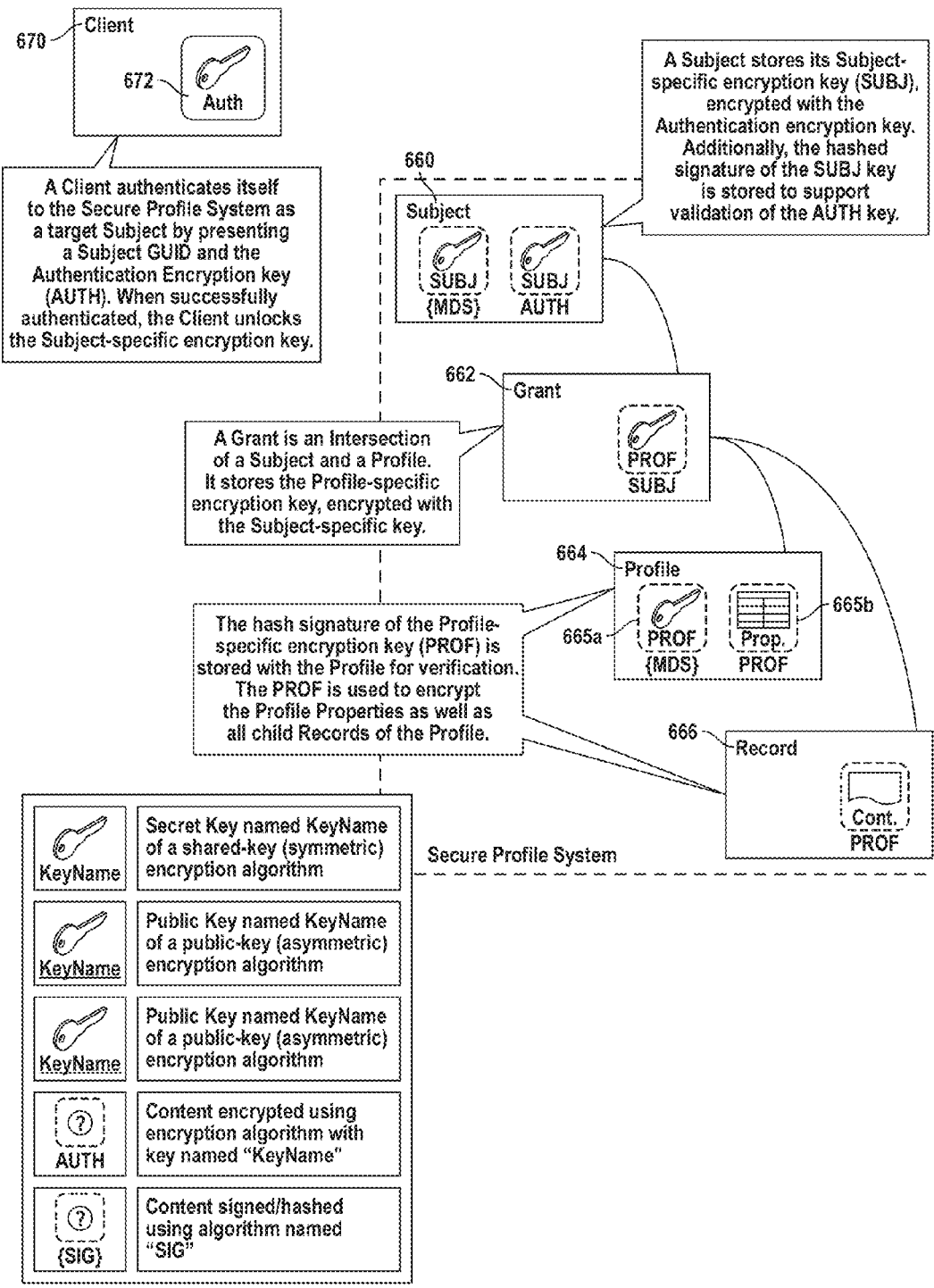
FIG. 6.A depicts one example of the overall system design of a Secure Profile system of an identity management system according to some embodiments of the present disclosure.

FIG. 6.A illustrates one example of the Overall System Design of the Secure Profile system of the identity management system. The Secure Profile system may be adapted to provide secure storage of key-value attributes and structured records. The system may include the following features: any access may be tied to a known Principal, and operations may be logged and fully auditable.

The Secure Profile system 600 may comprise a database system 610, a data access system 620, a controller system 630, a context system 640 and a service system 650, which may, in one example, include the Simple Object Access Protocol (SOAP) protocol 652 and the Windows Communication Foundation (WCF) framework 654. (SOAP is an XML based communication standard for structured remote procedure calls. WCF is a Microsoft .NET technology for building service-oriented applications.)

The database system 610 may be adapted to be isolated from other systems with more restricted access and Profile data may be "layer encrypted."

The data access system 620 may be adapted to have atomic primitives providing fundamental data operations for system entities.

The controller system 630 may be adapted to assemble and orchestrate data access primitives into higher level system functions.

The context system 640 may be adapted to provide a stateful secrurity context with a known acting Principal for requested operations.

The service system 650 may be adapted to expose client-accessible functionality over a supported remote-access technology.

FIG. 6.B provides Primary Entity Definitions for one example of the Secure Profile system of the identity management system and illustrates the relationships between Subject 660, Grant 662, Profile 664, Record 666 and Structure 668. For example, Subject 660 may have a one-to-many relationship with Grant 662, Profile 664 may have a one-to-many relationship with Grant 662, Profile 664 may have a one-to-many relationship with Record 666 and Structure 668 may have a one-to-many relationship with Record 666.

A Security Subject 660 represents a known Principal within the Secure Profile system. A Subject can be a person or another external system such as CGW or DPE. External interaction with the Secure Profile system (i.e., the Client) is performed as an authenticated Subject. Every Subject has a unique Subject-specific encryption key which is itself stored in an encrypted state and must be decrypted by the Client providing the correct decryption data. Security Subject 660 may comprise one or more of a Globally Unique Identifier (GUID), Label and Encoded Subject Key.

A Grant 662 is an award to a Subject for access to a Profile. A Grant stores the Profile-specific encryption key which is itself encrypted using the Subject's own encryption key. Every Subject can have at most one Grant to any Profile, but can be awarded multiple Grants to multiple Profiles. Likewise, a single Profile may be accessible by multiple Subjects via multiple Grants. Grant 662 may comprise an Encoded Profile Key.

A Profile 664 is an arbitrary collection of encrypted key-value pairs known as Properties. Regarding the term "encrypted," please note that the values are encrypted; however, in one embodiment the keys and auxillary information about each key-value entry are not. Every Profile has a unique Profile-specific encryption key. In one embodiment, the unique Profile-specific encryption key is itself never stored directly (see Grant). Profile 664 may comprise one or more of a GUID, Label and Key-Value Properties.

A Structure 668 defines an ordered arrangement of named elements. A Record 666 is an entry whose encrypted content is a structured collection of elements. A Record has an associated Structure which acts as a template allowing access to the individual elements encoded within. Please note that a Structure's definition is represented in a well-defined XML format; a Record's content is represented in a well-defined XML format that correlates with the Structure's XML format. Record 66 may comprise one or more of a GUID, Label and Content. Structure 668 may comprise one or more of Name and Definition.

FIG. 6.C illustrates one example of Applied Encryption for the Secure Profile system of the identity management system. The legend in the bottom-left-hand corner of FIG. 6.C discloses that the first symbol corresponds with a Secret Key named KeyName of a shared-key (symmetric) encryption algorithm, that the second symbol corresponds with a Public Key named KeyName of a public-key (asymmetric) encryption algorithm, that the third symbol corresponds with a Public Key named KeyName of a public-key (asymmetric) encryption algorithm, that the fourth symbol corresponds with Content encrypted using encryption algorithm with key named "KeyName" and that the fifth symbol corresponds with Content signed/hashed using algorithm named "SIG."

A Client 670 authenticates itself to the Secure Profile System as a target Subject 660 by presenting a Subject Globally Unique Identifier (GUID) and the Authentication encryption key (AUTH) 672. When successfully authenticated, the Client unlocks the Subject-specific encryption key. (GUID is a 128-bit number used in computer software to assign unique identifiers across multiple systems.)

A Subject 660 stores its Subject-specific encryption key (SUBJ), encrypted with the Authentication encryption key.

Additionally, the hashed signature of the SUBJ key is stored to support validation of the AUTH key.

A Grant 662 is an intersection of a Subject 660 and a Profile 664. It stores the Profile-specific encryption key, encrypted with the Subject-specific key.

The hash signature of the Profile-specific encryption key (PROF) is stored with the Profile 664 for verification. The PROF 665a is used to encrypt the Profile Properties 665b as well as child Records 666 of the Profile 664.

VII. Secure Port Secure Sockets Layer (SSL)

Overview

The main public-facing Web site for the identity management system hosts multiple, Partner-branded sites served up from a single application (identity management system CGW). Due to a limitation of an internet information service, in this case, Microsoft's IIS 6, and the need to require multiple SSL certificates bound to a single IIS Site, a solution is implemented that integrates an SSL accelerator for hosting the SSL certs, and a custom ASP.NET HTTP Module that intercepts incoming requests relayed from the SSL accelerator to CGW. This solution is not limited to ASP.NET and may be adapted for use with any language or runtime environment.
Multiple SSL Certificates and Multiple IP Addresses Because one of the primary features of the identity management system CGW application is to support custom Partner-branding, it is necessary for each Partner site to appear as a stand-alone independent site, complete with a custom domain name and associated SSL certificate (EV). Microsoft's IIS 6, the Web server that CGW currently is deployed upon, has a limitation where it can only support a single SSL certificate bound across HTTPS endpoints associated with a single IIS site.

To overcome this limitation, the tier above the Web tier is utilized, at the load balancer (LB) appliance. The load balancer supporting the production environment also features SSL accelerator functionality, which includes the ability to host multiple SSL certificates, and direct traffic associated with each SSL cert to a target Web server (or servers). In the present case, SSL certificates associated with the CGW Partner sites are installed into the load balancer, and traffic associated with each of these certs is directed to the same CGW Web server end-point.

Because an HTTPS request is completely encapsulated in an SSL connection, the typical HTTP protocol negotiation and exchange does not take place until after the SSL connection is fully established. This means that the normal HTTP protocol exchange of target hostname information, which is normally used to support virtual hosting, or the ability to serve up multiple distinct domain-named sites from a singly HTTP endpoint, is not possible when served over SSL. So a unique combination of IP address+listening port number is required to distinguish each target Partner site. To that end, a dedicated VIP (unique IP address listening endpoint) is provided on the load balancer for each Partner site. The dedicated SSL certificate is associated with that VIP on the load balancer, and then these VIPs are directed from the LB to the CGW application on the IIS servers.
SecurePort ASP.NET HTTP Module Because the load balancer hosts the SSL certificates, that also means that the LB terminates the secure SSL connections for each incoming client request. Relayed connections are therefore transmitted in the clear to the target IIS Web servers. This presents a problem to the CGW application because it detects whether incoming requests are secure or not, and if not forces a redirect to the corresponding secure connection. Because the client is directly interacting with the LB, and even when the client's connection is secured over SSL, the connection that CGW sees (coming from the LB) will be insecure, and thus CGW will always see an insecure connection and continuously redirect, causing an infinite redirection loop.

To address this problem, a custom ASP.NET HTTP Module is developed known as the SecurePort Module. This module is installed early on in the CGW request processing pipeline and it is configured to detect certain characteristics of an incoming request connection, for example a special port or local interface IP address. When the incoming request connection matches on these parameters, it alters the current state of the request context to indicate that the connection is secure.

In the production environment, the CGW application listens on ports 80 and 81 on the local interface, which services the public-facing Partner sites (only reachable by the LB due to networking topology). The SecurePort Module is configured to flag incoming requests on port 81 as secure.
DNS Issue for the Core Gateway (CGW)

The Core Gateway may be used as the primary website for the identity management system and may have a URL with a format of {[identity management system trademark or name].[top level domain (TLD)]}, for example, EZShield.org, but one of its major features is partner-specific skinning and branding. The identity management system dynamically brands and styles the site and its identity for many different partners including, for example, banks and institutions.

A part of that custom branding is the URL that takes a consumer to a particular partner-branded version of the site. The URL has to be unique to distinguish the target partner site. This both for technical reasons (the incoming URL requested directly determines what skin the CGW renders to the consumer), as well as to complete the custom-branded experience for the user.

For example, the default site may be EZShield.org, that is a brand specific to the identity management system, which may include a self-standing, distribution channel for the identity management system suite of products. The identity management system may also have branded versions of the site that are skinned to match the look of several other properties or partners. The partner-branded version of CGW for such sites may have a URL in the format of [partner].[identity management system trademark or name].[TLD], for example, [partner].ershield.org, or [identity management system trademark or name].[partner].[TLD], for example, ershield.[partner].org. In this case the partner sites are just sub-domains of the default site.

Some larger partners, such as, for example, banks, often desire an even more specialized URL to create an even more completely branded impression of the site. One example might have a URL in the format of [partner's security site].[TLD]. As can be readily appreciated, this at the other end of the spectrum from sub-domains and such URLs may have different TLDs. The CGW site has to support any variation of DNS names distinguished from the primary website (for example, EZShield.org).

Now, CGW in and of itself has no problems supporting multiple distinct DNS aliases, but the problem comes in with SSL. Since CGW is a commerce site, sensitive user purchasing information is captured and in a secure manner, i.e., using an HTTPS session over SSL.

The first problem is that CGW is an ASP.NET application and is hosted on Microsoft's IIS Web server and IIS has a strict limitation that each unique incoming end-point (that is, a combination of IP Address and Port Number where the IIS server is listening for incoming requests) can only support at most one SSL certificate.

The second problem is that a channel partner may move over most or all of the Web properties that require secure connections to use Extended Validation (EV) SSL Certificates. These provide an extra level of assurance to consumers, and are so indicated by special decorations in today's most popular Web browsers (e.g., special coloring in the address bar). This very common practice today, especially for any site that is affiliated with the financial or security industries. They also cost quite a bit more because of the extra level of validation that the Certificate Authorities (CA) have to process and the extra level of assurance that they claim the guarantee.

So, the first problem can actually be partially solved by something called a wild-card SSL certificate. This a cert that identifies a unique primary domain name such as ershield.org but also applies to any and all sub-domains *.ershield.org. This was the original and first solution. The problem is that it does not help with the banks that want a completely distinguished domain name.

Instead still another type of SSL certificate called a Unified Communications Certificate (UCC) is utilized. This certificate makes use of an SSL extension known as the Subject Alternative Name (SAN) which can list one or more completely unique domain names in addition to the primary name identified by the certificate. So this certificate specifically addresses the issue.

However, today, neither wild-card certificates, nor UCC certificates are supported by any issuing Certificate Authority with Extended Validation. So to use either one, the EV moniker would otherwise need to be abandoned for the CGW sites.

So the next thing to consider is how can the CGW support multiple certificates, not just multiple names? Since IIS does not support more than a single cert, one alternative is to push the certificates one level up onto something that sits in front of IIS. A dedicated appliance known as an SSL Accelerator does just that.

An SSL Accelerator is typically an appliance with specialized hardware for doing the SSL "stuff" very fast (channel negotiation, encryption, decryption, key exchange, and the like), so it's primarily used by sites with very heavy SSL traffic. But it can also solve the problem because most (perhaps all) accelerators can support the installation of multiple SSL certificates.

It is found that it is quite possible existing load balancer(s) at the Savvis hosting provider may already in fact support the SSL Accelerator functionality. While not strictly concerned with the SSL acceleration features (a concern as traffic grows), it is determined that there is a need to know the following:

1. What SSL Accelerator features the load balancer does support, specifically what limitations if any, on the SSL certificate types and number that can be installed?
2. Are any limitations or concerns as far as load balancing and integrating with the Web server?
3. Is there a need for additional supporting devices, software or configuration and are there any additional costs?
4. If the existing load balancer does not meet the needs of the identity management system, what other options are available, what other devices can be integrated or upgraded, and how do items #1, 2 and 3 above apply to them?

Some things to keep in mind:
The idea is that potentially hundreds to thousands of partner-branded sites would be required, and each one will need at a minimum, a unique sub-domain, if not a primary domain. If the system continues to require EV certificates, then that means there will be a need to support hundreds to thousands of SSL certificates.

For these large numbers, appliances that support multiple certs at once are not necessarily needed. Realistically from a performance and an operations/systems management perspective, there may be a need to create clusters of the CGW environment that could each support say 100 to 200 partner brands (just speculating here, the number could be as low as 50 or as high as 500 depending on the number of customers each brand represents). So an appliance would only need to be capable of supporting this number of SSL certificates.

Alternatively there could be multiple end-points that service each cluster. For example, if a load balancer has a limit of 50 certs, but the system is cluster servicing 100 different partner brands requiring 100 diff certs, two IP addresses could be assigned to the cluster and two different load balancers (or sets of load balancers for redundancy) could be placed in front of that cluster, each with half the certificates.

An example of Basic Web Interaction 1000 is shown in FIG. 10 (please note, FIG. 13 is a symbol key or legend for FIGS. 10-12). In one example of a Web site, two hosts representing the client 1010 and server 1020 communicate directly. On the Client Host 1010, some process such as a Web Browser 1012 initiates connections to the Server Host 1020. On the Server Host 1020, a process such as a Web Application Server 1022 will receive these connections and establish a two-way dialog with the client.

The client and server processes bind to network End Points 1024, 1026 on their respective hosts, which are defined by an address and a port. The address uniquely identifies the host, and the port is tied to a specific process on that host.

The client and server processes communicate using the HTTP protocol 1030 which is normally an unsecure protocol (i.e., content and data are transmitted in the clear over the network). However a secure variation that is used over an encrypted connection is implemented with the SSL/TLS protocols to encapsulate and secure HTTP communication (known as HTTP Secure or HTTPS) 1040. Ports 80 and 443 represent the standard listening End Points 1024 and 1026 on a Server Host 1020 that accept HTTP communications 1030 and HTTPS communications 1040, respectively.

The SSL/TLS protocols represent a mechanism to secure any communication over an insecure channel such as the public Internet. They are implemented using public key encryption, which includes a digital certificate—a document that represents the trusted identity of the party that possesses the certificate. This certificate is signed by a trusted third-party, and includes the symbolic name of the party being identified.

In a standard HTTP over SSL/TLS, the Web Server will possess an SSL Certificate that will identify the server host using its symbolic DNS name. A Web client will typically initiate contact using the symbolic DNS name—a user-friendly, alpha-numeric name such as www.ershield.com. When the client interacts with the Web server over the clear HTTP protocol, the DNS name is simply a convenient naming convention, but when it interacts with the server over the secure HTTPS protocol, then the DNS name is integrally tied to the overall identity verification process associated with SSL/TLS communication.

The Web Application Server process is typically a container that hosts different Web Applications. This container manages various infrastructure services such as network connectivity, request decoding and negotiation, resource utilization and delegation of specific Web requests to individual Web Applications. The Web Application Server exposes an environment and execution context to its hosted applications that reflects the attributes of the request, such as the target URL, the request origin, referral information and various runtime characteristics.

The Web Application Server's responsibilities also typically include the low-level implementation of the HTTP protocol as well as the secure HTTPS variation. This implies the Web Application Server software in turn translates low-level protocol operations and data exchanges into higher-level constructs and concepts upon which Web Applications are built.

Virtual Hosting and HTTPS Complications are demonstrated in FIG. 11. While a DNS name can be used as a friendly alias for a Web Host address, a DNS name does not have to represent a unique Web server host and indeed typically several related or distinct DNS names will map to a single server host.

The HTTP protocol includes a provision for the target DNS name to be specified by the client when initiating a connection for an HTTP request. This name can then be used by the Web Application Server to dynamically resolve how to handle the request and to which Web Application the request should be delegated. This technique is known as "Virtual Hosting" and it allows a single physical Server Host, and more specifically a single Web Application Server process on that host, to service multiple requests that span different logical hosts. This technique is often used to adjust the branding or styles that are delivered as part of an HTTP response, or to execute an entirely different set of application logic (i.e. different hostnames resolve to different applications).

However there is a limitation to this technique, in that it can only be used effectively with the unsecured variation of HTTP. This is due to the fact that with the secure form of HTTP, the SSL/TLS protocols are used to secure the HTTP communication by first establishing an SSL session and then encapsulating the HTTP protocol communication within that session. Because the Virtual Hosting mechanism is an HTTP-specific feature, it is not applicable or accessible by the SSL/TLS protocols when the SSL session is established. (NOTE: Server Name Indication (SNI) is an extension to the SSL/TLS protocols that allows a client to indicate the target hostname being contacted at the start of the SSL/TLS session negotiation. Unfortunately, it is not widely adopted or supported by client or server implementations of HTTP over SSL/TLS, and as such, its usefulness on the public Internet is very limited.)

When an HTTP SSL session is first established, the server is required to send the SSL digital certificate to the client. Because it has no indication via which DNS name it was contacted (as with the Virtual Hosting technique), it must send the same single SSL certificate to the client for every request. This is why a single SSL certificate is effectively tied exclusively to a single End Point on a server host.

A variation of Virtual Hosting that also works well with SSL/TLS involves assigning multiple addresses to a single Server Host and having the Web Application Server process bind to all of them. The Web Application Server process then manages all incoming requests across all the different End Points, across all the different addresses, and uses the End Point as a request attribute to distinguish the Virtual Host being targeted akin to the DNS name in the Virtual Hosting technique above. However, some Web Application Servers (e.g. IIS up to version 6.0) suffer from a limitation that allows only a single SSL certificate to be associated with any one Web Application. So regardless of via which End Point a request comes in, only a single SSL identity can be presented to the client.

In such situations, the typical approach 1100 is to inject an intermediate network node 1150 between an HTTP client host 1110 and an HTTP server host 1120, which is shown, for example, in FIG. 11, such as another Host or a network relay device that can support SSL termination on behalf of the real Server Host (e.g., a network load balancer or SSL accelerator). In this scenario, the intermediate node 1150 hosts one or more SSL Certificates 1152 and is assigned one or more End Point addresses 1156. The SSL Certificates 1152 are assigned to the different End Points 1156. As unsecure HTTP communication 1130 and secure HTTPS communication 1140 are received by the intermediate node 1150, secure HTTPS communication 1140 is decrypted and then both the decrypted HTTPS traffic and any clear HTTP traffic 1130 is relayed to the real Server Host 1120 via its own End Point 1124, using the clear HTTP protocol 1160. The HTTP client host 1110 may comprise a web browser 1112, and the HTTP server host 1120 may comprise a web application server 1122.

Request Filtering and the SecurePort Module 1200 are shown, for example, in FIG. 12. The final technique described in FIG. 11 is adequate in many situations; however, there are still scenarios that will ultimately fail with this configuration. Specifically, a Web Application that hosts and collects sensitive data will often require a user to connect to it via a secure connection. A Web Application will detect the method used for incoming connections by inspecting various attributes of the context and environment that the Web Application Server process exposes to it.

For most Web Application Server platforms (e.g. Java Web Servlets, .NET Framework ASP.NET, the CGI interface) a simple Boolean attribute is made available to indicate if the connection is secure and an encrypted communication channel is established with the client. If the channel is not secure, any interaction that exchanges sensitive data will usually force the Web Application to first send a redirect directive back to the client, specifying that the same request should be repeated over a secure channel.

For example, let's assume a client requests a simple URL that wants to display a user's bank account summary which would include sensitive information such as account numbers and current balances. They may initiate such a request with this sample URL: http://www.samplebank.com/BankAccounts/AccountsSummary As you can see this URL indicates a clear HTTP request as indicated by its leading scheme value of "http:". When the target Web Application that this URL request is relayed to receives this request, it will detect from the hosting container that the request is insecure and send a directive back to the client to retrieve the same request over a secure channel. The Web Application will send back this URL:
https://www.samplebank.com/BankAccounts/AccountsSummary This is the same URL except that the leading scheme value of "https:" now indicates a secure channel. However, in the configuration outlined in FIG. 12, when the client repeats the request using this new URL, it will go through the same chain of events, from client, to intermediate network node, to the server, and ultimately resolve to the same insecure request at the server end as before. Once again the Web Application will detect the insecure request and send the client a redirect to the secure variation. At this point we have configured an endless loop which will prevent the server from ever completing the request.

In this case, the solution is to alter the context information that is exposed to the Web Application by the Web Application Server process. As an example, one specific technique involves injecting a filter component 1290 into the request processing pipeline of the Web Application Server 1222, a mechanism supported by many platforms (e.g. Java Web Servlets, .NET Framework ASP.NET). This filter 1290 can be configured such that it can detect some characteristic of the incoming connection being relayed by the intermediate node 1250 as an indicator of a connection that originated as secure.

For example, as is typical of such devices, the intermediate node 1250 can be configured to relay connections that were originally secure on an alternate port to the server (for example port 81). Another approach simply involves tagging the HTTP request itself with additional information to indicate the security aspect of the connection. For example, the leading portion of an HTTP request allows for the inclusion of various name-value pairs, known as headers. In most cases, the client and server restrict themselves to the set of standard, well-known headers specified in the HTTP protocol specifications, but a properly configured relay device could add a custom header, for example, with the name X-IsSecure: that supports a simple set of values true and false. The relay device would inject this header and an appropriate value into the relayed communication stream back to the server. (The relay device would also need to filter out any such headers that may be transmitted from the client that may be an attempt to spoof the server into misinterpreting connections that were originally insecure.)

To go along with this configuration on the relay device, a filter, let's call it the "SecurePort Module" 1290 would need to be installed and configured on the server host 1220. It would need to be configured in a complementary fashion to the relay device to pick up on the characteristics that indicate an original secure connection, and upon detection of such characteristics alter the context that is exposed to the Web Application. The HTTP client host 1210 may communicate with the HTTP intermediate node 1250 via HTTP (clear) 1230 and/or HTTPS (SSL/TLS) 1240 communications protocols. The HTTP intermediate node 1250 may communicate with the HTTP server host 1220 via HTTP (clear) 1260 and/or alt HTTP (clear) 1270 communications protocols, which are connected to the HTTP server host 1220 via end points 1224. The end points 1224 may be located on ports 80 and 81, ports 80 and 81 may bound to the SecurePort Module 1290, and the SecurePort Module 1290 may be functionally connected with or integrated into the Web Application Server 1222 of the HTTP server host 1220.

VIII. URL Matcher

Overview

UrlMatcher is a component that can be added to an ASP.NET site to allow an operator of the identity management system to more easily define and manage URL matching and manipulation rules.

Vanity URLs

The initial justification for developing this component came out of a need to better support vanity URLs on the CGW platform. Because CGW is built atop DotNetNuke and because DotNetNuke has some limitations with the way URLs can be defined and the way it manages them, an independent approach is developed to support vanity URLs.

Initially vanity URLs were supported through IIS's own Virtual Directory feature, where one would define a VDir and map it to a URL redirect (instead of a file path) to the target page within the CGW site. While this approach mostly works, the proliferation of VDirs in the IIS manager is cumbersome and hard to maintain, and it pollutes the administration window when managing the IIS site.

Also, it means that each vanity URL defined is global across all Partner sites, and you cannot remap a particular vanity URL to mean different things for different Partners. For example, a common vanity URL defined/starthere may be provided that maps to the PSS landing page of the identity management system. It currently always maps to the original PSS landing page, but it might be useful for newer partners to always default to the alternate PSS landing page (which does user lookup by Personally Identifiable Information ("PII") instead of Activation Code). With VDir, this is not an option.

The need to support vanity URLs more easily was compounded with release 2.2.0 when the alternate PSS activation was first introduced. With this new enrollment method, it is important to be able to quickly support Retailer-specific vanity URLs and there can be quite a number of Retailers per Partner site.

Partner Site Aliases/Redirects

A second use for the UrlMatcher is supporting redirects for alternative domains (host aliases) for the identity management system's Partner sites. For example, it may be the case that the Partners have a primary host alias, which is used to determine the skinning and branding that the CGW platform delivers, where the URL is in the format of [partner].[identity management system trademark or name].[TLD]. Examples are:

[partner].ershield.com www.ershield.com (the default site).

But in addition to these primary host aliases, alternate host aliases may be defined that redirect back to the primary. For example, "www" may be added in the format of www.[partner].[identity management system trademark or name].[TLD], for example, www.[partner].ershield.com. Other possibilities include a simplified URL in the format of [identity management system trademark or name].[TLD] such as, for example, ershield.com, or alternate TLDs such as, for example, ershield.org or www.ershield.org.

Using the identity management system, these maps are managed and redirected through a combination of DNS entries (which cannot be avoided) and unique IIS sites are set up on each PROD server for each primary host alias (which can and should be avoided). The use of IIS features is cumbersome, and a pain to manage. Additionally, there are some patterns of aliases that exist for every Partner site (and often are the only alternate aliases), and it would be advantageous to avoid the need to define them for each one, but simply support a single pattern definition to cover them all.

In order to solve the problems noted above, UrlMatcher was developed, which the identity management system to support vanity URLs more easily and readily and with better specificity and flexibility.

The UrlMatcher is implemented as an ASP.NET HttpModule/HttpHandler, and it is initially targeted for the CGW app site, but can be reused as needed elsewhere. The component adds support for inspecting incoming requests, matching different elements of the request (usually the URL, but also cookies, params, client IP, and the like) against pre-defined patterns (static values or regex patterns), and then taking some action, such as executing a URL rewrite, a client redirect or transfer to another page within the current site. The patterns or "rules" may be defined in a file on disk, but may also be moved to the database so they are centrally managed and can benefit from an appropriate admin tool.

A further problem with this approach was encountered. The whole point of vanity URLs is to define a short, user-friendly symbolic name that can be appended to one of the domains owned by the operator of the identity management system, for example, www.ershield.com/starthere or deluxe.ershield.com/[partner], that will take the user to some predefined location or landing page that is normally more cryptic to address directly or that may change over time. One of the problems with using the UrlMatcher is getting IIS to send these URLs to the UrlMatcher in the first place. UrlMatcher is an ASP.NET component, and in order for IIS to send an incoming request to the ASP.NET subsystem, one has to define a rule in IIS6 which tells it which ISAPI Plugin (more accurately, which ISAPI Extension) should handle the request.

IIS6 supports only two different kinds of such rules—file-extension matching rules or send everything rules. (II7 changes this model completely—it has a much tighter and more native integration with ASP.NET to begin with and these rules are actually defined in the ASP.NET configuration for a given site.) So ASP.NET integration under IIS6 is normally implemented with the file-extension matching rule, and when ASP.NET is installed it adds many of these rules (.aspx, ashx, .asmx, .svc, and the like) to IIS6 for a given site. The problem here is that the vanity URLs do not work with these rules because there is no file extension. The other rule type "send everything" can be used instead—it means that IIS6 will send every request it gets for the target site to ASP.NET, then the UrlMatcher will get a chance to inspect every request. However, this has a negative impact on performance since it means that requests for assets (such as images, Flash files, videos, static on-disk files, and the like) will also have to go through ASP.NET instead of being served directly by IIS.

So, the only other option that IIS6 provides is ISAPI Filters. Filters are another IIS-native component (written in C or C++)—they also inspect every incoming request, but are much more lightweight (i.e., do not invoke the whole ASP.NET processing pipeline). A Filter can be written to match some pattern (such as 1-segment paths with no extension like the vanity URL format described above) and given that pattern, do something that will make IIS pass that request to ASP.NET and thus the UrlMatcher system.

Ionic's Isapi Rewrite Filter (IIRF) is an ISAPI filter. The primary purpose of IIRF is to do request URL matching and then redirect or rewrite the request. So with IIRF, vanity requests are matched, and rewritten with some extension. Then, that extension can be mapped and handled by ASP.NET, and UrlMatcher can process them.

For example, the extension ".vanity" is to be processed by ASP.NET:
User sends a request for http://www.ershield.com/starthere
IIRF matches the path part /starthere against regex ^/[^\.?]$ which describes a single-segment path with no extension (the UrlMatcher also tests for ^/[^\.]?.$* which is an extensionless, single-segment request with query-string parameters)
IIRF rewrites the request as /starthere.vanity
IIS6 matches the request and hands it off to ASP.NET
ASP.NET sends the request through to UrlMatcher
UrlMatcher matches the request to one of its rules and takes action, redirecting to some other URL such as /Default.aspx?tabname=ProvisionalLandingPage
If UrlMatcher does not match the request to a rule, then it proceeds through to the normal ASP.NET request processing pipeline One Example of Implementation Details The code and redistributable binaries for UrlMatcher may be provided in a common repository as a part of a core library. The UrlMatcher module is preferably integrated into CGW as part of the library dependencies and configuration for the site.

IIRF needs to be installed and configured with IIS. According to the identity management system, a site-specific configuration file for CGW may be defined and included in the CGW codebase. It references an external config file that is found in the target deployment environment (e.g., DEV, QA, STAGE, PROD, and the like) that defines the environment-specific configuration.

UrlMatcher is implemented as a collection of components, that include an ASP.NET HTTP Module and HTTP Handler. The Module is a required element that must be included and configured in any site that will use UrlMatcher. The Handler is an optional component that allows usage of UrlMatcher in an alternate mode of operation, which can improve its performance and reduce its intrusion into an ASP.NET application under certain circumstances.

UrlMatcher may be made available as a set of redistributable binaries (and/or source code) as part of a core library, which may be provided in a common repository. UrlMatcher has some dependencies on other core libraries and components for basic services like logging and templating support. A redistribution folder for UrlMatcher may be adapted to contain the necessary components including its own dependencies.

Configuring an ASP.NET Web Site/Web App

Note, in this example, UrlMatcher has already been integrated into the identity management system CGW application.

After obtaining the necessary components described above, the components may be added to a site's /bin folder. The web.config file needs to be configured, for example, as follows:

Define Config Section Handlers

Add customer handlers for the UrlMatcher configuration sections. Add the necessary lines to the <configSections> element, for example, as follows:

```
<configSections>
    <!-- Add this section: -->
    <sectionGroup name="EZShield.Web">
        <section name="UrlMatcher"
type="EZShield.Web.Config.UrlMatcherConfiguration,
EZShield.Web.UrlMatcher" />
    </sectionGroup>
</configSections>
```

Enable the HTTP Module and Optional HTTP Handler

Next, add the UrlMatcher HTTP Module into the <httpModules> section, for example, as follows:

```
<httpModules>
    <!-- Add this line: -->
    <add name="UrlMatcherModule"
type="EZShield.Web.Modules.UrlMatcherModule,
EZShield.Web.UrlMatcher" />*
</httpModules>
```

UrlMatcher supports two different mechanisms of servicing incoming requests. The first uses the ASP.NET request events and intercepting them from the HTTP module (configured above). The second approach is an alternative that uses HTTP Handlers. (The differences between these two approaches are detailed further below.) If one is using the second approach, then one will need to add the following line to the <httpHandlers> section, for example, as follows:

```
<httpHandlers>
  <!-- Add this line: -->
  <add verb="*" path="*.vanity" validate="true"
  type="EZShield.Web.Modules.UrlMatcherModule,
  EZShield.Web.UrlMatcher" />
</httpHandlers>
```

Configuring UrlMatcher

Finally, add a new section in the web.config file that specifically configures UrlMatcher operation. Provided below is a sample entry. More details follow concerning the various options:

```
<EZShield.Web>
  <!--
  - To enable UrlMatcher you MUST also register an HttpModule and
  optionally an HttpHandler.
    - If registered as a Handler, you must disable Module processing by
    - adding the following attribute to this configuration:
    -   evaluateOn="NONE"
    -
    - If we want to test against Session-related details, we have to evaluate
    - at a later phase of the HttpApplication life-cycle so we have to add
    the following attribute:
    -   evaluateOn="PostAcquireRequestState"
    -   forceSession="True"
  -->
  <UrlMatcher rulesSrc="~/../../IIRF/EZShieldCGW-UrlMatcher.xml"
    onRuleSrcFail="FAIL_ONCE"
    allowReloadConfig="True"
    allowShowConfig="True"
    allowShowDebug="True"
    allowShowHelp="True"
    />
</EZShield.Web>
```

UrlMatcher Configuration Options

| Name | Details |
|---|---|
| rulesSrc | Required. Specifies an absolute or site-relative path to a "Match Rules" definition file. If prefixed with a leading ~/, the path is resolved relative to the site root (i.e., the folder containing the web.config file). |

The UrlMatcher matching rules may be defined in a centrally-located .xml file.

UrlMatcher is a matching engine and goes through each rule defined for each eligible request (eligible requests are defined outside of UrlMatcher, see discussion above).

Basically, every <Match> entry in this file is a rule to test against. If the rule test evaluation is true, then the associated "action" is applied, and it can be any number of things like a redirect or rewrite, or an instruction to continue evaluating the next rule, or to evaluate a sub-group of child rules.

For this particular request, there is a section of rules for PSS2- and SSS-specific vanity URLs.

After the rule file is updated, if the CGW site is already running, one needs to add an instruction to the UrlMatcher to reload the rule file. The rule file will always be reloaded from disk when the site is first started up or restarted, but if the site is already up and it is not desirable to restart it, one or more special URLs can be used to access administrative functions of the UrlMatcher, for example, as follows:

http://<hostname>/showconfig.umx
  Displays the current rules that are loaded in UrlMatcher.
http://<hostname>/showhelp.umx
  Displays helpful info about what values can be specified for different elements of rule definitions as well as runtime context information that can be tested against.
http://<hostname>/reload.umx
  Reloads the rules from the rules definitions file.

The <hostname> can be any host that resolves to that target CGW IIS instance, so, for example, www.qa.dev.ershield.local is a URL that resolves to the QA server instance—the function of UrlMatcher is not affected by the choice of hostname being used as long as it resolves to the desired site.

The last URL is used to reload the matching rules if they are changed on disk, and the first URL can be used to verify that it is loaded. The second URL is helpful when authoring rules.

In one embodiment, the URL Matcher defines a rule-based mechanism to evaluate actions based on incoming Web requests and Web application context attributes.

Figure 14:
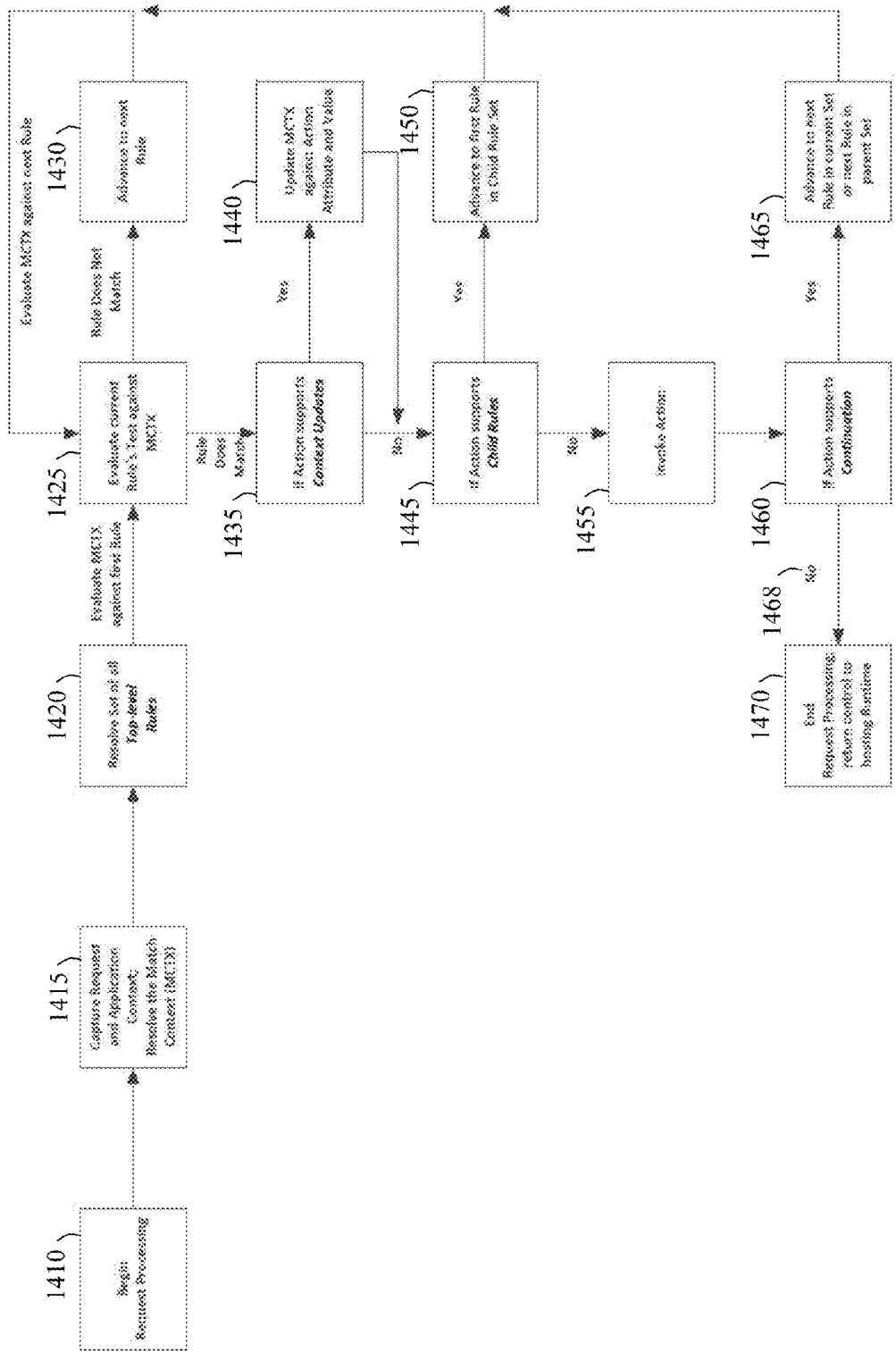
FIG. 14 is a flow chart illustrating one example of a URL matcher request processing system and method.

URL Matcher Request Processing 1400 is shown, for example, in FIG. 14. The URL Matcher may be implemented in any Web application platform that supports an extension mechanism to intercept or delegate Web requests. The key component of the URL Matcher is the request processor which is the integration point of the URL Matcher to its hosting Runtime (such as a Java Servlet container or the .NET Framework's ASP.NET Runtime).

The URL Matcher will accept each Web request that the hosting Runtime will resolve as destined for the Matcher component. For each request, the Matcher will resolve a Match Context (MCTX) which captures all the attributes and elements of the request and application that can be accessed by the URL Matcher.

The Matcher will iterate through its set of preconfigured Rules, testing the request against each rule in turn. Every Rule is defined by two features:

Match Test—a description of something about the Match Context that should be tested against Match Action—some operation that should be invoked upon a successful Match Test Match Tests may be defined by any of the following elements:

An evaluation kind that determines how the test should be evaluated, such as an equality test An attribute of the Match Context to test against, such as a URL path An argument value to resolve the test against, such as a comparison value Match Action may be defined by any of the following elements:

An action kind that determines what action to perform, such as a client redirect An attribute of the Match Context to resolve the action against, such as the original hostname An argument value to resolve the action against, such as a fixed path The URL Matcher is configured with a collection of one or more Rule Sets, which is an ordered sequence of Rules. An initial, Top-level Rule Set represents the starting collection of Rules that all evaluations will begin with. Every Rule in a Set may optionally define its own nested Rule Set, known as a Child Rule Set. Depending on the kind of Action configured on a Rule, a successful test may invoke further evaluation of Child Rules.

When a Rule Match Test evaluates successfully (i.e. a Match is found), the Matcher will evaluate the Rule's Match Action. Depending on the action kind, the Action may allow for altering one or more attributes of the Match Context. The Match Context represents state of the request being processed and so any alterations to the Match Context by any one Rule will persist for subsequent Rule evaluations. In this way Rules may build upon Rules to produce a cumulative effect of a final transformed Match Context.

A Match Action may also support the notion of Child Rules (see Step 1445), which allow grouping of Rules for further, conditional evaluation. In this way, Rules and Rule Sets can define a complex hierarchy of Rules.

Lastly, a Match Action's specific operation will be invoked (see Step 1455). It may take an attribute of the Match Context as an argument, such as a path segment or request scheme. Additionally it may take a static or computed value as an additional argument to resolve the final operation. Finally, if the Match Action kind supports the notion of Continuation (see Step 1460), then after the Action is invoked, the Matcher will advance to the next Rule (see Step 1465) following the successfully matched Rule and continue to process the request as before. If the matched Rule is the final Rule in a Child Rule Set, then a Continuation will advance the Matcher to the parent Rule Set at the next Rule that follows the parent Rule that defined the current Child Rule Set.

However, if the matched Rule specifies an Action that does not support Continuation (see 1468), or the Matcher has reached the end of Rule Set, then the Matcher's processing of the current request is complete, and it will return control to the hosting Runtime from which it was invoked (see Step 1470).

The URL Matcher Request Processing 1400 may comprise a series of steps as follows: Begin Request Processing 1410; Capture Request and Application Context; Resolve the Match Context (MCTX) 1415; Resolve Set of all Top-Level Rules 1420; Evaluate MCTX against a First Rule; Evaluate current Rule's Test against MCTX 1425; If the Rule Does Not Match, then Advance to the next Rule 1430 and evaluate MCTX against the next Rule; If the Rule Does Match, then evaluate whether Action supports Context Updates 1435; If Action supports Context Updates, then Update MCTX against Action Attribute and Value 1440 and go to Step 1445; If Action does not support Context Updates, then evaluate whether Action supports Child Rules 1445; If Action supports Child Rules, then Advance to first Rule in Child Set Rule 1450, evaluate MCTX against the next Rule and go to Step 1425; If Action does not support Child Rules, then Invoke Action 1445; If Action supports Continuation 1460, then Advance to next Rule in current Set or next Rule in parent Set 1465, evaluate MCTX against the next Rule and go to Step 1425; and If Action does not support Continuation 1468, then End Request Processing; return control to hosting Runtime 1470.

Figure 15:
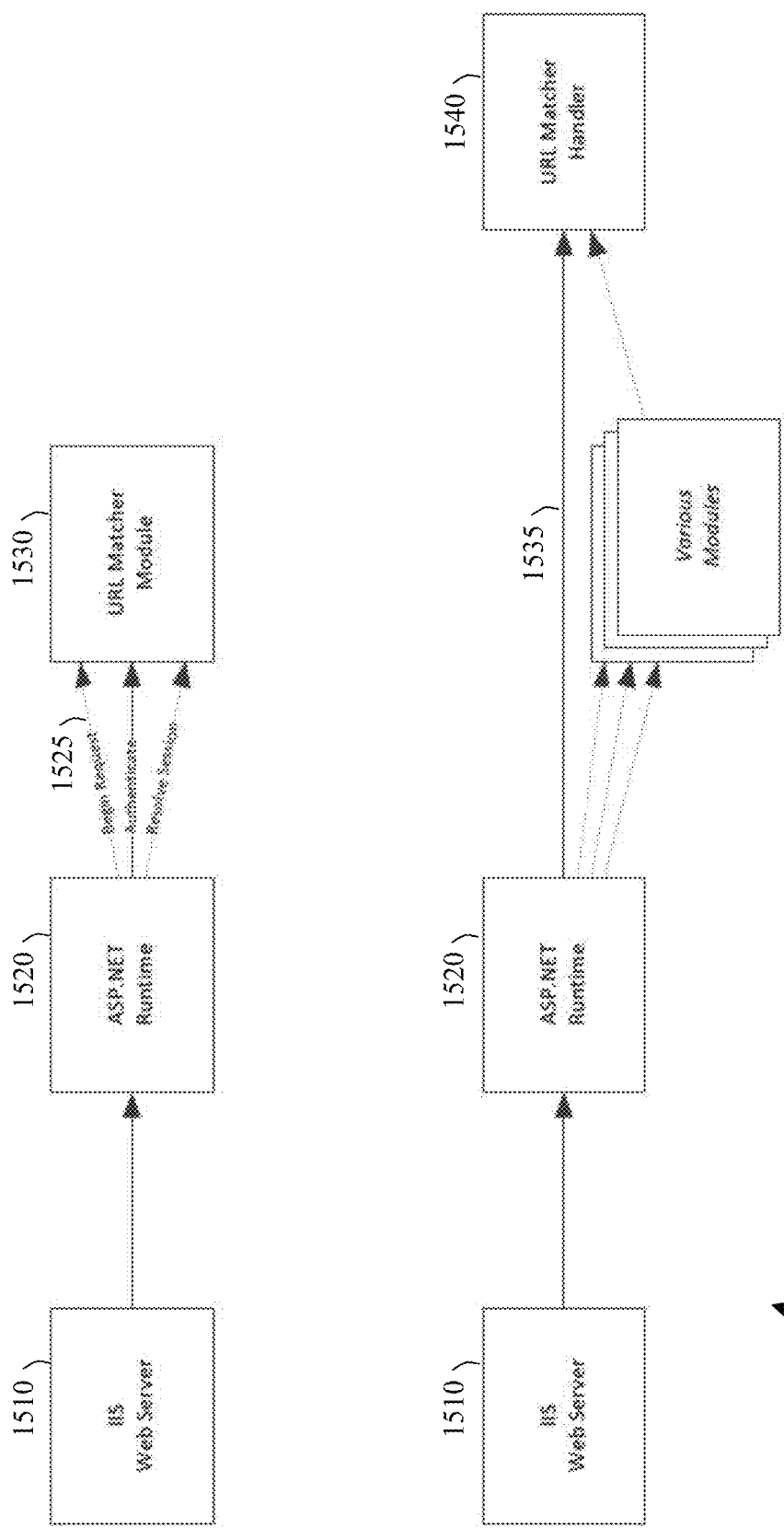
FIG. 15 illustrates two examples of implementation in ASP.NET utilizing an HTTP module or an HTTP handler.

Sample Implementation in ASP.NET and Modes of Operation is shown, for example, in FIG. 15. While the concept and design of the URL Matcher 1500 is truly platform agnostic, we present a sample implementation targeting the ASP.NET Runtime of the .NET Framework.

The .NET Framework is itself hosted in a containing Web Server 1510, such as IIS. IIS receives an incoming request from a Web client, such as a Web browser, and appropriately handed off to the ASP.NET Runtime 1520, when the request is detected as targeting an ASP.NET resource.

Within the ASP.NET Runtime, the URL Matcher would be registered as an HTTP Module 1530 or an HTTP Handler 1540. In the former case, every request 1525 will be passed to the URL Matcher to be inspected. In the latter case, only certain requests that match some pre-configured set of file extensions 1535 will be passed to the URL Matcher. These are two modes of operation for URL Matcher on the ASP.NET Runtime:

- As an HTTP Module 1530—a component that can be registered to intercept every request to the ASP.NET Runtime for different events in the request processing pipeline. The ASP.NET Runtime defines numerous events during the course of a request, such as the start of the request, the authentication phase, or the session resolution phase. The URL Matcher can be configured to process the request at any one of these events, and the ASP.NET Runtime will pass every request through the URL Matcher during that event phase.
- As an HTTP Request Handler 1540—a component that can be registered to intercept only specific requests that include a path that matches a specific file extension. This mode of operation is much more efficient because it only passes a subset of requests through the URL Matcher, however it is also much more restrictive since it limits the requests that can be processed by matching complete files or file extensions.

Implementation Samples

The following table lists a set of attributes of a Match Context that are accessible when evaluating a Match Test and/or evaluating a Match Action.

TABLE 1

Match Context Attributes accessible for testing a Match or invoking an Action

| URL/Request Attribute | Match | Action | Description |
| --- | --- | --- | --- |
| IsDebug | ✓ | | Whether the current rule (or all rules) are enabled for debugging. |
| Url | ✓ | ✓ | The complete request URL. |
| HttpMethod | ✓ | | The client's HTTP transfer method, such as GET, POST or HEAD. |
| IsAuthenticated | ✓ | | Whether the current request is authenticated. |
| IsLocal | ✓ | | Whether the current request is from the local computer. |
| IsSecure | ✓ | | Whether the current request uses secure sockets (HTTPS). |
| AuthenticationType | ✓ | | The type of authentication used to identify the current user, or empty string. |
| UserIdentity | ✓ | | The Windows logon name for the current user, or empty string. |
| RequestPath | ✓ | | The virtual path of the current request, including the PathInfo. |
| RequestFilePath | ✓ | | The virtual path of the current request, excluding the PathInfo. |

TABLE 1-continued

Match Context Attributes accessible for testing a Match or invoking an Action

| URL/Request Attribute | Match | Action | Description |
|---|---|---|---|
| RequestPathInfo | ✓ | | Additional path information for a resource with a URL extension. |
| RequestPhysicalPath | ✓ | | The physical file system path corresponding to the requested URL. |
| RequestReferrerUrl | ✓ | | The URL of the client's previous request that linked to the current URL. |
| RequestUserAgent | ✓ | | The raw user agent string of the client browser. |
| RequestUserHostAddress | ✓ | | The IP host addres of the remote client. |
| RequestUserHostName | ✓ | | The DNS name of the remote client. |
| Path | ✓ | ✓ | The full, absolute path of the request URL. |
| Authority | ✓ | ✓ | The DNS host name or IP address and the port number. |
| DnsSafeHost | ✓ | | The unescaped host name that is safe to use for DNS resolution. |
| Fragment | ✓ | ✓ | The escaped URI fragment of the request URL. |
| Host | ✓ | ✓ | The host component of the request URL. |
| HostNameType | ✓ | | The type of the host component of the request URL (Unknown, Basic, Dns, IPv4, IPv6). |
| IsDefaultPort | ✓ | | Whether the port value of the URL is the default for this scheme. |
| PathAndQuery | ✓ | ✓ | The combined Path and Query separated by a question mark (?). |
| Port | ✓ | ✓ | The port number of the URL. |
| Query | ✓ | ✓ | The query information of the URL. |
| Scheme | ✓ | ✓ | The scheme name of the URL, converted to lowercase. |
| UserInfo | ✓ | ✓ | The combined username and/or password associated with the URL. |
| UserName | ✓ | ✓ | The username associated with the URL. |
| Password | ✓ | ✓ | The password associated with the URL. |
| Headers:UrlPartArg | ✓ | | The name/value collection of Headers. |
| Cookies:UrlPartArg | ✓ | | The name/value collection of Cookies (names and values only). |
| QueryParams:UrlPartArg | ✓ | | The name/value collection of Query Parameters (GET). |
| FormParams:UrlPartArg | ✓ | | The name/value collection of Form Parameters (POST). |
| ServerVariables:UrlPartArg | ✓ | | The name/value collection of IIS server variables. |

The following table lists the kinds of Actions that can be specified by a Rule.

TABLE 2

Supported Actions

| Action Kind | Description |
|---|---|
| ReloadConfig | This action indicates to the UrlMatcher module to reload the configuration that it uses to define its matching rules and actions. |
| ShowConfig | Renders the current Match Rules configuration being evaluated by the UrlMatcher. |
| ShowHelp | Renders a response that provides a references to aid in configuring the match rules. |
| Continue | This action indicates to continue the matching process with the next rule in the current rule group. |
| Exit | This action indicates to stop the matching process and allow the request to continue past the UrlMatcher module. |
| Terminate | This action indicates that the request should be terminated immediately but all buffered output should be flushed. |
| Disconnect | This action indicates that the request should be terminated immediately and abruptly by disconnecting from the client. |
| Redirect | This action indicates that the request should respond back with a client redirect to the path indicated in the associated Action Path. |
| Rewrite | This action indicates that the request URL should be rewritten to the path and query of the current MatchContext.PathAndQuery property. |

TABLE 2-continued

Supported Actions

| Action Kind | Description |
| --- | --- |
| Transfer | This action indicates that the request should be server-transferred to the handler resolved by the associated Action Path. |
| Execute | This action indicates that the request should be server-executed by the handler resolved by the associated Action Path. |
| MatchRules | This action indicates to the UrlMatcher to process the request against the nested children Match Rules configurations. |

Two example kinds of Match Tests are a Value Comparison and a Regular Expression (Regex) Evaluation. For each of these Match kinds, the following table lists the test-specific options that may be specified to control how the Match Test is evaluated.

TABLE 3

String Compare Options

| Option | Is Default |
| --- | --- |
| CurrentCulture | |
| CurrentCultureIgnoreCase | |
| InvariantCulture | |
| InvariantCultureIgnoreCase | |
| Ordinal | |
| OrdinalIgnoreCase | ✓ |

TABLE 4

Regex Compare Options

| Option | Is Default |
| --- | --- |
| None | |
| IgnoreCase | ✓ |
| Multiline | |
| ExplicitCapture | |
| Compiled | |
| Singleline | |
| IgnorePatternWhitespace | |
| RightToLeft | |
| ECMAScript | |
| CultureInvariant | |

FIG. 16 represents a sample configuration of Rules 1600 showing a Top-level Rule Set 1610, which contains a Child Rule Set 1620, which itself contains another Child Rule Set 1630. That is, the present system may utilize nested loops to increase the complexity and functionality of the URL matcher request processing system and method.

IX. Breach Solutions

In some embodiments, the identity management system and method further comprises breach solutions methods, as described in detail below:
IX.1 Abstract
IX.2 Example 1: Assist Module
IX.3 Example 2: Prepare Module
IX.4 Example 3: Combined Assist and Prepare Modules
IX.5 Detailed Descriptions IX.1 Abstract Small businesses suffer proportionately more than their larger counterparts due to their inexperience in preparing for and responding to these threats. For example, nearly three quarters of U.S. small businesses experienced a breach attack in 2010 (source: Symantec 2010 SMB Information Protection Survey—Global: June 2010). Small businesses tend to be under-resourced and overwhelmed by countless regulations. Most solution providers are focused on consultative enterprise breach solutions that are much too expensive for smaller businesses to consider. This leaves a large underserved market increasingly vulnerable and progressively more targeted by security threats.

The identity management system is adapted to include a suite of tailored, customizable security and breach solutions designed to meet a small business's evolving security requirements both before and after a breach incident. One example of such suite is EZSHIELD's SYCURITYMAX Solution, which may include one or more elements of SYCURITY Assist and/or SYCURITY Prepare. The identity management system's breach preparation service offers assistance in creating catered breach response plans that addresses both regulation compliance and security best practices relative to an individual business's profile, enabling a business to act quickly and completely when confronted with a breach threat. With Safe Harbor, PCI, Red Flag, and HIPAA compliance in mind, the identity management system offering produces value and keeps ahead of the most critical regulatory requirements across individual small business industries.

IX.2 Example 1

Assist Module

Description of Service
Access to Assist Portal

The Assist Module may be provided as part of a customer's annual subscription. The customer's registered representative may access a secure web-based Assist Portal ("Portal") 24/7 to self-assess Customer's potential risk of exposure, create a security and privacy protection plan, and access employee training materials.
Security Score Self-assessment This assessment will serve as a best practice evaluation in the area of Personally Identifiable Information ("PII"). The assessment will walk Customer through a series of questions pertaining to the policies and procedures it has in place based on Customer's industry and the PII it collects. The results of the assessment will provide Customer with a guideline to determine areas of improvement in its PII protection practices. This assessment will touch on Red Flag, Health Insurance Portability and Accountability Act (HIPAA), Payment Card Industry Security Standards (PCI) and EU-US Safe Harbor compliance (allowing data transfer between the United States and the European Union) needs in addition to general best practices in information security.

Security and Privacy Planning

Customer will receive access to a portfolio of various policy, procedure and process templates. These templates help the Customer ensure that appropriate levels of security are in place. Together, these various documents then serve as the Customer's working security and privacy plan.

Security and Privacy Policy
Back-up and Recovery Process
Vendor Due Diligence Process
Red Flags Compliance Process
Employee Screening and training policy Employee Security and Privacy Training Materials The Security and Privacy Training portion of the Assist Module allows the Customer to educate its employees on the importance of protecting their customers and their fellow employees' personal information. "Small Business Employee Privacy Training" may be provided to the Customer, for example, in the form of a PowerPoint presentation focused on Privacy and Security imperatives that employees need to know and do. Also included are a post-training quiz, employee sign-off form, and quarterly newsletters to keep Customer's employees' security and privacy knowledge up to date.

IX.3 Example 2

Prepare Module

Description of Service

The Security Prepare service ("Service") may include the following:

Prepare Materials

Prepare services help Customer to prepare for how it may handle a breach incident should one occur. There are three sub-areas to this service that can be leveraged to help guide the business through identifying a process flow it can execute in the event of a breach incident. The following materials may be made available:

Incident Response Plan
Victim List Template
Incident Response Sheet
Incident Response Plan In order to meet tight timelines for notification of victims once a PII Breach is recognized, certain materials and processes need to be pre-positioned for action, including:

incident response process;
incident response team roles and contact information;
specified data breach "assessment and escalation policy"; and
prepared notification messages.

Victim List Template

Customer is given access to a victim list template form allowing Customer to assess pre-breach incident, how it will execute delivery of this information for a faster turnaround time should an incident occur, mitigating potential legislative risks.

Incident Response Sheet

The Customer is provided with an incident response sheet to use as a guide in outlining the various information points that will be required to determine an effective and compliant notification plan should a breach occur.

Supplemental Services

Customer may purchase consulting services (to identify issues or concerns with Customer's proposed data breach response policies and procedures) and/or training services (to implement Customer's data breach response policies and procedures).

Notification Plan Recommendation

Upon Customer's report of a Breach Incident and completion of a Breach Incident Response Report, Customer may be provided with a Breach Assessment Report which will provide a recommendation as to the course(s) of action Customer should take based on the facts provided and available at the time of the Breach Incident Response Report is submitted. The recommendation may include a notification requirement of Customer's breach victims.

Locked Pricing of Identity Theft Protection Services for Customer's Victims

Customer may have locked-in, preferred pricing for restoration, monitoring and other identity theft protection services for its breach victims. Preferably, these costs shall not be increased even if the cost of such services should increase over time.

Notification Plan Development Implementation

Should Customer decide to order notification services and notification plan implementation, the company implementing the identity management system and Customer may negotiate and enter into a services agreement identifying how the company will notify Customer's data breach victims and others of a data breach declared by Customer and how Customer will be charged for such services ("Service Agreement").

The Prepare services preferably include, without limitation:

a dedicated breach specialist to assist Customer in response process;
identifying data breach victim's contact information and a data transfer protocol;
notifying breach victims or others of the subject data breach by phone, e-mail and/or letter (per applicable laws);
recommendations of notification based on current state and federal incident response regulations;
assistance with notification messaging and customer call center scripting;
managing the breach response web-site and toll-free call-in number;
providing breach victims Customer-sponsored access to Consumer Services; and
defined Notification costs and Consumer Services package/pricing.

Except as otherwise stated in the Service Agreement, preferably, Customer is billed for each breach response provided by the identity management system on a per-victim basis (for both victim contact and the Consumer Services package given).

Notification to Adhere with Applicable Laws

The identity management system will implement Prepare per applicable breach notification laws ("Laws") and maintain prepared Breach Response materials so that they are compatible with current Laws. The Prepare system is adapted to incorporate future changes in applicable Laws.

Victim Notification

As directed and purchased by Customer, the Prepare system is adapted to notify breach victims of the breach by at least one or more of the following methods (per applicable laws):

Electronic Mail Service: The Prepare system can e-mail affected persons with Customer's written notification.

Paper Mail Service: The Prepare system can provide black and white mailers posted using standard rates for notification letters (including printing, addressing, assembly, postage and mailing).

Phone Service: The Prepare system can notify affected persons, provide information and offer a live call center representative. Automated telephone services are available, but such communication does not constitute effective data breach notification in all states. A toll-free number for breach victims will be provided to serve as a primary contact. Customer service representatives work with victims to guide them through the enrollment process and help with any questions.

Breach Website and Call Center: A web page and a toll free phone number are preferably provided in order to provide instructions for online enrollment in victims' identity theft protection program, if applicable.

Location Services: The Prepare system may be adapted to help find the most current addresses of Customer's breach victims as directed by Customer for an additional charge.

IX.4 Example 3

Combined Assist and Prepare Modules

The Assist and Prepare Modules may be provided in a combined package including one or more of the features described in detail in Examples 1 and 2 above.

IX.5 Detailed Descriptions

Security Assist—Self Assessment and Score

The subscriber has created an on-line account and enrolled in the Assist service The subscriber sees a series of questions that are weighted with a scoring value and has an opportunity to answer "yes" or "no" to each question as it is presented.

The subscriber reviews each question and completes the entire set of questions presented during the assessment.

When the assessment is complete the subscriber sees a calculated score for the assessment The subscriber also sees a customized action plan based on the values entered during assessment The Score/Assist solution is anchored by the first step in the process which is the self-assessment questionnaire.

FIG. 7.A—Screenshot—Security Assist Assessment—Get Started

The assessment is divided into 18 subject matter areas. The subscriber is presented each of the these subject areas in sequence in the form of a question such as: "Does this subject area apply to your business operation?"

(I) A subscriber may determine that the presented subject area does not apply to their business operation, in which case;
 1) the subscriber would acknowledge with "no skip this area".
 2) the application would note the exclusion of this subject matter area from the business profile
 3) the application would present the subscriber with the next subject matter area, again in the form of a question as to its application to the business operation.

FIG. 7.A shows an example of a computer display screen according to one embodiment of the identity management system and method of the present invention. The display screen may comprise two tabs, one for "My Identity" and another for "My Business," which is selected in the present example. The horizontal bar at the top of the screen including the two tabs may include links to "CONTACT," "MY ACCOUNT" and "LOG OUT."

Within the "My Business" tab, a navigation bar may be provided on the left side of the screen, which may include branding for the Security Assist Assessment tool, for example, "DELUXE PROVENT[SM] Identity Theft Protection" and "4Biz." The navigation bar may include a statement concerning the start date for the customer's service, for example, "Protected since December 2011." The navigation bar may have a "REPORT A BREACH" button, a "MY RESTORATION" box with an option for expansion of the field and an option to access a help screen designated with a question mark, ("?") logo, a "MY BUSINESS WALLET" box with an option for expansion of the field and an option to access a help screen designated with a question mark, ("?") logo. The navigation bar may include Sycurity Assist navigation bar including "Step 1: Self-Assessment," "Step 2: Privacy & Security Planning" and "Step 3: Employee Security Training"

The top of the "My Business" tab may contain a second horizontal navigation bar including "My Dashboard," "My Business Wallet," "Sycurity Assist," "Sycurity Prepare" and "Report A Breach" tabs, of which, in the present example, "Sycurity Assist" is selected. The "Sycurity Assist" subscreen may include a banner ("Sycurity Assist" and "Protect Your Business Identity" in this example), an identification noting the user's progress through the system ("Step 1: Self Assessment Plan" in this example), a prompt to the next step ("Step 2" in this example), and an introductory message with a button prompting the user to "Get Started With My Self Assessment Plan." The bottom of the "Sycurity Assist" subscreen may include further navigation links and branding associated with the company and/or third party evaluations of the present website (corporate service mark, corporate logo, TRUSTe logo and the Better Business Bureau (BBB) logo, in this example).

FIG. 7.B—Screenshot—Security Assist Assessment—Subject Area "Your Business Office"

(II) A subscriber may confirm that a subject area applies to the business operation being assessed.
 1) by annotating the subject matter area with "yes (does apply)"
 2) the application will deliver a series of subject matter area detail questions
 3) the subscriber will acknowledge each detail question with a "yes" or "no/unsure" answer
 4) the application captures the response state of "yes" or "no" for each question FIG. 7.B includes the features of FIG. 7.A described above except the identification noting the user's progress through the system ("Step 1: Self Assessment Plan" in this example) no longer includes the prompt to the next step ("Step 2" in this example), and the content below this point now includes the first of several questions from the system, in this example, "QUESTION 1 of 18." The screen may include two clickable buttons including the text "YES" and "NO—Go to next question," which trigger the next logical step in the process as appropriate for each answer.

FIG. 7.C—Screenshot—Security Assist Assessment—"Your Business Office" Assessment Area
 5) after the completion of detail questions in subject matter area, the application presents the subscriber with the next subject matter area.

FIG. 7.C follows when "YES" is selected in the screen corresponding with FIG. 7.B and the content of the screen is the same as that set forth in FIG. 7.B except that sub-questions relating to the first question are displayed and a "Next" button is provided at the bottom of the list of sub-questions.

The application saves the state of the question subject matter area when the subscriber proceeds to the next question subject matter area.

The subscriber may stop progress through the assessment and return again to the point last saved in the process.

The subscriber will proceed through the subject matter areas, identifying those that apply and confirming or denying the detail questions as in process (I) or (II) above.

Upon completion of the assessment the application calculates an assessment score and presents this to the subscriber. (See technical description)

Security Assist—Self Assessment Action Plan

Upon completion of the assessment the application generates a customized security action plan for the subscriber.

The action plan is customized based on the responses provided by the subscriber during the self assessment. For each of the subject matter area detail questions that are identified as unresolved by the subscriber, a corresponding recommended action is included in the action plan. (See technical description).

Score Building Technical Description

Scoring is based on tiers. Each tier represents a percentage of total possible weight. Tiers are currently evenly designated in 20% ranges (e.g., 0-20, 20-40, 40-60, 60-80 and 80-100). The term weight is used because certain assessment areas are deemed to have more or less impact than other areas. A higher weight indicates more impact and a lower weight indicates less impact. Using a tiered score based on a percentage allows for the number of questions and their weights to vary as necessary.

Each possible answer to a question in the assessment is given a weight. The sum of all weights is the total possible weight. The sum of weights for each answer given in the affirmative is divided by the total possible weight. The resulting percentage then is evaluated to determine into which tier the assessment results belong.

The diagram below shows how a score is calculated. This assessment has two questions. Question 1 has 4 sub questions. Question 2 has 6 sub questions. The weights for each question are shown in parenthesis. An x indicates the user responded affirmatively for that question. The Score system uses weights for sub-questions when the parent question is answered affirmatively. The weight of the parent should equal the sum of the weights of its children. The Score system uses the weight for the parent question when it is answered negatively. This latter indicates a section does not apply; therefore, it should not impact the score.

The total possible weight is the sum of all parent weights.
Question 1 has total 9 possible weight.
Question 2 has total 6 possible weight. A complete total weight of 15.
The user responded affirmatively for question 1-3 (weight=4) and question 1-4(weight=1). Total=5.
The user responded affirmatively for question 2-1, 2-2, and 2-5(weight=1 for each). Total=3.
Combining these (5+3=8) and dividing by complete total weight (15) results in 0.53 or 53%.
This percentage falls into Tier 3.
FIG. 7.D—Data Diagram—Score Calculation Security Assist—Action Plan Technical Description An action plan is based on any assessment parent questions responded to affirmatively, and that its sub-questions responded to in the negative. For each question, a corresponding action text is prescribed. The action plan is built dynamically based on the current collection of user responses.

Each question has action text associated. For any question which the user responded to negatively for any sub-question, the action text of the question appears as a section header. This usually more generalized in nature. The action text related to the particular sub-question which was responded to negatively is then added for more specific directions.

Using the previous diagram as a basis for an action plan, the Assist system displays a document containing the following:
FIG. 7.E—Data Diagram—Action Plan Associations
More Robust and Customized Assessment and Action Plan Development The subscriber's "My Account" page collects a deeper profile of the subscriber's business, i.e.
Size of business
# of employees
Industry
Retail or wholesale
Locations (storefronts, websites)
The scope and nature of customer/client Personally Identifiable Information (PII) Data collected as part of the business processes
Payment handling processes/credit line If the user has not completed this profiling segment, they are directed to a list of profiling questions via the "Custom Action Plan Management" utility.

When user enters the assessment, the application determines which sections of self-assessment are relevant based on the profile data provided and tailors the presentation accordingly.

Over time, as changes are made to the business profile, the assessment logic provides recommendations for further self-assessment or re-evaluation of past self-assessment subject areas.

A subscriber provides the following key pieces of information in the business profile.
No of employees: between 2 and 5
Business Type: Retail
Industry: Consumer Merchandise
Storefronts: Brick/Mortar (1), Self-hosted website(s)
Payment Methods Supported: Credit Card (on-line), Credit Card (POS), Line of Credit, Account Debit Transaction Customized Assessment System Description Identification of discrete values and related business logic are determined. Implementation of UI, storage mechanism, and rules engine are dependent upon this information.

Custom Action Plan Management

The business has the ability to manage/organize what can has been completed and what still needs to be completed from the action list.
User completes assessment and is taken to the customized action plan
The action plan provides
an area for commenting for each task
A complete/uncompleted button
The ability to delete certain actions
Date and time log of when the task was completed
Ability to set a 'due date' for individual tasks
The ability to set reminder alerts for specific tasks for individual tasks to variable email address (Send reminder on X date); reminder includes 'due date' where applicable Dynamic Location Based Vendor Recommendation for Individual Action Plan Tasks When the user completes the assessment and receives the customized action plan, for every task listed, the identity management system provides a recommended vendor to contact for assistance in completing the action. This recommendation would be determined by the business location(s) (as determined by the 'My Account' page profiling) and a cross referenced table of vendors Example:
   TASK: Install Firewall
   Location: New York, N.Y.
   Vendor X: (Based on vendor location and task asked)
   [recommended vendor's name]
   [recommended vendor's address]
   [recommended vendor's phone number]
   info@blahblah.com
   [recommended vendor's URL]
      Use Promo Code: [code such as a corporate branded code] for 10% off [recommended vendor's name]

Dynamic Vendor Recommendation Technical Description

Alternate/additional vendors may be available for display or search. If multiple vendors exist for a given area, an order of precedence may be established based on factors such as rank, physical distance, company size (revenue or # employees), or other factors.

Custom Tailored Employee Education Video

On the portal the subscriber is taken through an exercise where they can edit an educational security video for employees. The video is constructed of various "segments" which can be slightly altered (Images and selected copy content that appear thought out) Examples: Video title, Title date, Contact information "who to go to internally with any questions", Select images (i.e., Employee desk).

Custom Video System Description

Live action segments, text-to-voice for the configurable meta information, dynamic diagramming or animation may be utilized.

Streaming or downloading may be utilized while considering factors such as storage space requirements, authoring and delivery technology, and other details.

Employee Security Self-Education Module (with Quiz)

Biz uploads an employee list into the identity management system Portal.
   List stores employee first name and last name
   Subscriber generates a link that can be distributed to the employees where:
      Employee is validated via login (leveraging the uploaded employee list)
      Employee sees an educational video about security
      Following the video, the employee is given a quiz testing him/her on the video just viewed
      System dynamically generates an Employee Quiz score upon completion:
         If the user passes, they are messaged that they passed (w/score) and they are done
         If the user fails, they are messaged as such and told to re-view the video and loop back though the test
   System stores the date and time that the user had completed the test and the corresponding score.
   Business can set email alerts to notify them when (a) user(s) have completed the test.
   Business can expire/delete the link/page or delete/turn off an employee's access by editing the employee list.

Employee Training System Description

Existing platform security may be configured to allow automatic creation of "limited" accounts. The quiz engine can either be integrated or custom-built. Additional logic may be introduced as needed.

Security Prepare—Automated Breach Simulation Generator

As part of breach preparation, the platform generates example breach scenarios that could affect the small business leveraging a combination of the information from the business "my account" profile page, and answers to a couple of questions:
   Where the business's customers are located
   What type of information the business collects
   The contact information the business has for its customers
   Where the information is collected (i.e., Online, store, restaurant, office)
   Where it is stored The business uses the output of the generator to pose a sample scenario to the breach incident response team, who then gets together to determine how they should respond to the breach. The simulator gives a high level description of a breach incident:
   How the breach occurred (i.e., Hacking, stolen computer, lost jumpkey, and the like)
   What information was taken
   Where the victims reside
   How many victims were affected (by state)

Once the team has communed and decided what they would do in the scenario, they are quizzed by the platform on a series of multiple choice questions:
   Does this incident require notifications be sent to the victims?
   Does the incident require victim ITP services?
   Are there any other groups that need to be notified? (i.e. —state attorney general)
   What are the requirements of the notification by state?
   How many types of notifications need to be created?
   What is the method of notification?
   What are the notification timeline requirements?

The business breach incident response team submits the quiz answers and receives a score. The business is shown a list of the incorrectly answered questions along with the correct answer highlighted. For every incorrect answer, there is a brief description of the reasoning behind the correct answer, i.e., MA state law requires that notifications go out within 48 hours after the incident was discovered.

Simulation Generator System Description

Security Prepare—Breach Response Action Plan Generator

As part of breach response, the platform generates a high level roadmap of what is required in the handling of a particular breach incident.

The subscriber begins with a list of multiple choice and free form questions, providing information about the incident:
   When did it happen?
   How did it occur?
   Was it malicious intent?
   What information was compromised?
   How many victims by state?
   What contact information does the company have for the victims? (USPS, email, or phone number)
   How did the business acquire this victim information? (through a vendor, online, in store, etc?)

The user submits the answers and is provided an outline suggestion of what to do:
   Is notification required? (by state—breach compliance requirement)
   What is the timeline requirement for notification (by state—breach compliance requirement)
   What are the notification guidelines (by state)
   Are victim protection services (ITP) required (by state)
   If victim ITP is not required, was the breach still bad enough that the business should still seriously consider offering Victim ITP?
   What type of ITP is recommended?
   How should the business notify the customer?
   Sample notification letter(s) which incorporate the information provided by the business from the breach questionnaire and business my account profile page A list of the relevant parties that need to be notified (State attorney general office, 3rd party vendors) and associated contact information and any other standard requirement (i.e., A copy of the notification(s) must be sent to the State attorney general of Vermont)

A checklist accompanies the recommendation to assist the business in ensuring it does not miss anything. The checklist should date and time stamp the items as they are checked off.

Conduct forensics to identify what has happened

Triage to ensure the breach has stopped and will not happen again

Communicate the breach details to internal parties (customer service, legal, it, Officers, PR, and the like)

Commune breach incident response team

Draft notifications

Produce notifications

Distribute notifications

Store a copy of notifications

Manage returned mails

Set up a call number for when victims have questions

An automated estimate of what it will cost to produce, manage and send the notifications (based off the generated suggestion) should be shown to the business. If they want to proceed with the identity management system performing this service, there should be a submit button, and TandC checkbox that the business can click. Upon submitting this, an automated alert should hit the identity management system internal breach service team with the details of the incident and the business contact information to contact the small business and begin working the incident A copy of the breach incident details (from the questionnaire, recommendation, and time stamped checklist) may be stored in the business's identity management system account for the business to access at any time in the future as needed.

X. Identity Alert Management

Interaction with Client Alert to Resolution Specialist

Problem this Solves

When personal information is discovered and linked to a customer's identity, the Identity Alert Management system allows the end user to control and flag that information as "approved records" or "threats". If the data is approved, it is marked as a verified record, if it's not approved and causes concern to the customer, a case is created until that data is clarified or resolved to the end consumer's satisfaction. Once a case is resolved it's added, with full comments and documentation to the updated Secure Profile.

In short, the Identity Alert Management system solves the issue that everyone has an "identity profile" but not everyone's profile is accurate and verified by the end consumer. This helps to assure that PII that is found and monitored is as accurate as possible and confirmed by the end customer.

Short Description of Solution

All of the competition in the identity theft space scans for new information and presents it to the user. The Identity Alert Management system allows the end user to interact with the discovered personal information and allows them to approve the records or flag the record as wrong. If a record is flagged as wrong or is not understood by the user, then a case is immediately created and followed up on through a Restoration Process.

Figure 8:
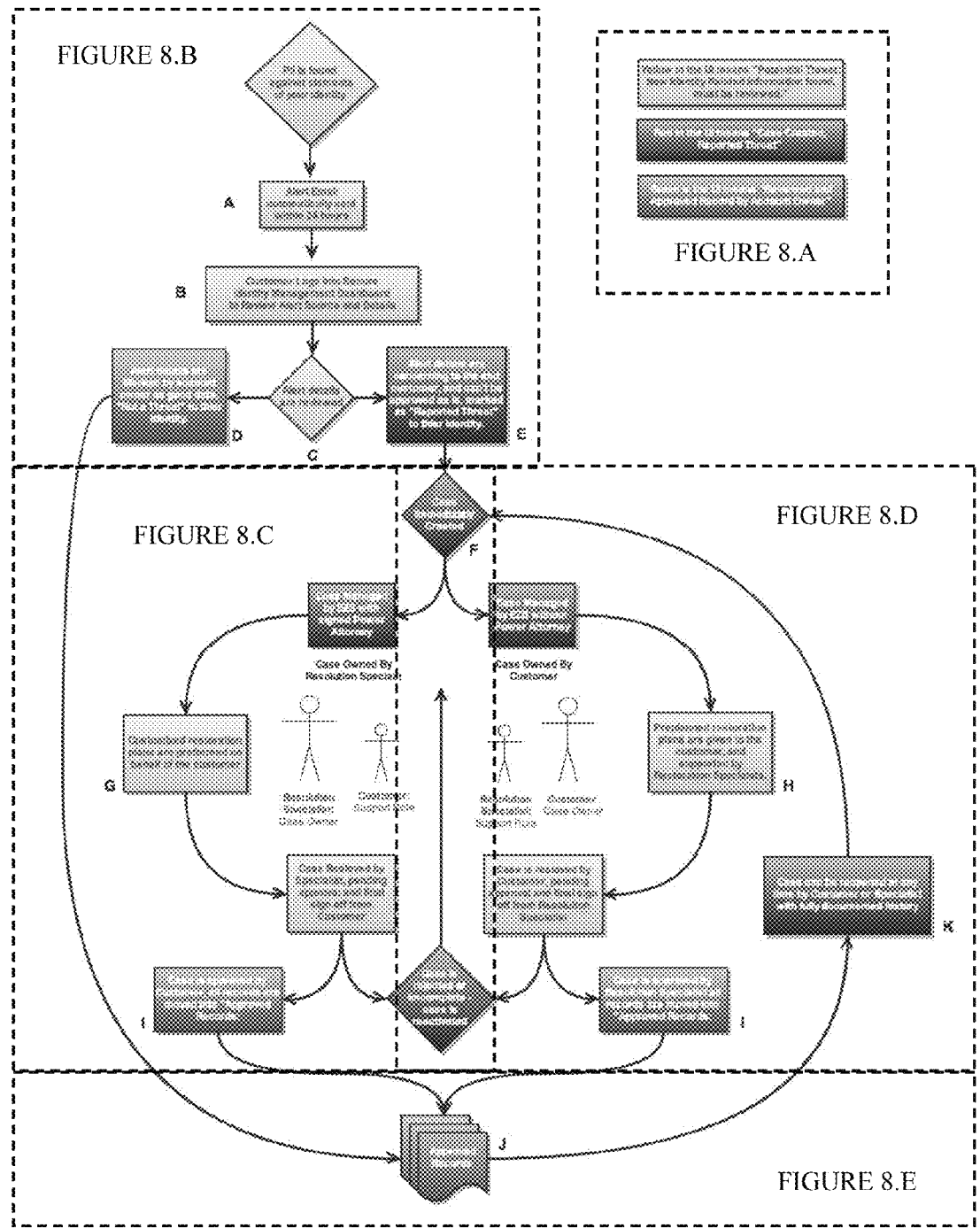
FIG. 8 is an overview illustrating an example of User Flow of Fraud Solution process according to the Identity Alert Management system of some embodiments of the present disclosure, where FIGS. 8.A, 8.B, 8.C, 8.D and 8.E are various expanded views of FIG. 8.
Figure 8A:
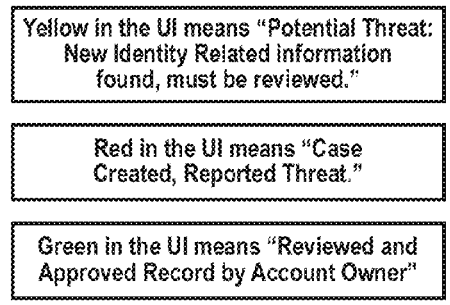
Figure 8B:
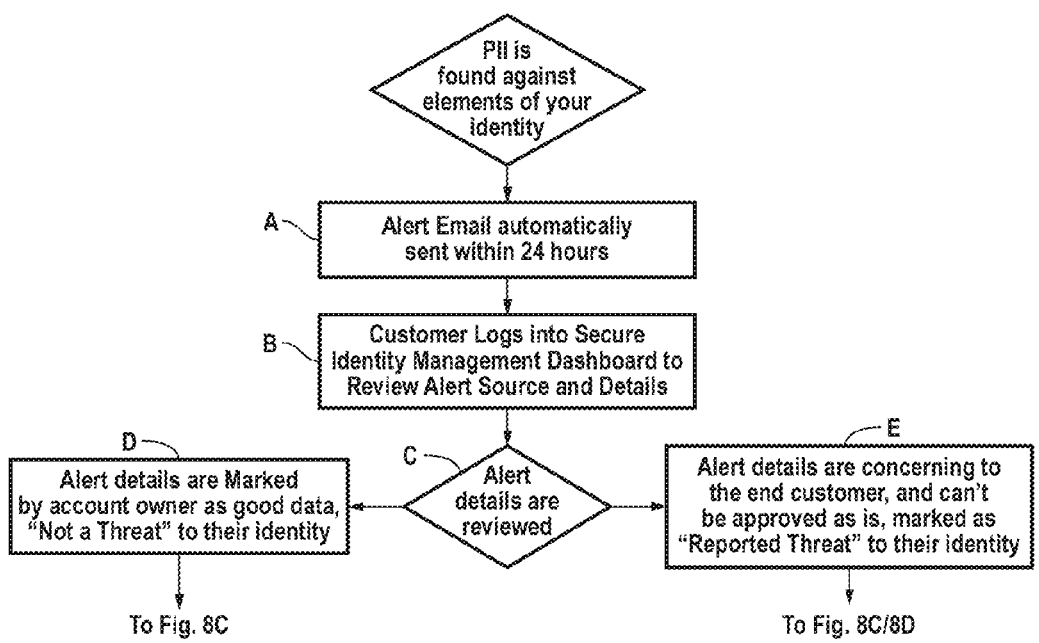
Figure 8C:
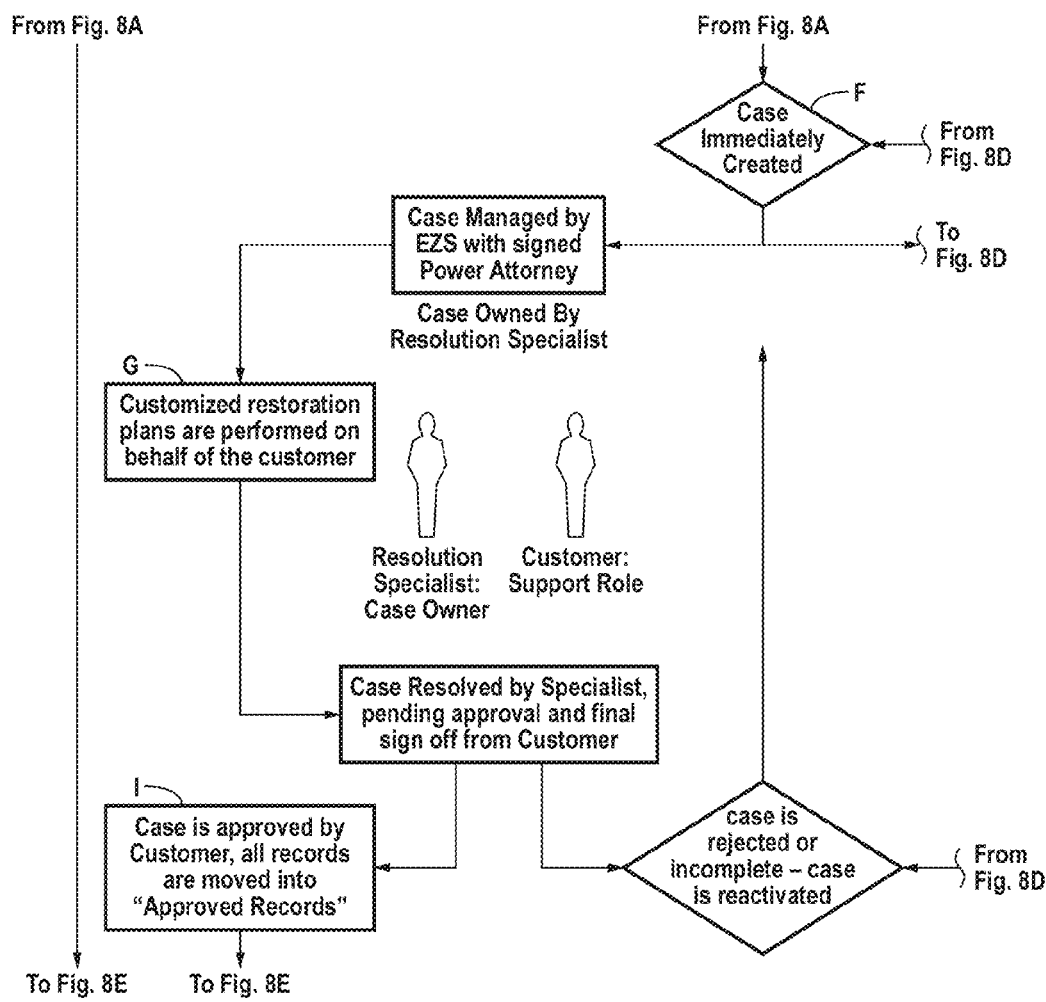
Figure 8D:
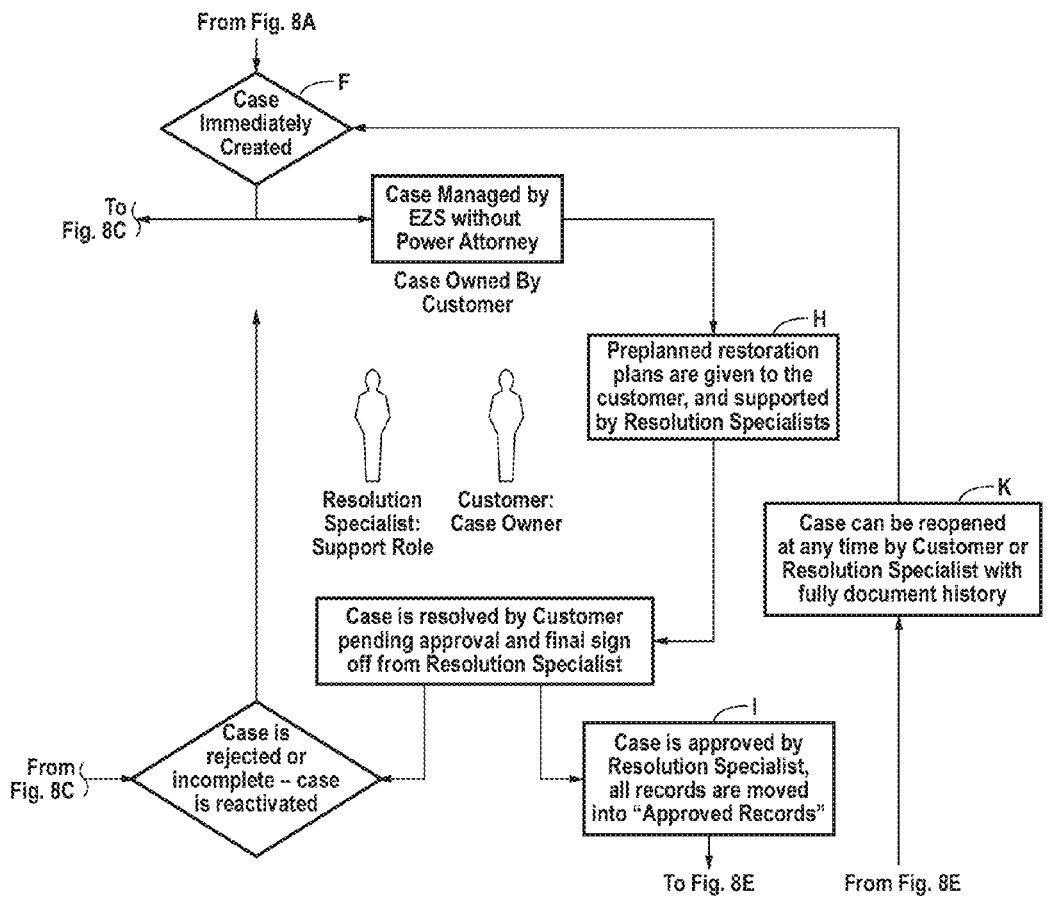
Figure 8E:
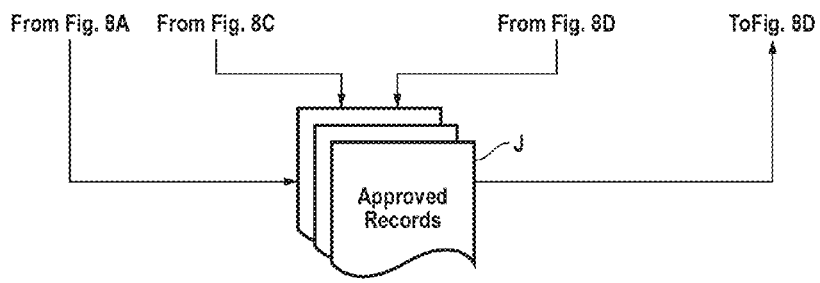

FIG. 8 illustrates an example of User Flow of Fraud Solution Process according to the Identity Alert Management. FIG. 8 is an overview. FIGS. 8.A-8.E are expanded views as noted in FIG. 8. FIG. 8.A is the legend for the Figure, FIG. 8.B is the upper portion of the Figure, FIG. 8.C is the center-left portion of the Figure, FIG. 8.D is the center-right portion of the Figure, and FIG. 8.E is the bottom portion of the Figure.

As illustrated, for example, in FIG. 8.A, the user interface utilizes a color code, where yellow represents a medium-level or potential-threat condition, e.g., "Potential Threat: New Identity Related Information found, must be reviewed," where red represents a high-level or reported threat condition, e.g., "Case Created, Reported Threat" and where green represents a low-level or reviewed and approved threat condition, e.g., "Reviewed and Approved Record by Account Owner." Although, yellow, red and green are used in this example, any suitable color or visual queue may be used.

In FIG. 8.B, the step associated with the text "PII is found against elements of your identity" and Steps A, B and C (see also FIGS. 9.A, 9.B and 9.C, respectively) are yellow conditions. Step D (see also FIG. 9.D) is a green condition. Step E (see also FIG. 9.E) is a red condition.

In FIG. 8.C, Step F (see also FIG. 9.F), the step associated with the text "Case Managed by EZS with signed Power Attorney" and the step associated with the text "Case is rejected or incomplete—case is reactivated" are red conditions. Step G (see also FIG. 9.G) and the step associated with the text "Case Resolved by Specialist, pending approval and final sign off from Customer" are yellow conditions. The step associated with the text "Case is approved by Customer, the records are moved into 'Approved Records:" is a green condition.

In FIG. 8.D, Step F (see also FIG. 9.F), the step associated with the text "Case Managed by EZS without signed Power Attorney," the step associated with the text "Case is rejected or incomplete—case is reactivated" and Step K are red conditions. Step H (see also FIG. 9.H) and the step associated with the text "Case is resolved by Customer, pending approval and final sign off from Resolution Specialist" are yellow conditions. Step 1 (see also FIG. 9.I) is a green condition.

In FIG. 8.E, Step J (see also FIG. 9.J) is a green condition.

It is noted that Steps A-K, illustrated, for example, in FIG. 8, correspond with FIGS. 9.A-9.K, respectively.

Step A: Email Alert Email is Sent to Customer

FIG. 9.A (see also Step A) illustrates an example of a potential threat email notification according to the Identity Alert Management. Although presented as an email notification, any other suitable format via any suitable communication method may be used including, for example, a web page, a plain text or SMS notification, a physical letter delivered through a mail system or a private party service and the like. Regardless of the format and mode of communication, the notification may comprise one or more of a corporate logo, a telephone number, a warning banner, the name of the user, a list of suggested actions, a button linking the user to a log in screen, the name and identification information of the company offering the service, and a website URL.

Step B: Customer Logs into Dashboard and Sees Alert

FIG. 9.B (see also Step B) illustrates an example of a dashboard including an alert according to the Identity Alert Management. The dashboard may include one or more of a horizontal status bar displaying a current identity protection level with a percentage associated with the level of the current identity protection level for the user, which may include a scale from 0 to 100 percent graded along 25 percent intervals. The color of the bar associated with the current identity protection level may transition through different colors associated with certain levels of the current identity protection level. For example, red may be used at a lower end of the scale, yellow may be used in the middle of the scale and green may be used at the higher end of the scale. Other color combinations may be employed. Also, the right side of the current identity protection level status bar may include an icon showing an unlocked lock and a warning message such as "Potential Threat Detected," which may be provided with a red background. The dashboard may also comprise three primary fields, "My Wallet," "My Monitoring" and "My Restoration" in this example. The "My Wallet" field may display an icon (a stylized wallet containing stylized credit cards and bearing a corporate logo, in this example), a number of items that are secured and protected (in this example, "28"), and a button allowing the user to access the Wallet function of the website. The button may include a drop down menu with additional options associated with the Wallet function. The "My Monitoring" field may display a date corresponding with the last scan, and three sub-sections corresponding with Internet monitoring, Credit monitoring and Public Records monitoring functions. The sub-sections may display a number of active threats. A warning icon may be used to flag a new identity alert, in this example, a logo having a triangle with an exclamation point inside the triangle is used. A confirmation icon may be used when no thread exists, in this example, a check mark logo is used. The "My Restoration" field may display a phone number associated with a customer service department, and a button allowing the user to access threat reporting functionality, in this case, a "REPORT A THREAT" button is provided.

Step C: Customer Opens Alert to Review

Here is what is presented to the customer:
   the alert details
   what PII was used to find the alert
   Alert content
   Chance to approve the record "I agree with this information" or "YES THIS IS MINE" in this example
   Chance to disapprove the record "I don't understand or know this information" or "NO THIS IS NOT MINE" in this example FIG. 9.C (see also Step C) illustrates an example of a screenshot including a review of a new potential threat according to the Identity Alert Management. The screen may include the horizontal status bar described above. Once a selection is made as to whether to approve or disapprove the record, the user may advance the matter by clicking on a box, such as a box labeled "SUBMIT MY SELECTION(S)" as shown in the present example.

Step D: Approval Popup

If they click "Approve Record", they are triggered with a popup to confirm the validity of the record.

FIG. 9.D (see also Step D) illustrates an example of a popup window where a potential threat is marked as approved and where the system is prompting the user for validation, which may include a confirmation button, which is labeled "APPROVE RECORDS" in this example. The window may also include a link to cancel the process, which is labeled "Cancel" in this example.

Step E: Disapproval Popup

If they click "Report as an Identity Threat" they are triggered with a popup that makes them aware a case will be immediately created and a Resolution Specialist will be contacting them right away. As above, in this example, buttons and links are used to perform the desired functions.

FIG. 9.E (see also Step E) illustrates an example of a popup window where a potential threat is marked as an actual threat.

Step F: Case is Created

FIG. 9.F (see also Step F) illustrates an example of a screenshot indicating that a case has been created in the Identity Alert Management system. The screen may include the horizontal status bar described above. The screen may display a serial number associated with a particular restoration case, the date the case was opened, a tab associated with current status (selected in this example), a tab associated with original scan details and information associated with a customer support or resolution specialist. The information may include a name of the specialist, a photo of the specialist, a status bar indicating whether the specialist is online or not, an email address of the specialist, a direct line for the specialist and an option to click on an icon (a stylized telephone handset in this example) to initiate a call from the service provider to the user, labeled "Click here and we'll call you" in this example.

Step G: If User Signs a Power of Attorney

With a signed Power of Attorney, the Resolution Specialist can perform the majority of the Restoration tasks on your behalf.

FIG. 9.G (see also Step G) illustrates an example of a screenshot that may appear when the customer has signed a power of attorney. The information highlighted in FIG. 9.G may be provided on the same screen as the information described above with respect to FIG. 9.F. The screen may display next steps for the user to take ("No actions . . . " in this example), next steps for the specialist to perform ("Call TransUnion . . . " in this example) and a list of completed steps, which may further display the name of the specialist, the time of completion and the date of completion.

Step H: If User does not Sign a Power of Attorney

Without a signed Power of Attorney form, the Specialist can do less on your behalf, but can follow and assist anywhere you need help in the restoration process.

FIG. 9.H (see also Step H) illustrates an example of a screenshot that may appear when the customer has not signed a power of attorney. The information displayed here is similar to that described with respect to FIG. 9.G above, except that the display of next steps for the user to take includes a suggested action and a button to be selected upon completion of the step (labeled "DONE" in this case). Also, the screen may include a link to a help screen, which is labeled "I NEED HELP" in this example.

Step I: Final Approval of Closed Case

Once a case is completed from the Specialist's point of view, it's up to the customer to give the final say. If they are not comfortable with the outcome, the case can be reactivated, and if they are happy with the resolution, the case can be closed.

FIG. 9.I (see also Step I) illustrates an example of a screenshot that may appear prompting the user to close a case or keep the case active. The screen may include a standard message associated with the completed status of the case, a button prompting the user to close the case if the user is satisfied with the resolution of the case (labeled "CLOSE THIS CASE" and "I'M SATISFIED WITH THIS RESOLUTION" in this example), and a link allowing a user to keep the case active (labeled "If this case has not been resolved to your full satisfaction click here to keep case active>>" in this example). The screen may also notify the user of policies or default actions that may be associated with the service, for example, "We will close this case after 30 days if we don't hear from you."

Step J: Verified Records

All records here have gone through the above approval process, each record stored in active services have been reviewed and confirmed as valid Identity elements by the consumer.

FIG. 9.J (see also Step J) illustrates an example of a screenshot that may appear showing verified records. In this example, relating to "Credit Monitoring," the screen may include a "Monitoring Snapshot" tab (selected in this example) and a "What Is Being Reported?" tab. The "Monitoring Snapshot" tab may include a number of reported threat(s), a number of potential threat(s) found, a number of record(s) verified by the user, a color-code legend, and a date associated with the completion of a scan. The numbers or text displayed here may be displayed in a color according to the color-code legend. The color-code may, for example, be green for "NOT A THREAT," yellow for "POTENTIAL THREAT" and red for "REPORTED THREAT." The screen may further present the user with information associated with a verified record, an option to add personal notes, a date of approval and a link that allows the user to reopen the case as a threat.

Step K: Cases can Always be Reopened

A case can be reopened for any reason by the consumer or by a Resolution Specialist.

FIG. 9.K (see also Step K) illustrates an example of a popup window that may appear prompting a user to confirm reopening of a threat. The screen may include a link or button that allows the user to reopen and report the case as an identity threat.

An identity management system may comprise a core gateway; a data processing engine; and a subscriber database. The system may further comprise a secure profile system. The system may further comprise a system for binding multiple SSL certificates to a single Microsoft IIS site. The system may further comprise a URL matcher to support vanity URLs, which may be provided on the core gateway. The system may further comprise a breach prevention system. The system may further comprise an identity alert management system for interaction between a customer and a resolution specialist. The core gateway may comprise: a customer tools system; a self-service system; a core function system; a content and skinning system; a product and catalog system; a partner integration system; a central manager; and an affiliate management system. The data processing engine may comprise: file retrieval system; file parsing and staging system; business rule processing system; and a record extract, transform and load system linked to the subscriber database. The data processing engine may comprise: a first server; a file retrieval system connected to the first server; a second server connected to the file retrieval system; a file extract, transform and load system connected to the second server; a staging data system connected to the file extract, transform and load system; a business rule processing system connected to the staging data system; and a system for importing records that pass through the business rule processing system into the subscriber database. The subscriber database may comprise: centralized data storage for identity management system customer data; a synchronization system linked to the core gateway; an integration system linked to the core gateway configured to allow customers to validate partner paid services during activation; a support and reporting system; an identity management system schema; an anonymous subscriber system; a provisional enrollment system; a system for synchronization between the subscriber database and the core gateway; and a schema extension system. The secure profile system may comprise: a system for defining structures; multiple containers of data that are associated with profiles; a system for securely granting access to the profiles and subjects; an audit log configured to provide an account of all accesses to data housed within the profiles; security-related algorithms and protocols; a system for exchanging data between subjects; a support system for shared-secret access to data; and a support system for secured, externalized content. The secure profile system may comprise: a database system; a data access system configured to access the database system; a controller system configured to access the data access system; a context system configured to access the controller system; and a service system configured to access the context system. The system for binding multiple SSL certificates to a single Microsoft IIS site (any web server environment that only supports a single certificate per application) may comprise: an SSL termination device for hosting multiple SSL certificates integrated with an extension to a web application platform, wherein the extension intercepts all incoming requests relayed from the SSL termination device to the Microsoft IIS site (any web server environment that only supports a single certificate per application), wherein the multiple SSL certificates associated with the various identities of the application are installed in an SSL termination device, and wherein traffic associated with each of the multiple SSL certificates is directed to the same Microsoft IIS site (any web server environment that only supports a single certificate per application). The URL matcher to support vanity URLs on the core gateway may comprise: an ASP.NET HttpModule/HttpHandler; a system for inspecting incoming requests; a system for matching different elements of the request or an associated session against pre-defined patterns; and a system for executing a URL rewrite, a client redirect or transfer to another page within the current site. The business security management system may comprise: an assist module; and a prepare module. The assist module may comprise: a self-assessment system; and a score system. The self-assessment system may comprise: a series of questions pertaining to policies and procedures based on customer's industry and the personally identifiable information collected by the customer. The questions may be yes-no questions. The score system may comprise: a system for assigning weights for each of the questions; a system for calculating a risk score based on the weights for each of the questions and the answers provided by the customer; and a system for assigning the calculated risk score to a tiered scoring system. The tiered scoring system may have five tiers. Each tier may be a 20% range. The prepare module may comprise: a customer assist system; a system for identifying a data breach victim's contact information and data transfer protocol; a system for notifying breach victims or others of the subject data breach by a communication means that conforms with laws applicable to the customer's jurisdiction; a system for providing recommendations of notification based on current state and federal incident response regulations; a system for providing assistance with notification messaging and customer call center scripting; a system for managing the breach response; a system for providing breach victims customer-sponsored access to a heightened level of service; and a defined system for notification of costs. The customer assist system may comprise: a system for allowing a dedicated breach specialist to communicate with a customer in a response process. The system for managing the breach response may utilize a website or a toll-free call-in number. The identity alert management system for interaction between a customer and a resolution specialist may comprise a method, the method may comprise the steps of: identifying personally identifiable information against elements of a customer's identity; automatically sending a communication to the customer within a specified time period; authenticating the customer through a secure identity management dashboard; permitting the customer to review a source of the alert and details associated with the alert; prompting the customer to mark the alert as a threat or not a threat; sending a record of the threat to an approved records system if the customer marks the alert as not a threat; creating a case if the customer marks the alert as a threat; permitting the user to execute a power of attorney prior to, during or after the threat has been detected; ascertaining whether the customer has executed the power of attorney; providing a first response system for customers that have executed the power of attorney; providing a second response system for customers that have not executed the power of attorney; and permitting the customer or the resolution specialist to reopen a previously approved record. The specified time period may be less than 24 hours. The step of providing a first response system for customers that have executed the power of attorney may comprise the steps of: performing a customized restoration plan on behalf of the customer, who takes on a support role, by a resolution specialist, who takes on the role of a case owner; resolution of the threat by the resolution specialist; after resolution of the threat by the resolution specialist, permitting the customer to approve the response to the threat and perform a final sign off; if the customer approves of the response, moving the record to the approved records system; and if the customer does not approve of the response, repeating the step of ascertaining whether the customer has executed the power of attorney. The step of providing a second response system for customers that have not executed the power of attorney may comprise the steps of: providing preplanned restoration plans to the customer with support from a resolution specialist; resolution of the threat by the customer; after resolution of the threat by the customer, permitting the resolution specialist to approve the response to the threat and perform a final sign off; if the resolution specialist approves of the response, moving the record to the approved records system; and if the resolution specialist does not approve of the response, repeating the step of ascertaining whether the customer has executed the power of attorney. The customer tools system may comprise: a means for allowing a customer to browse products and services from a suite of identity management products and services; a means for allowing a customer to gather information about the identity management products and services; and a means for allowing a customer to complete purchase and enrollment of one or more identity management products and services. The self-service system may comprise: a means for requesting additional information regarding one or more identity management products and services; and a means for reporting fraud-related activity. The core function system may comprise: a language and runtime environment; an application framework and service including a content management system; an object/relational persistence layer; and a configuration and dependency injection system. The content and skinning system may comprise: a cascading stylesheet; a dynamic content system; and a custom page override system. The partner integration system may comprise: a bulk data load system; an on-demand data push system; and an on-demand data pull system. The partner integration system may be configured to deliver a custom-branded uniform experience consistent with a partner's brand identity and online presence. The core gateway may be configured to provide support for special offer codes and source codes that enable special pricing or promotional discounts, offer promotional trial periods on certain products, or identify a marketing channel used to attract the customer. The central manager may comprise: identity protection services; and secure web based storage inventory of subscriber documents. The affiliate management system may comprise: the partner integration system; and a form-fill-based tool that allows designated agents of an affiliate to create and define a new partner-branded site under the core gateway. The form-fill-based tool that allows designated agents of an affiliate to create and define a new partner-branded site under the core gateway may comprise: logo management; partner-identifying textual information; primary theme and color selections; and default product catalog. The centralized data storage for identity management system customer data may comprise: transactional data from partner sales files; subscription data from partner sales files; and subscription data from customers who access the core gateway. The support and reporting system may comprise: a system for tracking customer obligations for fulfillment; a partner billing system; a customer billing system; an email communications system; and a performance analysis system configured to analyze the performance of services and partners. The identity management system schema may comprise: service term; pricing; billing frequency; volume discounts; step pricing; and package requirements. The anonymous subscriber system may comprise a means for re-associating an anonymous record with a newly created profile record. The provisional enrollment system may comprise: a partner sales file receiving and processing system; a customer communication system configured to direct the customer to activate services via the core gateway; a provisional lookup process; and a real time customer verification system. The customer communication system may be configured to direct the customer to activate services via the core gateway may comprise a validating system configured to allow the core gateway to validate the customer against a record in the subscriber database. The system for synchronization between the subscriber database and the core gateway may comprise a unique identity management system identification for each customer. The unique identity management system identification may be a primary key across the core gateway and subscriber database. The profile may contain records which have an associated structure. The database system may be configured to be isolated from all other systems with more restricted access, and all profile data may be layer encrypted. The data access system configured to access the database system may comprise atomic primitives providing fundamental data operations for all system entities. The controller system configured to access the data access system may be configured to assemble and orchestrate data access primitives into higher level system functions. The context system configured to access the controller system may be configured to provide a stateful security context with a known acting principal for all requested operations. The service system configured to access the context system may be configured to expose all client-accessible functionality over a supported remote-access technology. The ASP.NET HTTP module may be configured to detect certain characteristics of an incoming request connection. The certain characteristics may include a special port or local interface IP address. When the incoming request connection matches the certain characteristics, the ASP.NET HTTP module may alter the current state of the request context to indicate that the connection is secure. The load balancer for each partner site may be configured with a dedicated unique IP address listening endpoint. The dedicated SSL certificate may be associated with the unique IP address listening endpoint on the load balancer. The unique IP address listening endpoint may be directed from the load balancer to the core gateway. The elements of the request may include one or more of the URL, cookies, params and client IP. The pre-defined patterns may be static values or regex patterns.

A computer implemented method, a computer system or a nontransitory computer readable storage medium for managing communications for a web site. The method or system may comprise: on a device having one or more processors and a memory storing one or more programs for execution by the one or more processors, the one or more programs including instructions for: processing information from multiple web sites served up from a web application, binding multiple secure socket layer (SSL) certificates to a single site supported by the web application, hosting the SSL certificates using an SSL accelerator, and intercepting incoming requests relayed from the SSL accelerator to the web application with an HTTP module. Also, a nontransitory computer readable storage medium storing one or more programs configured to be executed by one or more processing units at a computer may comprise the instructions. The one or more programs may further include instructions for: hosting client information using an HTTP client host, relaying connections using an HTTP intermediate, hosting server information using an HTTP server host, communicating between the HTTP client host and the HTTP intermediate via an unsecure protocol and via a secure protocol, and communicating between the HTTP intermediate and the HTTP server host via an unsecure protocol and via an alternate unsecure protocol. The HTTP client host may comprise a web browser. The HTTP intermediate may comprise an HTTP relay process and an SSL certificate bound to a port adapted for communication via the secure protocol. The HTTP server host may comprise the HTTP module. The HTTP server host may comprise a web application server. The web application server may comprise the web application. The HTTP module may be adapted to communicate with the unsecure protocol through a first port, and the HTTP module may be adapted to communicate with the secure protocol through a second port. Information from the HTTP intermediate may be transmitted to the web application server via the HTTP module. Information from the web application server may be transmitted to the HTTP intermediate via the HTTP module. The HTTP module may be configured to function as a filter. The HTTP module may be configured to function as a filter and detects a characteristic of an incoming connection being relayed by the HTTP intermediate as an indicator of a connection that originated as secure. The web application may be an internet information service. The internet information service may be Microsoft's Internet Information Service 6.

A computer implemented method or a computer system for matching a URL with one of a plurality of web sites is provided. The computer implemented method may comprise: on a device having one or more processors and a memory storing one or more programs for execution by the one or more processors. The one or more programs may include instructions for: capturing an HTTP request and a Web application context, resolving a match context for the HTTP request and the Web application context, resolving a set of top-level rules for evaluating the HTTP request and the Web application context, evaluating the match context against a first rule among the top-level rules, and invoking an action for modifying one or more of the HTTP request, the Web application context, and the match context. A nontransitory computer readable storage medium storing one or more programs configured to be executed by one or more processing units at a computer may be provided and may comprise the instructions. The one or more programs may further include instructions for: evaluating the first rule against the match context, and advancing to a next rule if the first rule does not match, determining whether an action supports context updates and updating the match context against an action attribute and value if the action supports context updates, and determining whether the action supports child rules and advancing to a first rule in the child rule set if the action supports child rules. The one or more programs further include instructions for: determining whether the action supports continuation, advancing to a next rule in a current set of rules or a next rule in a parent set of rules if the action supports continuation, and ending HTTP request processing and returning control to a hosting runtime when the action does not support continuation. The computer implemented method may support vanity URLs. A core gateway of an identity management system may comprise the one or more programs. The one or more programs may further include instructions for: iterating through a set of preconfigured rules and testing the HTTP request against each rule in turn, wherein each rule is defined by a match test and a match action. The match test may be a description of an attribute of the match context that should be tested against. The match action may be an operation to be invoked upon a successful match test. The match test may be defined by one of an evaluation kind that determines how the test should be evaluated, an attribute of the match context to test against, and an argument value to resolve the test against. The evaluation kind may be an equality test, wherein the attribute is a URL path and wherein the argument value is a comparison value.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

We claim:

1. A computer implemented method for managing communications for a web site, comprising:
on a device having one or more processors and a memory storing one or more programs for execution by the one or more processors, the one or more programs including instructions for:
processing information from multiple web sites served up from a web application,
binding multiple secure socket layer (SSL) certificates to a single site supported by the web application,
hosting the SSL certificates using an SSL accelerator, and
intercepting incoming requests relayed from the SSL accelerator to the web application with an HTTP module.

2. The computer implemented method of claim 1, the one or more programs further including instructions for:
hosting client information using an HTTP client host,
relaying connections using an HTTP intermediate,
hosting server information using an HTTP server host,
communicating between the HTTP client host and the HTTP intermediate via an unsecure protocol and via a secure protocol, and
communicating between the HTTP intermediate and the HTTP server host via an unsecure protocol and via an alternate unsecure protocol.

3. The computer implemented method of claim 2, wherein the HTTP client host comprises a web browser.

4. The computer implemented method of claim 2, wherein the HTTP intermediate comprises an HTTP relay process and an SSL certificate bound to a port adapted for communication via the secure protocol.

5. The computer implemented method of claim 2, wherein the HTTP server host comprises the HTTP module.

6. The computer implemented method of claim 5, wherein the HTTP server host comprises a web application server.

7. The computer implemented method of claim 6, wherein the web application server comprises the web application.

8. The computer implemented method of claim 6, wherein the HTTP module is adapted to communicate with the unsecure protocol through a first port, and wherein the HTTP module is adapted to communicate with the secure protocol through a second port.

9. The computer implemented method of claim 8, wherein information from the HTTP intermediate is transmitted to the web application server via the HTTP module.

10. The computer implemented method of claim 8, wherein information from the web application server is transmitted to the HTTP intermediate via the HTTP module.

11. The computer implemented method of claim 2, wherein the HTTP module is configured to function as a filter and detects a characteristic of an incoming connection being relayed by the HTTP intermediate as an indicator of a connection that originated as secure.

12. The computer implemented method of claim 1, wherein the HTTP module is configured to function as a filter.

13. The computer implemented method of claim 1, wherein the web application is an internet information service.

14. The computer implemented method of claim 13, wherein the internet information service is Microsoft's Internet Information Service 6.

15. A computer system for managing communications for a web site, the computer system comprising:
    one or more processors; and
    memory to store:
        one or more programs, the one or more programs comprising instructions for:
            processing information from multiple web sites served up from a web application,
            binding multiple secure socket layer (SSL) certificates to a single site supported by the web application,
            hosting the SSL certificates using an SSL accelerator, and
            intercepting incoming requests relayed from the SSL accelerator to the web application with an HTTP module.

16. The computer system of claim 15, the one or more programs further including instructions for:
    hosting client information using an HTTP client host,
    relaying connections using an HTTP intermediate,
    hosting server information using an HTTP server host,
    communicating between the HTTP client host and the HTTP intermediate via an unsecure protocol and via a secure protocol, and
    communicating between the HTTP intermediate and the HTTP server host via an unsecure protocol and via an alternate unsecure protocol.

17. The computer system of claim 16, wherein the HTTP client host comprises a web browser.

18. The computer system of claim 16, wherein the HTTP intermediate comprises an HTTP relay process and an SSL certificate bound to a port adapted for communication via the secure protocol.

19. The computer system of claim 16, wherein the HTTP server host comprises the HTTP module.

20. The computer system of claim 19, wherein the HTTP server host comprises a web application server.

21. The computer system of claim 20, wherein the web application server comprises the web application.

22. The computer system of claim 20, wherein the HTTP module is adapted to communicate with the unsecure protocol through a first port, and wherein the HTTP module is adapted to communicate with the secure protocol through a second port.

23. The computer system of claim 22, wherein information from the HTTP intermediate is transmitted to the web application server via the HTTP module.

24. The computer system of claim 22, wherein information from the web application server is transmitted to the HTTP intermediate via the HTTP module.

25. The computer system of claim 16, wherein the HTTP module is configured to function as a filter and detects a characteristic of an incoming connection being relayed by the HTTP intermediate as an indicator of a connection that originated as secure.

26. The computer system of claim 15, wherein the HTTP module is configured to function as a filter.

27. The computer system of claim 15, wherein the web application is an internet information service.

28. The computer system of claim 27, wherein the internet information service is Microsoft's Internet Information Service 6.

29. A nontransitory computer readable storage medium storing one or more programs configured to be executed by one or more processing units at a computer comprising instructions for:
    processing information from multiple web sites served up from a web application,
    binding multiple secure socket layer (SSL) certificates to a single site supported by the web application,
    hosting the SSL certificates using an SSL accelerator, and
    intercepting incoming requests relayed from the SSL accelerator to the web application with an HTTP module.

30. The nontransitory computer readable storage medium of claim 29, the one or more programs further including instructions for:
    hosting client information using an HTTP client host,
    relaying connections using an HTTP intermediate,
    hosting server information using an HTTP server host,
    communicating between the HTTP client host and the HTTP intermediate via an unsecure protocol and via a secure protocol, and
    communicating between the HTTP intermediate and the HTTP server host via an unsecure protocol and via an alternate unsecure protocol.

31. The nontransitory computer readable storage medium of claim 30, wherein the HTTP client host comprises a web browser.

32. The nontransitory computer readable storage medium of claim 30, wherein the HTTP intermediate comprises an HTTP relay process and an SSL certificate bound to a port adapted for communication via the secure protocol.

33. The nontransitory computer readable storage medium of claim 30, wherein the HTTP server host comprises the HTTP module.

34. The nontransitory computer readable storage medium of claim 33, wherein the HTTP server host comprises a web application server.

35. The nontransitory computer readable storage medium of claim 34, wherein the web application server comprises the web application.

36. The nontransitory computer readable storage medium of claim 34, wherein the HTTP module is adapted to communicate with the unsecure protocol through a first port, and wherein the HTTP module is adapted to communicate with the secure protocol through a second port.

37. The nontransitory computer readable storage medium of claim 36, wherein information from the HTTP intermediate is transmitted to the web application server via the HTTP module.

38. The nontransitory computer readable storage medium of claim 36, wherein information from the web application server is transmitted to the HTTP intermediate via the HTTP module.

39. The nontransitory computer readable storage medium of claim 30, wherein the HTTP module is configured to function as a filter and detects a characteristic of an incoming connection being relayed by the HTTP intermediate as an indicator of a connection that originated as secure.

40. The nontransitory computer readable storage medium of claim 29, wherein the HTTP module is configured to function as a filter.

41. The nontransitory computer readable storage medium of claim 29, wherein the web application is an internet information service.

42. The nontransitory computer readable storage medium of claim 41, wherein the internet information service is Microsoft's Internet Information Service 6.

\* \* \* \* \*